(12) United States Patent
Landon et al.

(10) Patent No.: US 12,272,017 B2
(45) Date of Patent: Apr. 8, 2025

(54) THREE-DIMENSIONAL SELECTIVE BONE MATCHING FROM TWO-DIMENSIONAL IMAGE DATA

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Ryan Lloyd Landon, Olive Branch, MS (US); Bilal Ismail, Memphis, TN (US)

(73) Assignees: Smith & Nephew, Inc.; Smith & Nephew Orthopaedics AG, Zug (CH); Smith & Nephew Asia Pacific Pte. Limited, Singapore (SG)

( * ) Notice: Subject to any disclaimer, the term of this patent is extended or adjusted under 35 U.S.C. 154(b) by 449 days.

(21) Appl. No.: 17/779,479

(22) PCT Filed: Dec. 21, 2020

(86) PCT No.: PCT/US2020/066357
§ 371 (c)(1),
(2) Date: May 24, 2022

(87) PCT Pub. No.: WO2021/127625
PCT Pub. Date: Jun. 24, 2021

(65) Prior Publication Data
US 2023/0019873 A1    Jan. 19, 2023

Related U.S. Application Data

(60) Provisional application No. 62/951,676, filed on Dec. 20, 2019.

(51) Int. Cl.
*G06T 19/20* (2011.01)
*G06T 7/33* (2017.01)

(52) U.S. Cl.
CPC ............... *G06T 19/20* (2013.01); *G06T 7/33* (2017.01); *G06T 2200/08* (2013.01);
(Continued)

(58) Field of Classification Search
CPC ............... G06T 19/20; G06T 2200/08; G06T 2200/24; G06T 2207/10116;
(Continued)

(56) References Cited

U.S. PATENT DOCUMENTS 7,796,790 B2 * 9/2010 McNutt .................... G06T 7/11
382/199
2004/0068187 A1 * 4/2004 Krause ................. A61B 17/151
600/443

(Continued)

FOREIGN PATENT DOCUMENTS

| EP | 1348394 A1 | 10/2003 |
|---|---|---|
| EP | 3080619 A1 | 10/2016 |
| WO | 2015089118 A1 | 6/2015 |

OTHER PUBLICATIONS

Marrigje F. Meijer et al., "Assessment of Prosthesis Alignment after Revision Total Knee Arthroplasty Using EOS 2D and 3D Imaging: A Reliability Study," Sep. 23, 2014, Plos One, vol. 9, Issue 9, pp. 1-3.*

(Continued)

*Primary Examiner* — Omar S Ismail
(74) *Attorney, Agent, or Firm* — KDW Firm PLLC

(57) ABSTRACT

A method of generating a custom three-dimensional (3D) model of a patient bone from one or more 2D images is disclosed. The method includes obtaining a 2D image of a bone, optionally of a joint, and identifying a 3D bone template for a candidate or representative bone from a pre-aligned library of representative bones. The method further includes repositioning one or more views of the 3D (Continued)

model or 2D images (e.g., with respect to rotation angle or caudal angle). In an iterative process, another 3D bone model for another candidate bone can be identified based on the repositioning until an accuracy threshold is satisfied. When the accuracy threshold is satisfied, surface region(s) of the current 3D bone model can then be modified to generate the resulting 3D model for the patient bone. The process can then be repeated for other bone(s) associated with the joint of the patient.

50 Claims, 33 Drawing Sheets

(52) U.S. Cl.
CPC .................. *G06T 2200/24* (2013.01); *G06T 2207/10116* (2013.01); *G06T 2207/30008* (2013.01)

(58) Field of Classification Search
CPC ....... G06T 2207/30008; G06T 2210/41; G06T 2219/2021; G06T 7/33; G06T 7/75
See application file for complete search history.

(56) References Cited

U.S. PATENT DOCUMENTS

| | | | |
|---|---|---|---|
| 2007/0177783 | A1 | 8/2007 | Yamada |
| 2015/0049083 | A1* | 2/2015 | Bidne .................. G06T 19/006 345/420 |
| 2018/0256256 | A1* | 9/2018 | May ....................... A61B 90/36 |
| 2019/0122330 | A1* | 4/2019 | Saget ...................... A61F 2/461 |
| 2019/0380792 | A1* | 12/2019 | Poltaretskyi ......... H04N 13/122 |
| 2019/0388123 | A1* | 12/2019 | Pavlovskaia ............ G06T 19/00 |
| 2020/0069373 | A1* | 3/2020 | Yu .......................... A61B 34/10 |
| 2021/0393330 | A1* | 12/2021 | Barut ....................... G06T 3/40 |

OTHER PUBLICATIONS

Youngjun Kim et al.,"Novel methods for 3D postoperative analysis of total knee arthroplasty using 2D-3D image registration," Nov. 23, 2010, Clinical Biomechanics 26 (2011), pp. 384-388.*
J. Bredow et al.,"Software Based Matching of X-ray Images and 3D Models of Knee Prostheses," Dec. 1, 2014, Technology and Health Care, vol. 22, No. 6, pp. 1-3.*
Shaun M. Nordeck et al.,"Simulated radiographic bone and joint modeling from 3D ankle MRI: feasibility and comparison with radiographs and 2D MRI," Mar. 6, 2017, Skeletal Radiol (2017):46,pp. 651-662.*
Guoyan Zheng et al.,"A novel technology for 3D knee prosthesis planning and treatment evaluation using 2D X-ray radiographs: a clinical evaluation," May 21, 2018, International Journal of Computer Assisted Radiology and Surgery (2018) 13,pp. 1151-1157.*
N. Baka et al.,"2D-3D shape reconstruction of the distal femur from stereo X-ray imaging using statistical shape models," May 4, 2011, Medical Image Analysis 15 (2011),pp. 840-848.*
Guoyan Zheng et al.,"3X-Knee: A Novel Technology for 3D Preoperative Planning and Postoperative Evaluation of TKA Based on 2D X-Rays," Oct. 11, 2018, Intelligent Orthopaedics, pp. 93-101.*
Vincent Massé et al.,"Using standard X-ray images to create 3D digital bone models and patient-matched guides for aiding implant positioning and sizing in total knee arthroplasty," Mar. 15, 2021, Computer Assisted Surgery,vol. 26, 2021—Issue 1, pp. 31-38.*
International Search Report and Written Opinion dated May 17, 2021, for the International Patent Application No. PCT/US2020/066357, filed on Dec. 21, 2020, 12 pages.

* cited by examiner

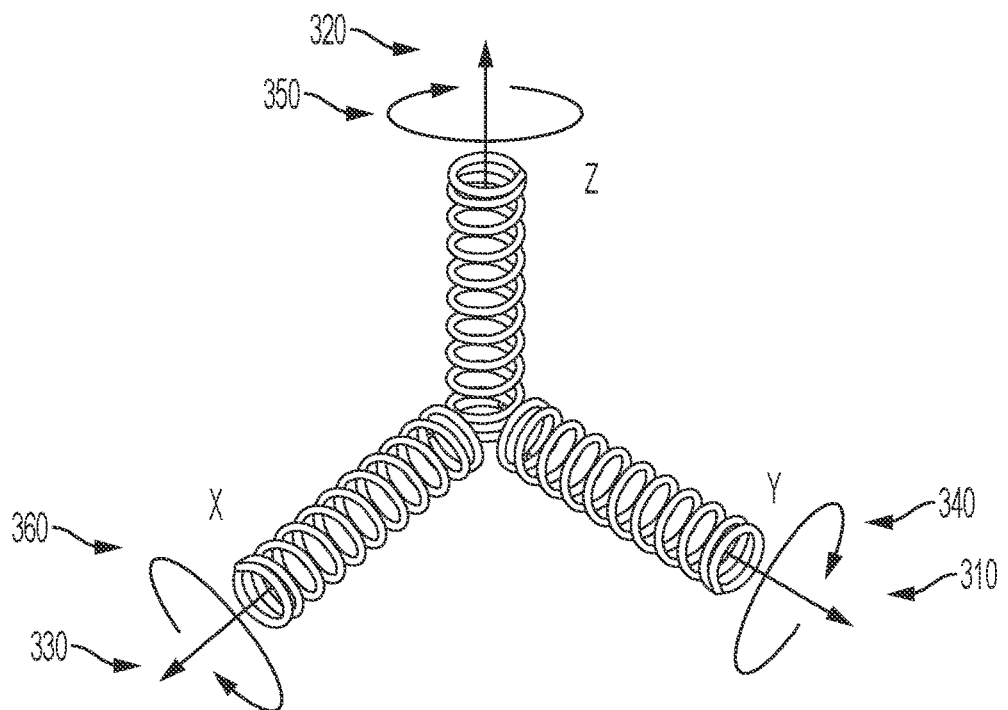
FIG. 3A
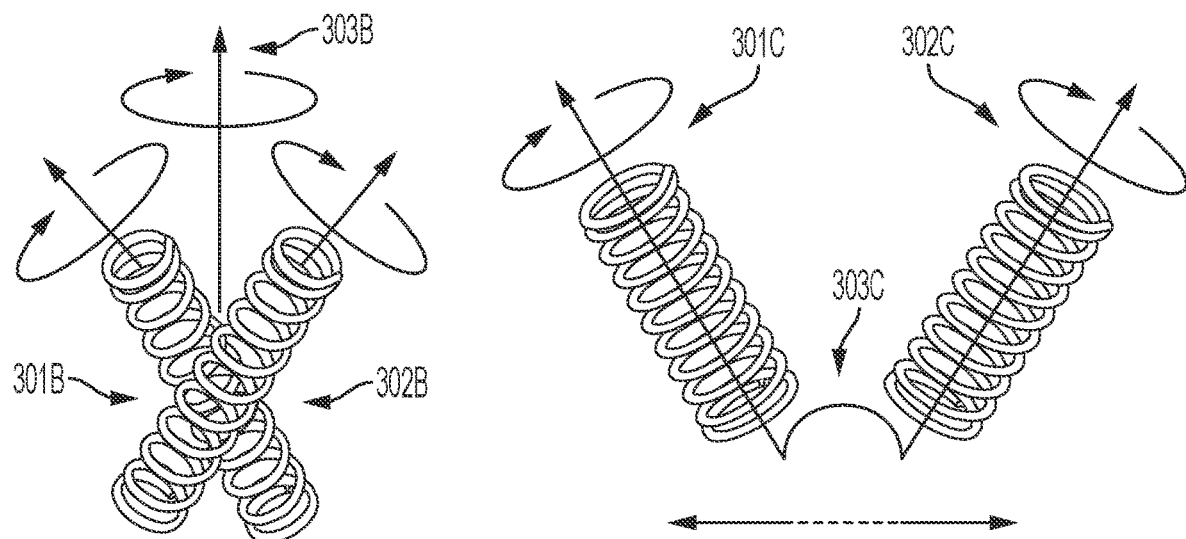
FIG. 3B
FIG. 3C

THREE-DIMENSIONAL SELECTIVE BONE MATCHING FROM TWO-DIMENSIONAL IMAGE DATA

This application is a National Phase filing of International Application No. PCT/US2020/066357, filed Dec. 21, 2020, which application claims the benefit of U.S. Provisional Application Ser. No. 62/951,676 filed on Dec. 20, 2019, the contents of each application incorporated herein by reference in its entirety.

TECHNICAL FIELD

The present disclosure relates generally to methods, systems, and apparatuses related to a computer-assisted surgical system that includes various hardware and software components that work together to enhance surgical workflows. The disclosed techniques may be applied to, for example, shoulder, hip, and knee arthroplasties, as well as other surgical interventions such as arthroscopic procedures, spinal procedures, maxillofacial procedures, rotator cuff procedures, ligament repair and replacement procedures. More specifically, the present disclosure relates to methods of creating three-dimensional (3D) anatomical models from bi-planar two-dimensional (2D) images.

BACKGROUND

As the cost of providing healthcare has continued to rise, many entities are looking for ways to reduce costs. In some cases, insurance companies impose more stringent reimbursement criteria in order to shift away from more expensive treatments. For example, insurance providers may question whether the use of magnetic resonance imaging (MRI) equipment is necessary because of the high cost of using such equipment as compared to other imaging systems, including computed tomography (CT) scanners and X-ray machines. In other cases, less populated or emerging markets may not have access to MRI technology because of the cost of obtaining and operating such systems.

Currently, many patient-specific total joint replacement systems, including Smith & Nephew's VISIONAIRE cutting guides, depend upon the ability to interpret a patient's joint anatomy from a sequence of images produced by an MRI scan. In particular, patient-specific joint replacement procedures require form-fitting surfaces matched to areas that include cartilage surfaces, such as in the knee. MRI scans, which provide three dimensional images of a scanned anatomical feature including soft tissue, are currently required because other imaging technologies provide insufficient detail for the development of such surfaces. VISIONAIRE is a registered trademark of Smith & Nephew, Inc. of Memphis, Tennessee.

Furthermore, the process of converting MRI data into a patient-specific joint replacement instrument may require a significant amount of user intervention and data processing prior to manufacturing the instrument. A user often spends a significant amount of time ensuring that a bone model created using the MRI data matches the patient's bone as closely as possible. In short, the reliance on MRI scans can either preclude certain patients from receiving a joint replacement if an MRI system is not available or inhibit or delay the approval process if an insurance provider denies coverage and requests that other treatments be pursued in advance of total joint replacement.

Prior attempts to create 3D models from 2D imaging data rely heavily on complex mathematical calculations performed by a processor. For example, U.S. Pat. No. 10,217,217 to Dhruwdas discloses a method for obtaining a 3D image using a conventional 2D x-ray image. The method includes determining the camera model (position of the source and the x-ray image with respect to one another) and digital magnification ratio of a 2D x-ray image, extracting contours of a bone from the 2D x-ray image, and identifying 2D anatomical values of the contours. The method further includes importing a 3D template model of the bone, extracting silhouette vertices and their projections according to the camera model, and aligning the 3D template model with respect to the X-ray image. The template is selectively modified to match the 2D anatomical values. A best matching point on the contour is determined for each silhouette vertex projection, which is then back-projected according to the camera model to find a target position closest to the corresponding silhouette vertex. The 3D template model is deformed such that the silhouette vertices achieve the corresponding target positions using a Laplacian Mesh Deformation algorithm. However, the method of Dhruwdas has high computational requirements due to the complex mathematical calculations which must be performed by the processor.

Mathematical approaches do not have 3D intuition like humans do. Therefore, mathematical optimization algorithms have to check similarity in multiple orientations and the algorithms can fall into a local minimum where the bone shapes look like they match 2D projections or outlines, but rotated the wrong direction. This occurs when bones are somewhat symmetric like a pelvis or the condyles of a humerus or femur. To compensate, computers have to perform many more computationally expensive projections and comparisons in order to be robust to these local minima. Accordingly, primarily mathematical processes are a highly inefficient approach with reduced effectiveness.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings:

FIG. 3A depicts an alternative example of an electromagnetic sensor device, with three perpendicular coils, according to some embodiments.

FIG. 3B depicts an alternative example of an electromagnetic sensor device, with two nonparallel, affixed coils, according to some embodiments.

FIG. 3C depicts an alternative example of an electromagnetic sensor device, with two nonparallel, separate coils, according to some embodiments.

DETAILED DESCRIPTION

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Definitions

For the purposes of this disclosure, the term "implant" is used to refer to a prosthetic device or structure manufactured to replace or enhance a biological structure. For example, in a total hip replacement procedure a prosthetic acetabular cup (implant) is used to replace or enhance a patients worn or damaged acetabulum. While the term "implant" is generally considered to denote a man-made structure (as contrasted with a transplant), for the purposes of this specification an implant can include a biological tissue or material transplanted to replace or enhance a biological structure.

For the purposes of this disclosure, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Although much of this disclosure refers to surgeons or other medical professionals by specific job title or role, nothing in this disclosure is intended to be limited to a specific job title or function. Surgeons or medical professionals can include any doctor, nurse, medical professional, or technician. Any of these terms or job titles can be used interchangeably with the user of the systems disclosed herein unless otherwise explicitly demarcated. For example, a reference to a surgeon also could apply, in some embodiments to a technician or nurse.

The systems, methods, and devices disclosed herein are particularly well adapted for surgical procedures that utilize surgical navigation systems, such as the NAVIO® surgical navigation system. NAVIO is a registered trademark of BLUE BELT TECHNOLOGIES, INC. of Pittsburgh, PA, which is a subsidiary of SMITH & NEPHEW, INC. of Memphis, TN.

CASS Ecosystem Overview

Figure 1:
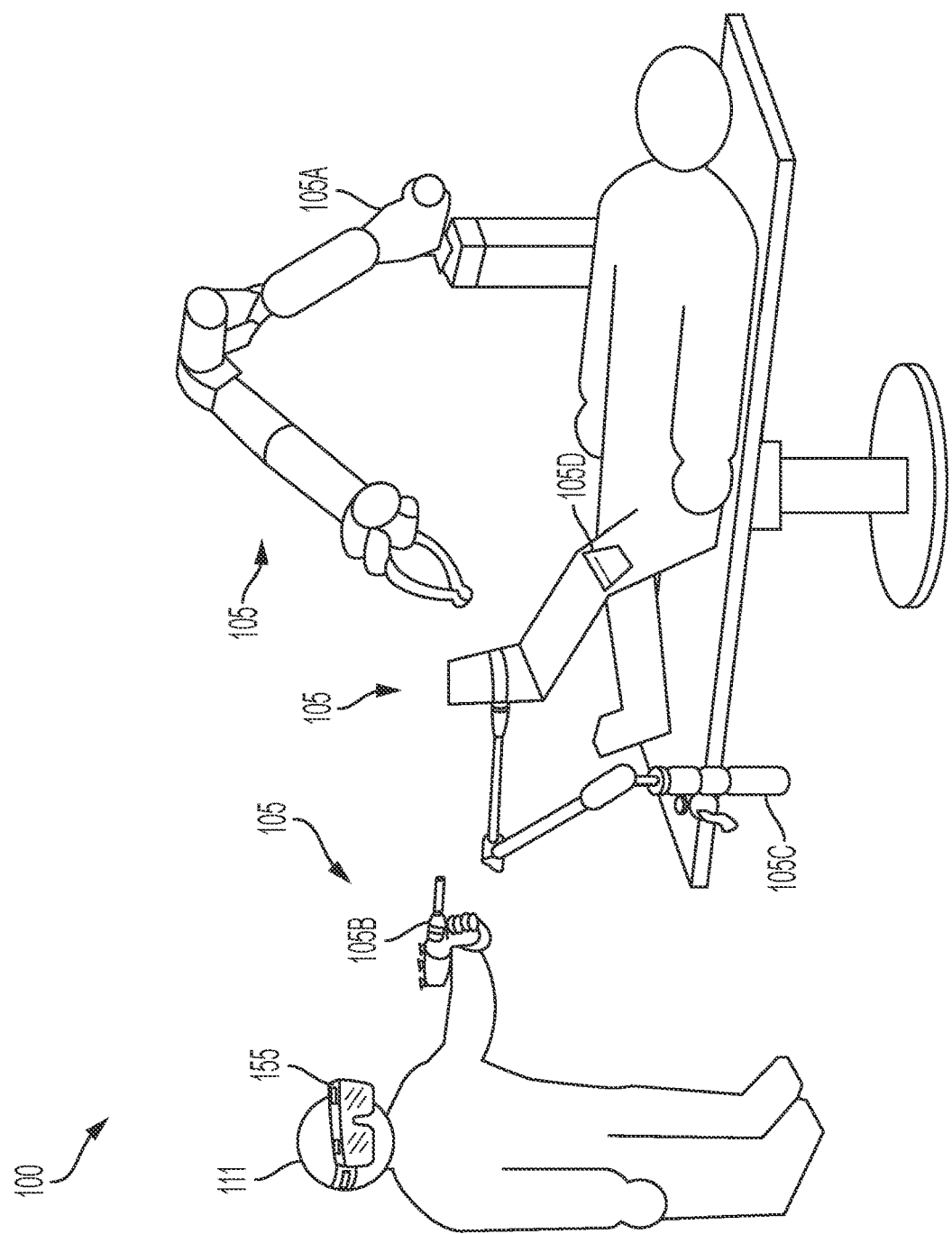
FIG. 1 depicts an operating theatre including an illustrative computer-assisted surgical system (CASS) in accordance with an embodiment.

FIG. 1 provides an illustration of an example computer-assisted surgical system (CASS) 100, according to some embodiments. As described in further detail in the sections that follow, the CASS uses computers, robotics, and imaging technology to aid surgeons in performing orthopedic surgery procedures such as total knee arthroplasty (TKA) or total hip arthroplasty (THA). For example, surgical navigation systems can aid surgeons in locating patient anatomical structures, guiding surgical instruments, and implanting medical devices with a high degree of accuracy. Surgical navigation systems such as the CASS 100 often employ various forms of computing technology to perform a wide variety of standard and minimally invasive surgical procedures and techniques. Moreover, these systems allow surgeons to more accurately plan, track and navigate the placement of instruments and implants relative to the body of a patient, as well as conduct pre-operative and intra-operative body imaging An Effector Platform 105 positions surgical tools relative to a patient during surgery. The exact components of the Effector Platform 105 will vary, depending on the embodiment employed. For example, for a knee surgery, the Effector Platform 105 may include an End Effector 105B that holds surgical tools or instruments during their use. The End Effector 105B may be a handheld device or instrument used by the surgeon (e.g., a NAVIO® hand piece or a cutting guide or jig) or, alternatively, the End Effector 105B can include a device or instrument held or positioned by a Robotic Arm 105A. While one Robotic Arm 105A is illustrated in FIG. 1, in some embodiments there may be multiple devices. As examples, there may be one Robotic Arm 105A on each side of an operating table T or two devices on one side of the table T. The Robotic Arm 105A may be mounted directly to the table T, be located next to the table T on a floor platform (not shown), mounted on a floor-to-ceiling pole, or mounted on a wall or ceiling of an operating room. The floor platform may be fixed or moveable. In one particular embodiment, the robotic arm 105A is mounted on a floor-to-ceiling pole located between the patient's legs or feet. In some embodiments, the End Effector 105B may include a suture holder or a stapler to assist in closing wounds. Further, in the case of two robotic arms 105A, the surgical computer 150 can drive the robotic arms 105A to work together to suture the wound at closure. Alternatively, the surgical computer 150 can drive one or more robotic arms 105A to staple the wound at closure.

The Effector Platform 105 can include a Limb Positioner 105C for positioning the patient's limbs during surgery. One example of a Limb Positioner 105C is the SMITH AND NEPHEW SPIDER2 system. The Limb Positioner 105C may be operated manually by the surgeon or alternatively change limb positions based on instructions received from the Surgical Computer 150 (described below). While one Limb Positioner 105C is illustrated in FIG. 1, in some embodiments there may be multiple devices. As examples, there may be one Limb Positioner 105C on each side of the operating table T or two devices on one side of the table T. The Limb Positioner 105C may be mounted directly to the table T, be located next to the table T on a floor platform (not shown), mounted on a pole, or mounted on a wall or ceiling of an operating room. In some embodiments, the Limb Positioner 105C can be used in non-conventional ways, such as a retractor or specific bone holder. The Limb Positioner 105C may include, as examples, an ankle boot, a soft tissue clamp, a bone clamp, or a soft-tissue retractor spoon, such as a hooked, curved, or angled blade. In some embodiments, the Limb Positioner 105C may include a suture holder to assist in closing wounds.

The Effector Platform 105 may include tools, such as a screwdriver, light or laser, to indicate an axis or plane, bubble level, pin driver, pin puller, plane checker, pointer, finger, or some combination thereof.

Resection Equipment 110 (not shown in FIG. 1) performs bone or tissue resection using, for example, mechanical, ultrasonic, or laser techniques. Examples of Resection Equipment 110 include drilling devices, burring devices, oscillatory sawing devices, vibratory impaction devices, reamers, ultrasonic bone cutting devices, radio frequency ablation devices, reciprocating devices (such as a rasp or broach), and laser ablation systems. In some embodiments, the Resection Equipment 110 is held and operated by the surgeon during surgery. In other embodiments, the Effector Platform 105 may be used to hold the Resection Equipment 110 during use.

The Effector Platform 105 also can include a cutting guide or jig 105D that is used to guide saws or drills used to resect tissue during surgery. Such cutting guides 105D can be formed integrally as part of the Effector Platform 105 or Robotic Arm 105A, or cutting guides can be separate structures that can be matingly and/or removably attached to the Effector Platform 105 or Robotic Arm 105A. The Effector Platform 105 or Robotic Arm 105A can be controlled by the CASS 100 to position a cutting guide or jig 105D adjacent to the patient's anatomy in accordance with a pre-operatively or intraoperatively developed surgical plan such that the cutting guide or jig will produce a precise bone cut in accordance with the surgical plan.

The Tracking System 115 uses one or more sensors to collect real-time position data that locates the patient's anatomy and surgical instruments. For example, for TKA procedures, the Tracking System may provide a location and orientation of the End Effector 105B during the procedure. In addition to positional data, data from the Tracking System 115 also can be used to infer velocity/acceleration of anatomy/instrumentation, which can be used for tool control. In some embodiments, the Tracking System 115 may use a tracker array attached to the End Effector 105B to determine the location and orientation of the End Effector 105B. The position of the End Effector 105B may be inferred based on the position and orientation of the Tracking System 115 and a known relationship in three-dimensional space between the Tracking System 115 and the End Effector 105B. Various types of tracking systems may be used in various embodiments of the present invention including, without limitation, Infrared (IR) tracking systems, electromagnetic (EM) tracking systems, video or image based tracking systems, and ultrasound registration and tracking systems. Using the data provided by the tracking system 115, the surgical computer 150 can detect objects and prevent collision. For example, the surgical computer 150 can prevent the Robotic Arm 105A and/or the End Effector 105B from colliding with soft tissue.

Any suitable tracking system can be used for tracking surgical objects and patient anatomy in the surgical theatre. For example, a combination of IR and visible light cameras can be used in an array. Various illumination sources, such as an IR LED light source, can illuminate the scene allowing three-dimensional imaging to occur. In some embodiments, this can include stereoscopic, tri-scopic, quad-scopic, etc. imaging. In addition to the camera array, which in some embodiments is affixed to a cart, additional cameras can be placed throughout the surgical theatre. For example, hand-held tools or headsets worn by operators/surgeons can include imaging capability that communicates images back to a central processor to correlate those images with images captured by the camera array. This can give a more robust image of the environment for modeling using multiple perspectives. Furthermore, some imaging devices may be of suitable resolution or have a suitable perspective on the scene to pick up information stored in quick response (QR) codes or barcodes. This can be helpful in identifying specific objects not manually registered with the system. In some embodiments, the camera may be mounted on the Robotic Arm 105A.

Although, as discussed herein, the majority of tracking and/or navigation techniques utilize image-based tracking systems (e.g., IR tracking systems, video or image based tracking systems, etc.). However, electromagnetic (EM) based tracking systems are becoming more common for a variety of reasons. For example, implantation of standard optical trackers requires tissue resection (e.g., down to the cortex) as well as subsequent drilling and driving of cortical pins. Additionally, because optical trackers require a direct line of sight with a tracking system, the placement of such trackers may need to be far from the surgical site to ensure they do not restrict the movement of a surgeon or medical professional.

Figure 2:
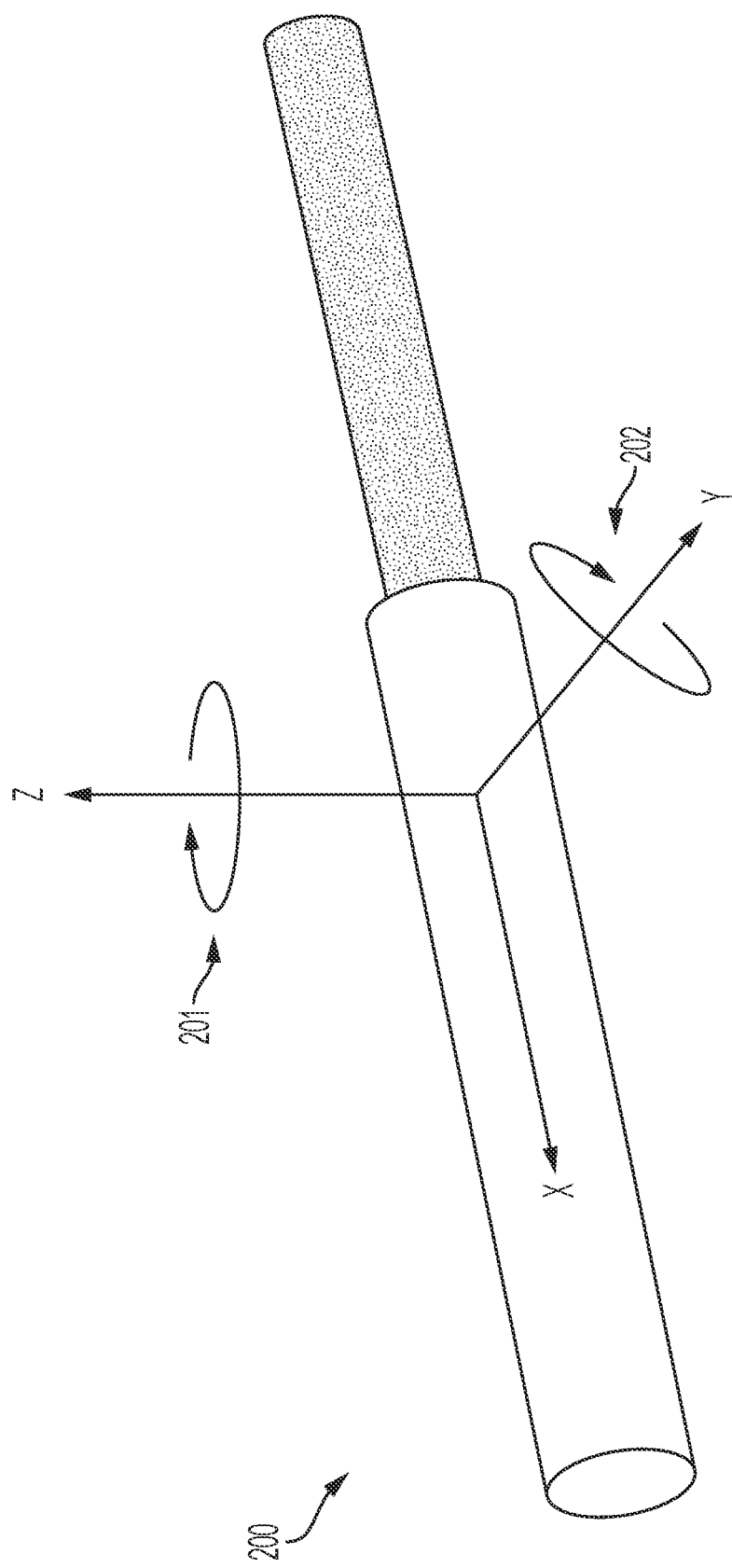
FIG. 2 depicts an example of an electromagnetic sensor device according to some embodiments.

Generally, EM based tracking devices include one or more wire coils and a reference field generator. The one or more wire coils may be energized (e.g., via a wired or wireless power supply). Once energized, the coil creates an electromagnetic field that can be detected and measured (e.g., by the reference field generator or an additional device) in a manner that allows for the location and orientation of the one or more wire coils to be determined. As should be understood by someone of ordinary skill in the art, a single coil, such as is shown in FIG. 2, is limited to detecting five (5) total degrees-of-freedom (DOF). For example, sensor 200 may be able to track/determine movement in the X, Y, or Z direction, as well as rotation around the Y-axis 202 or Z-axis 201. However, because of the electromagnetic properties of a coil, it is not possible to properly track rotational movement around the X axis.

Accordingly, in most electromagnetic tracking applications, a three coil system, such as that shown in FIG. 3A is used to enable tracking in all six degrees of freedom that are possible for a rigid body moving in a three-dimensional space (i.e., forward/backward 310, up/down 320, left/right 330, roll 340, pitch 350, and yaw 360). However, the inclusion of two additional coils and the 90° offset angles at which they are positioned may require the tracking device to be much larger. Alternatively, as one of skill in the art would know, less than three full coils may be used to track all 6DOF. In some EM based tracking devices, two coils may be affixed to each other, such as is shown in FIG. 3B. Because the two coils 301B and 302B are rigidly affixed to each other, not perfectly parallel, and have locations that are known relative to each other, it is possible to determine the sixth degree of freedom 303B with this arrangement.

Although the use of two affixed coils (e.g., 301B and 302B) allows for EM based tracking in 6DOF, the sensor device is substantially larger in diameter than a single coil because of the additional coil. Thus, the practical application of using an EM based tracking system in a surgical environment may require tissue resection and drilling of a portion of the patient bone to allow for insertion of a EM tracker. Alternatively, in some embodiments, it may be possible to implant/insert a single coil, or SDOF EM tracking device, into a patient bone using only a pin (e.g., without the need to drill or carve out substantial bone).

Thus, as described herein, a solution is needed for which the use of an EM tracking system can be restricted to devices small enough to be inserted/embedded using a small diameter needle or pin (i.e., without the need to create a new incision or large diameter opening in the bone). Accordingly, in some embodiments, a second SDOF sensor, which is not attached to the first, and thus has a small diameter, may be used to track all 6DOF. Referring now to FIG. 3C, in some embodiments, two SDOF EM sensors (e.g., 301C and 302C) may be inserted into the patient (e.g., in a patient bone) at different locations and with different angular orientations (e.g., angle 303C is non-zero).

Figure 4:
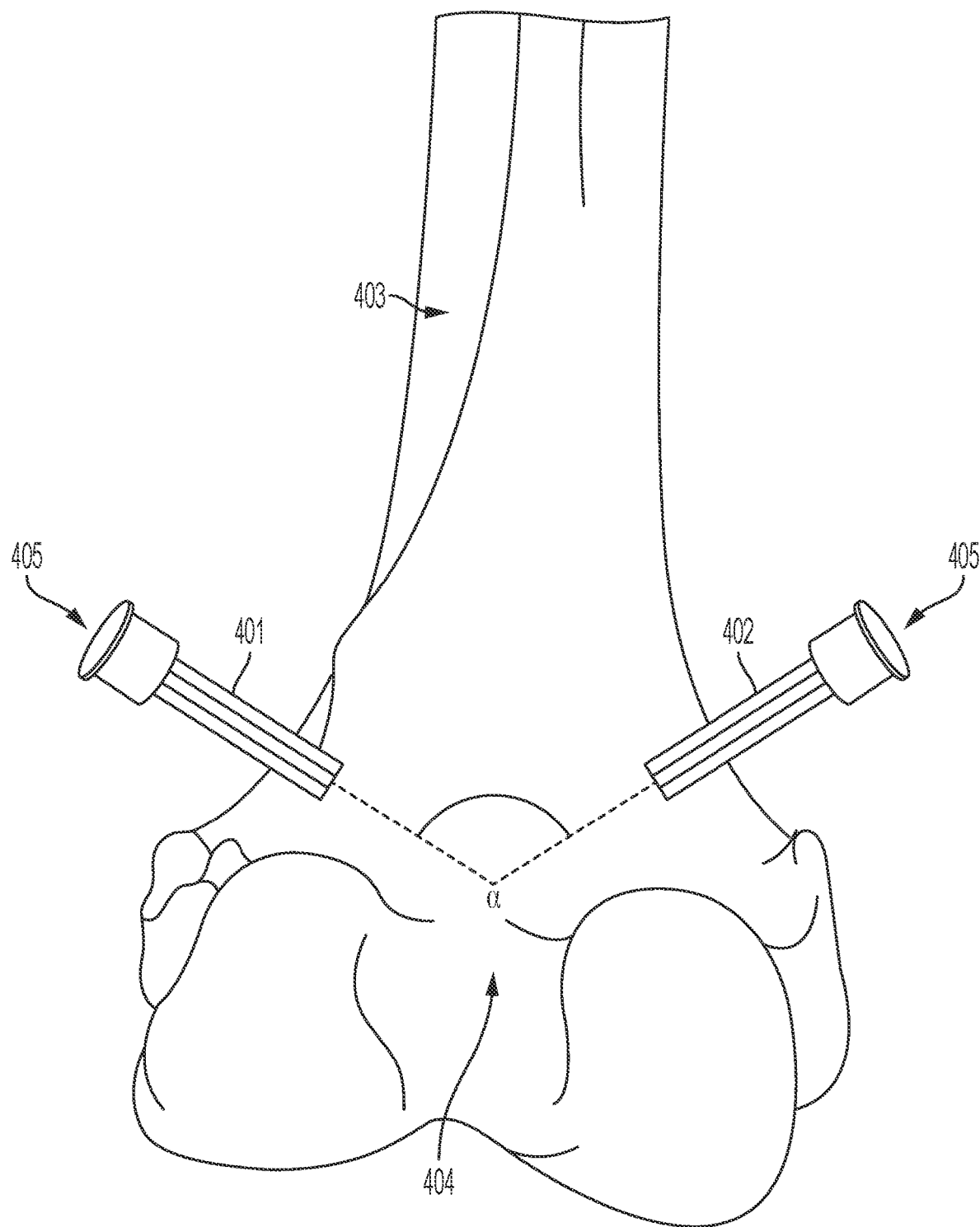
FIG. 4 depicts an example of electromagnetic sensor devices and a patient bone according to some embodiments

Referring now to FIG. 4, an example embodiment is shown in which a first SDOF EM sensor 401 and a second SDOF EM sensor 402 are inserted into the patient bone 403 using a standard hollow needle 405 that is typical in most OR(s). In a further embodiment, the first sensor 401 and the second sensor 402 may have an angle offset of "!" 404. In some embodiments, it may be necessary for the offset angle "!" 404 to be greater than a predetermined value (e.g., a minimum angle of 0.50°, 0.75°, etc.). This minimum value may, in some embodiments, be determined by the CASS and provided to the surgeon or medical professional during the surgical plan. In some embodiments, a minimum value may be based on one or more factors, such as, for example, the orientation accuracy of the tracking system, a distance between the first and second EM sensors. The location of the field generator, a location of the field detector, a type of EM sensor, a quality of the EM sensor, patient anatomy, and the like.

Accordingly, as discussed herein, in some embodiments, a pin/needle (e.g., a cannulated mounting needle, etc.) may be used to insert one or more EM sensors. Generally, the pin/needle would be a disposable component, while the sensors themselves may be reusable. However, it should be understood that this is only one potential system, and that various other systems may be used in which the pin/needle and/or EM sensors are independently disposable or reusable. In a further embodiment, the EM sensors may be affixed to the mounting needle/pin (e.g., using a luer-lock fitting or the like), which can allow for quick assembly and disassembly. In additional embodiments, the EM sensors may utilize an alternative sleeve and/or anchor system that allows for minimally invasive placement of the sensors.

In another embodiment, the above systems may allow for a multi-sensor navigation system that can detect and correct for field distortions that plague electromagnetic tracking systems. It should be understood that field distortions may result from movement of any ferromagnetic materials within the reference field. Thus, as one of ordinary skill in the art would know, a typical OR has a large number of devices (e.g., an operating table, LCD displays, lighting equipment, imaging systems, surgical instruments, etc.) that may cause interference. Furthermore, field distortions are notoriously difficult to detect. The use of multiple EM sensors enables the system to detect field distortions accurately, and/or to warn a user that the current position measurements may not be accurate. Because the sensors are rigidly fixed to the bony anatomy (e.g., via the pin/needle), relative measurement of sensor positions (X, Y, Z) may be used to detect field distortions. By way of non-limiting example, in some embodiments, after the EM sensors are fixed to the bone, the relative distance between the two sensors is known and should remain constant. Thus, any change in this distance could indicate the presence of a field distortion.

In some embodiments, specific objects can be manually registered by a surgeon with the system preoperatively or intraoperatively. For example, by interacting with a user interface, a surgeon may identify the starting location for a tool or a bone structure. By tracking fiducial marks associated with that tool or bone structure, or by using other conventional image tracking modalities, a processor may track that tool or bone as it moves through the environment in a three-dimensional model. In other examples, 2D to 3D methods could be used as a pre-alignment or planning step that provides a guideline and plan or positioned raw-data that could be used to see the bone modelling portion of the robotic system.

In some embodiments, certain markers, such as fiducial marks that identify individuals, important tools, or bones in the theater may include passive or active identifiers that can be picked up by a camera or camera array associated with the tracking system. For example, an IR LED can flash a pattern that conveys a unique identifier to the source of that pattern, providing a dynamic identification mark. Similarly, one or two dimensional optical codes (barcode, QR code, etc.) can be affixed to objects in the theater to provide passive identification that can occur based on image analysis. If these codes are placed asymmetrically on an object, they also can be used to determine an orientation of an object by comparing the location of the identifier with the extents of an object in an image. For example, a QR code may be placed in a corner of a tool tray, allowing the orientation and identity of that tray to be tracked. Other tracking modalities are explained throughout. For example, in some embodiments, augmented reality headsets can be worn by surgeons and other staff to provide additional camera angles and tracking capabilities.

In addition to optical tracking, certain features of objects can be tracked by registering physical properties of the object and associating them with objects that can be tracked, such as fiducial marks fixed to a tool or bone. For example, a surgeon may perform a manual registration process whereby a tracked tool and a tracked bone can be manipulated relative to one another. By impinging the tip of the tool against the surface of the bone, a three-dimensional surface can be mapped for that bone that is associated with a position and orientation relative to the frame of reference of that fiducial mark. By optically tracking the position and orientation (pose) of the fiducial mark associated with that bone, a model of that surface can be tracked with an environment through extrapolation.

The registration process that registers the CASS 100 to the relevant anatomy of the patient also can involve the use of anatomical landmarks, such as landmarks on a bone or cartilage. For example, the CASS 100 can include a 3D model of the relevant bone or joint and the surgeon can intraoperatively collect data regarding the location of bony landmarks on the patient's actual bone using a probe that is connected to the CASS. Bony landmarks can include, for example, the medial malleolus and lateral malleolus, the ends of the proximal femur and distal tibia, and the center of the hip joint. The CASS 100 can compare and register the location data of bony landmarks collected by the surgeon with the probe with the location data of the same landmarks in the 3D model. Alternatively, the CASS 100 can construct a 3D model of the bone or joint without pre-operative image data by using location data of bony landmarks and the bone surface that are collected by the surgeon using a CASS probe or other means. The registration process also can include determining various axes of a joint. For example, for a TKA the surgeon can use the CASS 100 to determine the anatomical and mechanical axes of the femur and tibia. The surgeon and the CASS 100 can identify the center of the hip joint by moving the patient's leg in a spiral direction (i.e., circumduction) so the CASS can determine where the center of the hip joint is located.

A Tissue Navigation System 120 (not shown in FIG. 1) provides the surgeon with intraoperative, real-time visualization for the patient's bone, cartilage, muscle, nervous, and/or vascular tissues surrounding the surgical area. Examples of systems that may be employed for tissue navigation include fluorescent imaging systems and ultrasound systems.

The Display 125 provides graphical user interfaces (GUIs) that display images collected by the Tissue Navigation System 120 as well other information relevant to the surgery. For example, in one embodiment, the Display 125 overlays image information collected from various modalities (e.g., CT, MRI, X-ray, fluorescent, ultrasound, etc.) collected pre-operatively or intra-operatively to give the surgeon various views of the patient's anatomy as well as real-time conditions. The Display 125 may include, for example, one or more computer monitors. As an alternative or supplement to the Display 125, one or more members of the surgical staff may wear an Augmented Reality (AR) Head Mounted Device (HMD). For example, in FIG. 1 the Surgeon 111 is wearing an AR HMD 155 that may, for example, overlay pre-operative image data on the patient or provide surgical planning suggestions. Various example uses of the AR HMD 155 in surgical procedures are detailed in the sections that follow.

Surgical Computer 150 provides control instructions to various components of the CASS 100, collects data from those components, and provides general processing for various data needed during surgery. In some embodiments, the Surgical Computer 150 is a general purpose computer. In other embodiments, the Surgical Computer 150 may be a parallel computing platform that uses multiple central processing units (CPUs) or graphics processing units (GPU) to perform processing. In some embodiments, the Surgical Computer 150 is connected to a remote server over one or more computer networks (e.g., the Internet). The remote server can be used, for example, for storage of data or execution of computationally intensive processing tasks.

Various techniques generally known in the art can be used for connecting the Surgical Computer 150 to the other components of the CASS 100. Moreover, the computers can connect to the Surgical Computer 150 using a mix of technologies. For example, the End Effector 105B may connect to the Surgical Computer 150 over a wired (i.e., serial) connection. The Tracking System 115, Tissue Navigation System 120, and Display 125 can similarly be connected to the Surgical Computer 150 using wired connections. Alternatively, the Tracking System 115, Tissue Navigation System 120, and Display 125 may connect to the Surgical Computer 150 using wireless technologies such as, without limitation, Wi-Fi, Bluetooth, Near Field Communication (NFC), or ZigBee.

Powered Impaction and Acetabular Reamer Devices

Part of the flexibility of the CASS design described above with respect to FIG. 1 is that additional or alternative devices can be added to the CASS 100 as necessary to support particular surgical procedures. For example, in the context of hip surgeries, the CASS 100 may include a powered impaction device. Impaction devices are designed to repeatedly apply an impaction force that the surgeon can use to perform activities such as implant alignment. For example, within a total hip arthroplasty (THA), a surgeon will often insert a prosthetic acetabular cup into the implant host's acetabulum using an impaction device. Although impaction devices can be manual in nature (e.g., operated by the surgeon striking an impactor with a mallet), powered impaction devices are generally easier and quicker to use in the surgical setting. Powered impaction devices may be powered, for example, using a battery attached to the device. Various attachment pieces may be connected to the powered impaction device to allow the impaction force to be directed in various ways as needed during surgery. Also, in the context of hip surgeries, the CASS 100 may include a powered, robotically controlled end effector to ream the acetabulum to accommodate an acetabular cup implant.

In a robotically-assisted THA, the patient's anatomy can be registered to the CASS 100 using CT or other image data, the identification of anatomical landmarks, tracker arrays attached to the patient's bones, and one or more cameras. Tracker arrays can be mounted on the iliac crest using clamps and/or bone pins and such trackers can be mounted externally through the skin or internally (either posterolaterally or anterolaterally) through the incision made to perform the THA. For a THA, the CASS 100 can utilize one or more femoral cortical screws inserted into the proximal femur as checkpoints to aid in the registration process. The CASS 100 also can utilize one or more checkpoint screws inserted into the pelvis as additional checkpoints to aid in the registration process. Femoral tracker arrays can be secured to or mounted in the femoral cortical screws. The CASS 100 can employ steps where the registration is verified using a probe that the surgeon precisely places on key areas of the proximal femur and pelvis identified for the surgeon on the display 125. Trackers can be located on the robotic arm 105A or end effector 105B to register the arm and/or end effector to the CASS 100. The verification step also can utilize proximal and distal femoral checkpoints. The CASS 100 can utilize color prompts or other prompts to inform the surgeon that the registration process for the relevant bones and the robotic arm 105A or end effector 105B has been verified to a certain degree of accuracy (e.g., within 1 mm).

For a THA, the CASS 100 can include a broach tracking option using femoral arrays to allow the surgeon to intra-operatively capture the broach position and orientation and calculate hip length and offset values for the patient. Based on information provided about the patient's hip joint and the planned implant position and orientation after broach tracking is completed, the surgeon can make modifications or adjustments to the surgical plan.

For a robotically-assisted THA, the CASS 100 can include one or more powered reamers connected or attached to a robotic arm 105A or end effector 105B that prepares the pelvic bone to receive an acetabular implant according to a surgical plan. The robotic arm 105A and/or end effector 105B can inform the surgeon and/or control the power of the reamer to ensure that the acetabulum is being resected (reamed) in accordance with the surgical plan. For example, if the surgeon attempts to resect bone outside of the boundary of the bone to be resected in accordance with the surgical plan, the CASS 100 can power off the reamer or instruct the surgeon to power off the reamer. 2D to 3D modeling methods can provide greater confidence with respect to bone volume predictions, such as for areas of the bone that are inaccessible to a probe. The CASS 100 can provide the surgeon with an option to turn off or disengage the robotic control of the reamer. The display 125 can depict the progress of the bone being resected (reamed) as compared to the surgical plan using different colors. The surgeon can view the display of the bone being resected (reamed) to guide the reamer to complete the reaming in accordance with the surgical plan. The CASS 100 can provide visual or audible prompts to the surgeon to warn the surgeon that resections are being made that are not in accordance with the surgical plan.

Following reaming, the CASS 100 can employ a manual or powered impactor that is attached or connected to the robotic arm 105A or end effector 105B to impact trial implants and final implants into the acetabulum. The robotic arm 105A and/or end effector 105B can be used to guide the impactor to impact the trial and final implants into the acetabulum in accordance with the surgical plan. The CASS 100 can cause the position and orientation of the trial and final implants vis-à-vis the bone to be displayed to inform the surgeon as to how the trial and final implant's orientation and position compare to the surgical plan, and the display 125 can show the implant's position and orientation as the surgeon manipulates the leg and hip. The CASS 100 can provide the surgeon with the option of re-planning and re-doing the reaming and implant impaction by preparing a new surgical plan if the surgeon is not satisfied with the original implant position and orientation.

Preoperatively, the CASS 100 can develop a proposed surgical plan based on a three dimensional model of the hip joint and other information specific to the patient, such as the mechanical and anatomical axes of the leg bones, the epicondylar axis, the femoral neck axis, the dimensions (e.g., length) of the femur and hip, the midline axis of the hip joint, the ASIS axis of the hip joint, and the location of anatomical landmarks such as the lesser trochanter landmarks, the distal landmark, and the center of rotation of the hip joint. The CASS-developed surgical plan can provide a recommended optimal implant size and implant position and orientation based on the three dimensional model of the hip joint and other information specific to the patient. The CASS-developed surgical plan can include proposed details on offset values, inclination and anteversion values, center of rotation, cup size, medialization values, superior-inferior fit values, femoral stem sizing and length.

For a THA, the CASS-developed surgical plan can be viewed preoperatively and intraoperatively, and the surgeon can modify CASS-developed surgical plan preoperatively or intraoperatively. The CASS-developed surgical plan can display the planned resection to the hip joint and superimpose the planned implants onto the hip joint based on the planned resections. The CASS 100 can provide the surgeon with options for different surgical workflows that will be displayed to the surgeon based on a surgeon's preference. For example, the surgeon can choose from different workflows based on the number and types of anatomical landmarks that are checked and captured and/or the location and number of tracker arrays used in the registration process.

According to some embodiments, a powered impaction device used with the CASS 100 may operate with a variety of different settings. In some embodiments, the surgeon adjusts settings through a manual switch or other physical mechanism on the powered impaction device. In other embodiments, a digital interface may be used that allows setting entry, for example, via a touchscreen on the powered impaction device. Such a digital interface may allow the available settings to vary based, for example, on the type of attachment piece connected to the power attachment device. In some embodiments, rather than adjusting the settings on the powered impaction device itself, the settings can be changed through communication with a robot or other computer system within the CASS 100. Such connections may be established using, for example, a Bluetooth or Wi-Fi networking module on the powered impaction device. In another embodiment, the impaction device and end pieces may contain features that allow the impaction device to be aware of what end piece (cup impactor, broach handle, etc.) is attached with no action required by the surgeon, and adjust the settings accordingly. This may be achieved, for example, through a QR code, barcode, RFID tag, or other method.

Examples of the settings that may be used include cup impaction settings (e.g., single direction, specified frequency range, specified force and/or energy range); broach impaction settings (e.g., dual direction/oscillating at a specified frequency range, specified force and/or energy range); femoral head impaction settings (e.g., single direction/single blow at a specified force or energy); and stem impaction settings (e.g., single direction at specified frequency with a specified force or energy). Additionally, in some embodiments, the powered impaction device includes settings related to acetabular liner impaction (e.g., single direction/single blow at a specified force or energy). There may be a plurality of settings for each type of liner such as poly, ceramic, oxinium, or other materials. Furthermore, the powered impaction device may offer settings for different bone quality based on preoperative testing/imaging/knowledge and/or intraoperative assessment by surgeon. In some embodiments, the powered impactor device may have a dual function. For example, the powered impactor device not only could provide reciprocating motion to provide an impact force, but also could provide reciprocating motion for a broach or rasp.

In some embodiments, the powered impaction device includes feedback sensors that gather data during instrument use and send data to a computing device, such as a controller within the device or the Surgical Computer 150. This computing device can then record the data for later analysis, such as via radio-opaque tattoos that provide pre-operative, intra-operative, and/or post-operative registration capabilities. Examples of the data that may be collected include, without limitation, sound waves, the predetermined resonance frequency of each instrument, reaction force or rebound energy from patient bone, location of the device with respect to imaging (e.g., fluoro, CT, ultrasound, MRI, etc.) registered bony anatomy, and/or external strain gauges on bones.

Once the data is collected, the computing device may execute one or more algorithms in real-time or near real-time to aid the surgeon in performing the surgical procedure. For example, in some embodiments, the computing device uses the collected data to derive information such as the proper final broach size (femur); when the stem is fully seated (femur side); or when the cup is seated (depth and/or orientation) for a THA. Once the information is known, it may be displayed for the surgeon's review, or it may be used to activate haptics or other feedback mechanisms to guide the surgical procedure.

Additionally, the data derived from the aforementioned algorithms may be used to drive operation of the device. For example, during insertion of a prosthetic acetabular cup with a powered impaction device, the device may automatically extend an impaction head (e.g., an end effector) moving the implant into the proper location, or turn the power off to the device once the implant is fully seated. In one embodiment, the derived information may be used to automatically adjust settings for quality of bone where the powered impaction device should use less power to mitigate femoral/acetabular/pelvic fracture or damage to surrounding tissues.

Robotic Arm

In some embodiments, the CASS 100 includes a robotic arm 105A that serves as an interface to stabilize and hold a variety of instruments used during the surgical procedure. For example, in the context of a hip surgery, these instruments may include, without limitation, retractors, a sagittal or reciprocating saw, the reamer handle, the cup impactor, the broach handle, and the stem inserter. The robotic arm 105A may have multiple degrees of freedom (like a Spider device), and have the ability to be locked in place (e.g., by a press of a button, voice activation, a surgeon removing a hand from the robotic arm, or other method).

In some embodiments, movement of the robotic arm 105A may be effectuated by use of a control panel built into the robotic arm system. For example, a display screen may include one or more input sources, such as physical buttons or a user interface having one or more icons, that direct movement of the robotic arm 105A. The surgeon or other healthcare professional may engage with the one or more input sources to position the robotic arm 105A when performing a surgical procedure.

A tool or an end effector 105B attached or integrated into a robotic arm 105A may include, without limitation, a burring device, a scalpel, a cutting device, a retractor, a joint tensioning device, any type of dimensional measuring device, or the like. In one particular example, the robotic arm 105A can be positioned to obtain relatively accurate measurements of bone size or shape. In another examples, the robotic arm 105A can have jaws or another device that opens to a width of a known implant size so the surgeon can make quick decisions about correct sizing or placement of the implant. In embodiments in which an end effector 105B is used, the end effector may be positioned at the end of the robotic arm 105A such that any motor control operations are performed within the robotic arm system. In embodiments in which a tool is used, the tool may be secured at a distal end of the robotic arm 105A, but motor control operation may reside within the tool itself.

The robotic arm 105A may be motorized internally to both stabilize the robotic arm, thereby preventing it from falling and hitting the patient, surgical table, surgical staff, etc., and to allow the surgeon to move the robotic arm without having to fully support its weight. While the surgeon is moving the robotic arm 105A, the robotic arm may provide some resistance to prevent the robotic arm from moving too fast or having too many degrees of freedom active at once. The position and the lock status of the robotic arm 105A may be tracked, for example, by a controller or the Surgical Computer 150.

In some embodiments, the robotic arm 105A can be moved by hand (e.g., by the surgeon) or with internal motors into its ideal position and orientation for the task being performed. In some embodiments, the robotic arm 105A may be enabled to operate in a "free" mode that allows the surgeon to position the arm into a desired position without being restricted. While in the free mode, the position and orientation of the robotic arm 105A may still be tracked as described above. In one embodiment, certain degrees of freedom can be selectively released upon input from user (e.g., surgeon) during specified portions of the surgical plan tracked by the Surgical Computer 150. Designs in which a robotic arm 105A is internally powered through hydraulics or motors or provides resistance to external manual motion through similar means can be described as powered robotic arms, while arms that are manually manipulated without power feedback, but which may be manually or automatically locked in place, may be described as passive robotic arms.

A robotic arm 105A or end effector 105B can include a trigger or other means to control the power of a saw or drill. Engagement of the trigger or other means by the surgeon can cause the robotic arm 105A or end effector 105B to transition from a motorized alignment mode to a mode where the saw or drill is engaged and powered on. Additionally, the CASS 100 can include a foot pedal (not shown), a voice-activated control system, or AR system that causes the system to perform certain functions when activated. In one example, the user views a knee, aligns it with a template and then informs the AR system that the current view represents an aligned bone. That reference view informs the initial robotic arm 105A position that can then be further fine-tuned by the operator. More specifically, the system positions the robotic arm 105A using the input to triangulate a rough starting pose. In the case of a passive arm, the magnetic clutch could lock down when any of the joints reach their desired position. The operator simply moves the arm until all of the joints lock in place in this example. The user is subsequently free to make fine adjustments (with or without an AR assist).

In another example, the surgeon can activate the foot pedal to instruct the CASS 100 to place the robotic arm 105A or end effector 105B in an automatic mode that brings the robotic arm or end effector into the proper position with respect to the patient's anatomy in order to perform the necessary resections. The CASS 100 also can place the robotic arm 105A or end effector 105B in a collaborative mode that allows the surgeon to manually manipulate and position the robotic arm or end effector into a particular location. The collaborative mode can be configured to allow the surgeon to move the robotic arm 105A or end effector 105B medially or laterally, while restricting movement in other directions. As discussed, the robotic arm 105A or end effector 105B can include a cutting device (saw, drill, and burr) or a cutting guide or jig 105D that will guide a cutting device. In other embodiments, movement of the robotic arm 105A or robotically controlled end effector 105B can be controlled entirely by the CASS 100 without any, or with only minimal, assistance or input from a surgeon or other medical professional. In still other embodiments, the movement of the robotic arm 105A or robotically controlled end effector 105B can be controlled remotely by a surgeon or other medical professional using a control mechanism separate from the robotic arm or robotically controlled end effector device, for example using a joystick or interactive monitor or display control device.

The examples below describe uses of the robotic device in the context of a hip surgery; however, it should be understood that the robotic arm may have other applications for surgical procedures involving knees, shoulders, etc. One example of use of a robotic arm in the context of forming an anterior cruciate ligament (ACL) graft tunnel is described in WIPO Publication No. WO 2020/047051, filed Aug. 28, 2019, entitled "Robotic Assisted Ligament Graft Placement and Tensioning," the entirety of which is incorporated herein by reference.

A robotic arm 105A may be used for holding the retractor. For example in one embodiment, the robotic arm 105A may be moved into the desired position by the surgeon. At that point, the robotic arm 105A may lock into place. In some embodiments, the robotic arm 105A is provided with data regarding the patient's position, such that if the patient moves, the robotic arm can adjust the retractor position accordingly. In some embodiments, multiple robotic arms may be used, thereby allowing multiple retractors to be held or for more than one activity to be performed simultaneously (e.g., retractor holding & reaming)

The robotic arm 105A may also be used to help stabilize the surgeon's hand while making a femoral neck cut. In this application, control of the robotic arm 105A may impose certain restrictions to prevent soft tissue damage from occurring. For example, in one embodiment, the Surgical Computer 150 tracks the position of the robotic arm 105A as it operates. If the tracked location approaches an area where tissue damage is predicted, a command may be sent to the robotic arm 105A causing it to stop. Alternatively, where the robotic arm 105A is automatically controlled by the Surgical Computer 150, the Surgical Computer may ensure that the robotic arm is not provided with any instructions that cause it to enter areas where soft tissue damage is likely to occur. The Surgical Computer 150 may impose certain restrictions on the surgeon to prevent the surgeon from reaming too far into the medial wall of the acetabulum or reaming at an incorrect angle or orientation.

In some embodiments, the robotic arm 105A may be used to hold a cup impactor at a desired angle or orientation during cup impaction. When the final position has been achieved, the robotic arm 105A may prevent any further seating to prevent damage to the pelvis.

The surgeon may use the robotic arm 105A to position the broach handle at the desired position and allow the surgeon to impact the broach into the femoral canal at the desired orientation. In some embodiments, once the Surgical Computer 150 receives feedback that the broach is fully seated, the robotic arm 105A may restrict the handle to prevent further advancement of the broach.

The robotic arm 105A may also be used for resurfacing applications. For example, the robotic arm 105A may stabilize the surgeon while using traditional instrumentation and provide certain restrictions or limitations to allow for proper placement of implant components (e.g., guide wire placement, chamfer cutter, sleeve cutter, plan cutter, etc.). Where only a burr is employed, the robotic arm 105A may stabilize the surgeon's handpiece and may impose restrictions on the handpiece to prevent the surgeon from removing unintended bone in contravention of the surgical plan.

The robotic arm 105A may be a passive arm. As an example, the robotic arm 105A may be a CIRQ robot arm available from Brainlab AG. CIRQ is a registered trademark of Brainlab AG, Olof-Palme-Str. 9 81829, Munchen, FED REP of GERMANY. In one particular embodiment, the robotic arm 105A is an intelligent holding arm as disclosed in U.S. ptent application Ser. No. 15/525,585 to Krinninger et al., U.S. patent application Ser. No. 15/561,042 to Nowatschin et al., U.S. patent application Ser. No. 15/561,048 to Nowatschin et al., and U.S. Pat. No. 10,342,636 to Nowatschin et al., the entire contents of each of which is herein incorporated by reference.

Surgical Procedure Data Generation and Collection

The various services that are provided by medical professionals to treat a clinical condition are collectively referred to as an "episode of care." For a particular surgical intervention the episode of care can include three phases: pre-operative, intra-operative, and post-operative. During each phase, data is collected or generated that can be used to analyze the episode of care in order to understand various features of the procedure and identify patterns that may be used, for example, in training models to make decisions with minimal human intervention. The data collected over the episode of care may be stored at the Surgical Computer 150 or the Surgical Data Server 180 as a complete dataset. Thus, for each episode of care, a dataset exists that comprises all of the data collectively pre-operatively about the patient, all of the data collected or stored by the CASS 100 intra-operatively, and any post-operative data provided by the patient or by a healthcare professional monitoring the patient.

As explained in further detail, the data collected during the episode of care may be used to enhance performance of the surgical procedure or to provide a holistic understanding of the surgical procedure and the patient outcomes. For example, in some embodiments, the data collected over the episode of care may be used to generate a surgical plan. In one embodiment, a high-level, pre-operative plan is refined intra-operatively as data is collected during surgery. In this way, the surgical plan can be viewed as dynamically changing in real-time or near real-time as new data is collected by the components of the CASS 100. In other embodiments, pre-operative images or other input data may be used to develop a robust plan preoperatively that is simply executed during surgery. In this case, the data collected by the CASS 100 during surgery may be used to make recommendations that ensure that the surgeon stays within the pre-operative surgical plan. For example, if the surgeon is unsure how to achieve a certain prescribed cut or implant alignment, the Surgical Computer 150 can be queried for a recommendation. In still other embodiments, the pre-operative and intra-operative planning approaches can be combined such that a robust pre-operative plan can be dynamically modified, as necessary or desired, during the surgical procedure. In some embodiments, a biomechanics-based model of patient anatomy contributes simulation data to be considered by the CASS 100 in developing preoperative, intraoperative, and post-operative/rehabilitation procedures to optimize implant performance outcomes for the patient.

Aside from changing the surgical procedure itself, the data gathered during the episode of care may be used as an input to other procedures ancillary to the surgery. For example, in some embodiments, implants can be designed using episode of care data. Example data-driven techniques for designing, sizing, and fitting implants are described in U.S. patent application Ser. No. 13/814,531 filed Aug. 15, 2011 and entitled "Systems and Methods for Optimizing Parameters for Orthopaedic Procedures"; U.S. patent application Ser. No. 14/232,958 filed Jul. 20, 2012 and entitled "Systems and Methods for Optimizing Fit of an Implant to Anatomy"; and U.S. patent application Ser. No. 12/234,444 filed Sep. 19, 2008 and entitled "Operatively Tuning Implants for Increased Performance," the entire contents of each of which are hereby incorporated by reference into this patent application.

Furthermore, the data can be used for educational, training, or research purposes. For example, using the network-based approach described below in FIG. 5C, other doctors or students can remotely view surgeries in interfaces that allow them to selectively view data as it is collected from the various components of the CASS 100. After the surgical procedure, similar interfaces may be used to "playback" a surgery for training or other educational purposes, or to identify the source of any issues or complications with the procedure.

Data acquired during the pre-operative phase generally includes all information collected or generated prior to the surgery. Thus, for example, information about the patient may be acquired from a patient intake form or electronic medical record (EMR). Examples of patient information that may be collected include, without limitation, patient demographics, diagnoses, medical histories, progress notes, vital signs, medical history information, allergies, and lab results. The pre-operative data may also include images related to the anatomical area of interest. These images may be captured, for example, using Magnetic Resonance Imaging (MRI), Computed Tomography (CT), X-ray, ultrasound, or any other modality known in the art. The pre-operative data may also comprise quality of life data captured from the patient. For example, in one embodiment, pre-surgery patients use a mobile application ("app") to answer questionnaires regarding their current quality of life. In some embodiments, preoperative data used by the CASS 100 includes demographic, anthropometric, cultural, or other specific traits about a patient that can coincide with activity levels and specific patient activities to customize the surgical plan to the patient. For example, certain cultures or demographics may be more likely to use a toilet that requires squatting on a daily basis.

Figure 5A:
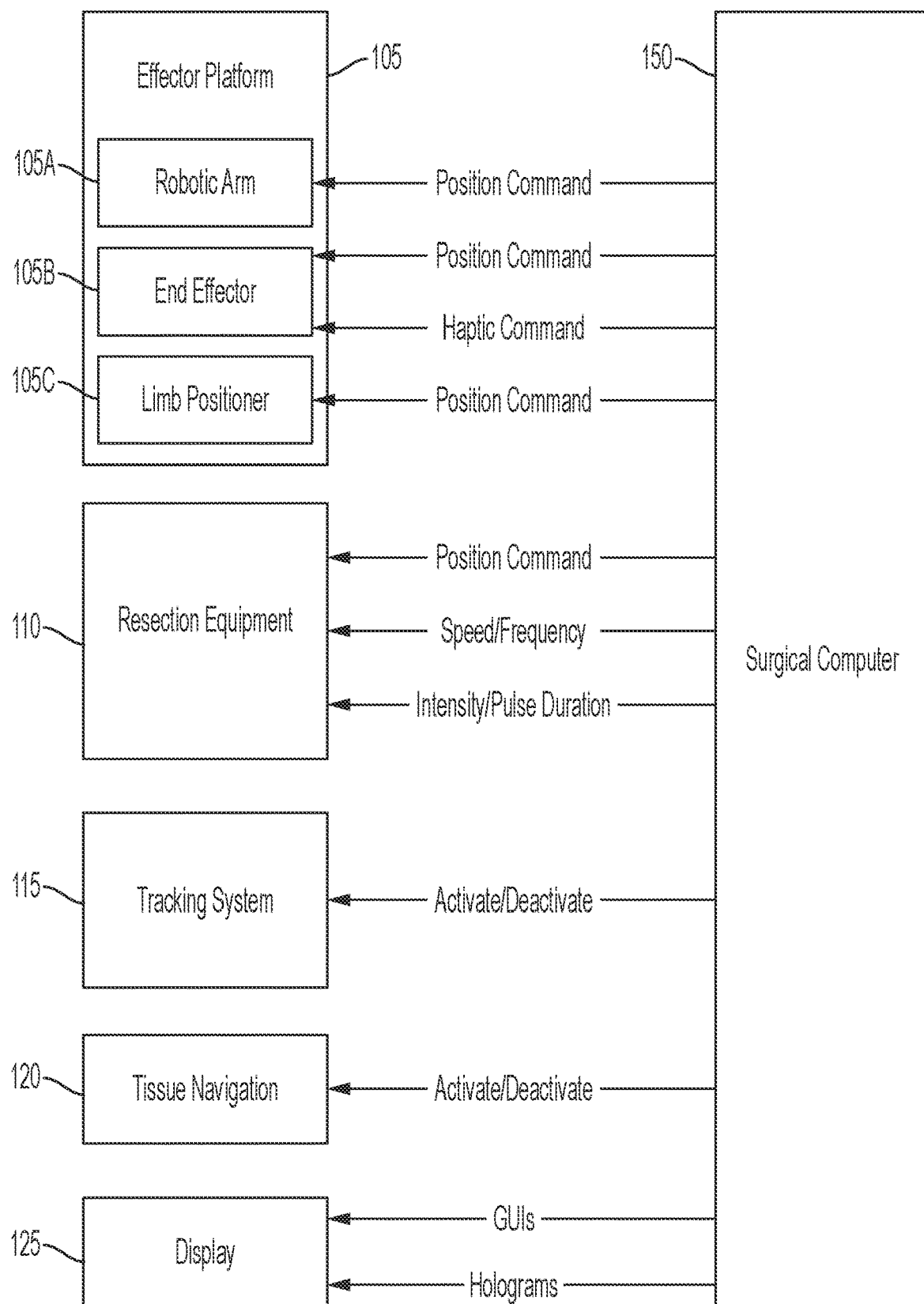
FIG. 5A depicts illustrative control instructions that a surgical computer provides to other components of a CASS in accordance with an embodiment.
Figure 5B:
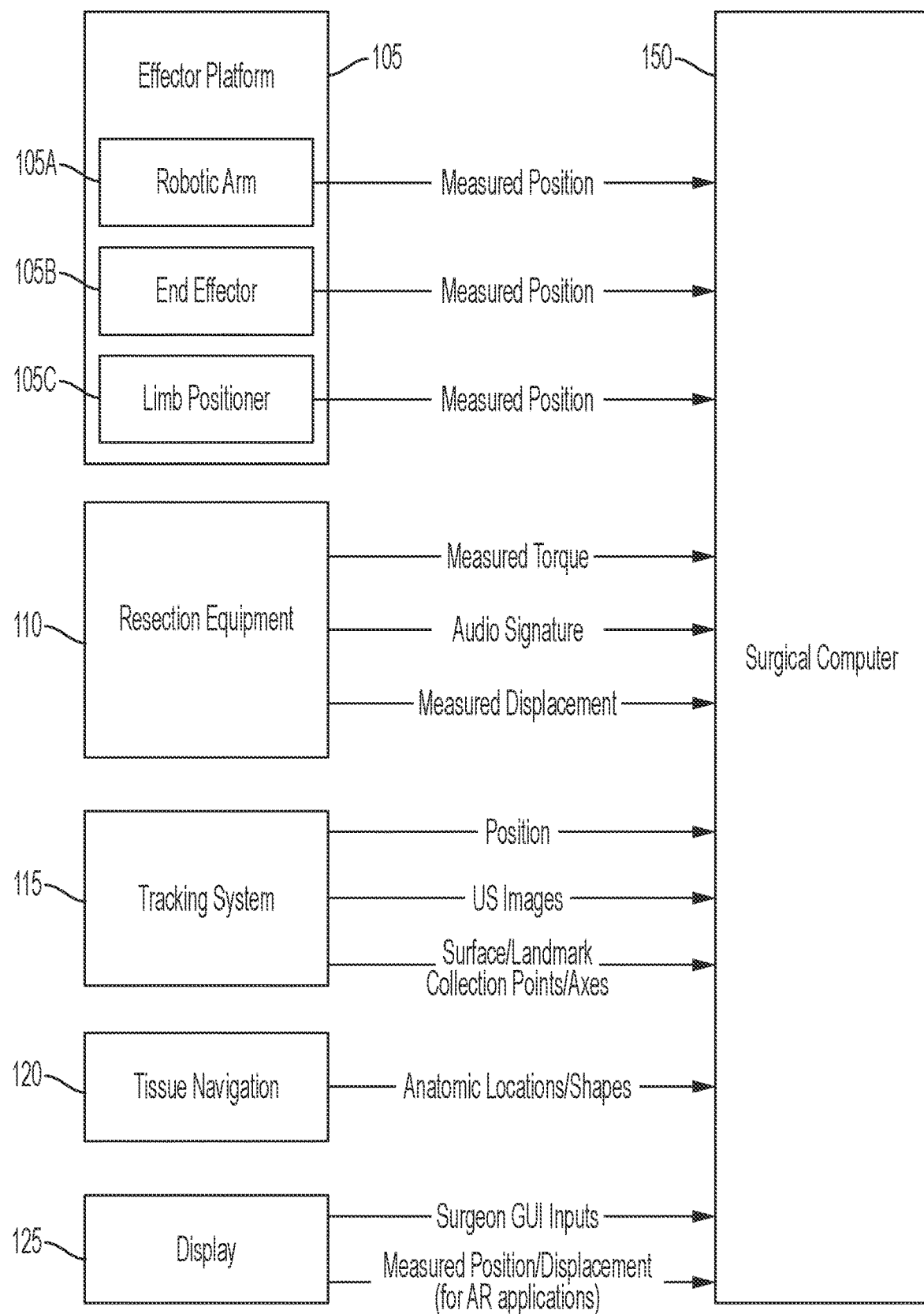
FIG. 5B depicts illustrative control instructions that components of a CASS provide to a surgical computer in accordance with an embodiment.

FIGS. 5A and 5B provide examples of data that may be acquired during the intra-operative phase of an episode of care. These examples are based on the various components of the CASS 100 described above with reference to FIG. 1; however, it should be understood that other types of data may be used based on the types of equipment used during surgery and their use.

FIG. 5A shows examples of some of the control instructions that the Surgical Computer 150 provides to other components of the CASS 100, according to some embodiments. Note that the example of FIG. 5A assumes that the components of the Effector Platform 105 are each controlled directly by the Surgical Computer 150. In embodiments where a component is manually controlled by the Surgeon 111, instructions may be provided on the Display 125 or AR HMD 155 instructing the Surgeon 111 how to move the component.

The various components included in the Effector Platform 105 are controlled by the Surgical Computer 150 providing position commands that instruct the component where to move within a coordinate system. In some embodiments, the Surgical Computer 150 provides the Effector Platform 105 with instructions defining how to react when a component of the Effector Platform 105 deviates from a surgical plan. These commands are referenced in FIG. 5A as "haptic" commands. For example, the End Effector 105B may provide a force to resist movement outside of an area where resection is planned. Other commands that may be used by the Effector Platform 105 include vibration and audio cues.

In some embodiments, the end effectors 105B of the robotic arm 105A are operatively coupled with cutting guide 105D. In response to an anatomical model of the surgical scene, the robotic arm 105A can move the end effectors 105B and the cutting guide 105D into position to match the location of the femoral or tibial cut to be performed in accordance with the surgical plan. This can reduce the likelihood of error, allowing the vision system and a processor utilizing that vision system to implement the surgical plan to place a cutting guide 105D at the precise location and orientation relative to the tibia or femur to align a cutting slot of the cutting guide with the cut to be performed according to the surgical plan. Then, a surgeon can use any suitable tool, such as an oscillating or rotating saw or drill to perform the cut (or drill a hole) with perfect placement and orientation because the tool is mechanically limited by the features of the cutting guide 105D. In some embodiments, the cutting guide 105D may include one or more pin holes that are used by a surgeon to drill and screw or pin the cutting guide into place before performing a resection of the patient tissue using the cutting guide. This can free the robotic arm 105A or ensure that the cutting guide 105D is fully affixed without moving relative to the bone to be resected. For example, this procedure can be used to make the first distal cut of the femur during a total knee arthroplasty. In some embodiments, where the arthroplasty is a hip arthroplasty, cutting guide 105D can be fixed to the femoral head or the acetabulum for the respective hip arthroplasty resection. It should be understood that any arthroplasty that utilizes precise cuts can use the robotic arm 105A and/or cutting guide 105D in this manner The Resection Equipment 110 is provided with a variety of commands to perform bone or tissue operations. As with the Effector Platform 105, position information may be provided to the Resection Equipment 110 to specify where it should be located when performing resection. Other commands provided to the Resection Equipment 110 may be dependent on the type of resection equipment. For example, for a mechanical or ultrasonic resection tool, the commands may specify the speed and frequency of the tool. For Radiofrequency Ablation (RFA) and other laser ablation tools, the commands may specify intensity and pulse duration.

Some components of the CASS 100 do not need to be directly controlled by the Surgical Computer 150; rather, the Surgical Computer 150 only needs to activate the component, which then executes software locally specifying the manner in which to collect data and provide it to the Surgical Computer 150. In the example of FIG. 5A, there are two components that are operated in this manner the Tracking System 115 and the Tissue Navigation System 120.

The Surgical Computer 150 provides the Display 125 with any visualization that is needed by the Surgeon 111 during surgery. For monitors, the Surgical Computer 150 may provide instructions for displaying images, GUIs, etc. using techniques known in the art. The display 125 can include various portions of the workflow of a surgical plan. During the registration process, for example, the display 125 can show a preoperatively constructed 3D bone model and depict the locations of the probe as the surgeon uses the probe to collect locations of anatomical landmarks on the patient. The display 125 can include information about the surgical target area. For example, in connection with a TKA, the display 125 can depict the mechanical and anatomical axes of the femur and tibia. The display 125 can depict varus and valgus angles for the knee joint based on a surgical plan, and the CASS 100 can depict how such angles will be affected if contemplated revisions to the surgical plan are made. Accordingly, the display 125 is an interactive interface that can dynamically update and display how changes to the surgical plan would impact the procedure and the final position and orientation of implants installed on bone.

As the workflow progresses to preparation of bone cuts or resections, the display 125 can depict the planned or recommended bone cuts before any cuts are performed. The surgeon 111 can manipulate the image display to provide different anatomical perspectives of the target area and can have the option to alter or revise the planned bone cuts based on intraoperative evaluation of the patient. The display 125 can depict how the chosen implants would be installed on the bone if the planned bone cuts are performed. If the surgeon 111 choses to change the previously planned bone cuts, the display 125 can depict how the revised bone cuts would change the position and orientation of the implant when installed on the bone.

The display 125 can provide the surgeon 111 with a variety of data and information about the patient, the planned surgical intervention, and the implants. Various patient-specific information can be displayed, including real-time data concerning the patient's health such as heart rate, blood pressure, etc. The display 125 also can include information about the anatomy of the surgical target region including the location of landmarks, the current state of the anatomy (e.g., whether any resections have been made, the depth and angles of planned and executed bone cuts), and future states of the anatomy as the surgical plan progresses. The display 125 also can provide or depict additional information about the surgical target region. For a TKA, the display 125 can provide information about the gaps (e.g., gap balancing) between the femur and tibia and how such gaps will change if the planned surgical plan is carried out. For a TKA, the display 125 can provide additional relevant information about the knee joint such as data about the joint's tension (e.g., ligament laxity) and information concerning rotation and alignment of the joint. The display 125 can depict how the planned implants' locations and positions will affect the patient as the knee joint is flexed. The display 125 can depict how the use of different implants or the use of different sizes of the same implant will affect the surgical plan and preview how such implants will be positioned on the bone. The CASS 100 can provide such information for each of the planned bone resections in a TKA or THA. In a TKA, the CASS 100 can provide robotic control for one or more of the planned bone resections. For example, the CASS 100 can provide robotic control only for the initial distal femur cut, and the surgeon 111 can manually perform other resections (anterior, posterior and chamfer cuts) using conventional means, such as a 4-in-1 cutting guide or jig 105D.

The display 125 can employ different colors to inform the surgeon of the status of the surgical plan. For example, un-resected bone can be displayed in a first color, resected bone can be displayed in a second color, and planned resections can be displayed in a third color. Implants can be superimposed onto the bone in the display 125, and implant colors can change or correspond to different types or sizes of implants.

The information and options depicted on the display 125 can vary depending on the type of surgical procedure being performed. Further, the surgeon 111 can request or select a particular surgical workflow display that matches or is consistent with his or her surgical plan preferences. For example, for a surgeon 111 who typically performs the tibial cuts before the femoral cuts in a TKA, the display 125 and associated workflow can be adapted to take this preference into account. The surgeon 111 also can preselect that certain steps be included or deleted from the standard surgical workflow display. For example, if a surgeon 111 uses resection measurements to finalize an implant plan but does not analyze ligament gap balancing when finalizing the implant plan, the surgical workflow display can be organized into modules, and the surgeon can select which modules to display and the order in which the modules are provided based on the surgeon's preferences or the circumstances of a particular surgery. Modules directed to ligament and gap balancing, for example, can include pre- and post-resection ligament/gap balancing, and the surgeon 111 can select which modules to include in their default surgical plan workflow depending on whether they perform such ligament and gap balancing before or after (or both) bone resections are performed.

For more specialized display equipment, such as AR HMDs, the Surgical Computer 150 may provide images, text, etc. using the data format supported by the equipment. For example, if the Display 125 is a holography device such as the Microsoft HoloLens™ or Magic Leap One™, the Surgical Computer 150 may use the HoloLens Application Program Interface (API) to send commands specifying the position and content of holograms displayed in the field of view of the Surgeon 111.

In some embodiments, one or more surgical planning models may be incorporated into the CASS 100 and used in the development of the surgical plans provided to the surgeon 111. The term "surgical planning model" refers to software that simulates the biomechanics performance of anatomy under various scenarios to determine the optimal way to perform cutting and other surgical activities. For example, for knee replacement surgeries, the surgical planning model can measure parameters for functional activities, such as deep knee bends, gait, etc., and select cut locations on the knee to optimize implant placement. One example of a surgical planning model is the LIFEMOD™ simulation software from SMITH AND NEPHEW, INC. In some embodiments, the Surgical Computer 150 includes computing architecture that allows full execution of the surgical planning model during surgery (e.g., a GPU-based parallel processing environment). In other embodiments, the Surgical Computer 150 may be connected over a network to a remote computer that allows such execution, such as a Surgical Data Server 180 (see FIG. 5C). As an alternative to full execution of the surgical planning model, in some embodiments, a set of transfer functions are derived that simplify the mathematical operations captured by the model into one or more predictor equations. Then, rather than execute the full simulation during surgery, the predictor equations are used. Further details on the use of transfer functions are described in WIPO Publication No. 2020/037308, filed Aug. 19, 2019, entitled "Patient Specific Surgical Method and System," the entirety of which is incorporated herein by reference.

FIG. 5B shows examples of some of the types of data that can be provided to the Surgical Computer 150 from the various components of the CASS 100. In some embodiments, the components may stream data to the Surgical Computer 150 in real-time or near real-time during surgery. In other embodiments, the components may queue data and send it to the Surgical Computer 150 at set intervals (e.g., every second). Data may be communicated using any format known in the art. Thus, in some embodiments, the components all transmit data to the Surgical Computer 150 in a common format. In other embodiments, each component may use a different data format, and the Surgical Computer 150 is configured with one or more software applications that enable translation of the data.

In general, the Surgical Computer 150 may serve as the central point where CASS data is collected. The exact content of the data will vary depending on the source. For example, each component of the Effector Platform 105 provides a measured position to the Surgical Computer 150. Thus, by comparing the measured position to a position originally specified by the Surgical Computer 150 (see FIG. 5B), the Surgical Computer can identify deviations that take place during surgery.

The Resection Equipment 110 can send various types of data to the Surgical Computer 150 depending on the type of equipment used. Example data types that may be sent include the measured torque, audio signatures, and measured displacement values. Similarly, the Tracking Technology 115 can provide different types of data depending on the tracking methodology employed. Example tracking data types include position values for tracked items (e.g., anatomy, tools, etc.), ultrasound images, and surface or landmark collection points or axes. The Tissue Navigation System 120 provides the Surgical Computer 150 with anatomic locations, shapes, etc. as the system operates.

Although the Display 125 generally is used for outputting data for presentation to the user, it may also provide data to the Surgical Computer 150. For example, for embodiments where a monitor is used as part of the Display 125, the Surgeon 111 may interact with a GUI to provide inputs which are sent to the Surgical Computer 150 for further processing. For AR applications, the measured position and displacement of the HMD may be sent to the Surgical Computer 150 so that it can update the presented view as needed.

During the post-operative phase of the episode of care, various types of data can be collected to quantify the overall improvement or deterioration in the patient's condition as a result of the surgery. The data can take the form of, for example, self-reported information reported by patients via questionnaires. For example, in the context of a knee replacement surgery, functional status can be measured with an Oxford Knee Score questionnaire, and the post-operative quality of life can be measured with a EQ5D-5L questionnaire. Other examples in the context of a hip replacement surgery may include the Oxford Hip Score, Harris Hip Score, and WOMAC (Western Ontario and McMaster Universities Osteoarthritis index). Such questionnaires can be administered, for example, by a healthcare professional directly in a clinical setting or using a mobile app that allows the patient to respond to questions directly. In some embodiments, the patient may be outfitted with one or more wearable devices that collect data relevant to the surgery. For example, following a knee surgery, the patient may be outfitted with a knee brace that includes sensors that monitor knee positioning, flexibility, etc. This information can be collected and transferred to the patient's mobile device for review by the surgeon to evaluate the outcome of the surgery and address any issues. In some embodiments, one or more cameras can capture and record the motion of a patient's body segments during specified activities postoperatively. This motion capture can be compared to a biomechanics model to better understand the functionality of the patient's joints and better predict progress in recovery and identify any possible revisions that may be needed.

The post-operative stage of the episode of care can continue over the entire life of a patient. For example, in some embodiments, the Surgical Computer 150 or other components comprising the CASS 100 can continue to receive and collect data relevant to a surgical procedure after the procedure has been performed. This data may include, for example, images, answers to questions, "normal" patient data (e.g., blood type, blood pressure, conditions, medications, etc.), biometric data (e.g., gait, etc.), and objective and subjective data about specific issues (e.g., knee or hip joint pain). This data may be explicitly provided to the Surgical Computer 150 or other CASS component by the patient or the patient's physician(s). Alternatively or additionally, the Surgical Computer 150 or other CASS component can monitor the patient's EMR and retrieve relevant information as it becomes available. This longitudinal view of the patient's recovery allows the Surgical Computer 150 or other CASS component to provide a more objective analysis of the patient's outcome to measure and track success or lack of success for a given procedure. For example, a condition experienced by a patient long after the surgical procedure can be linked back to the surgery through a regression analysis of various data items collected during the episode of care. This analysis can be further enhanced by performing the analysis on groups of patients that had similar procedures and/or have similar anatomies.

In some embodiments, data is collected at a central location to provide for easier analysis and use. Data can be manually collected from various CASS components in some instances. For example, a portable storage device (e.g., USB stick) can be attached to the Surgical Computer 150 into order to retrieve data collected during surgery. The data can then be transferred, for example, via a desktop computer to the centralized storage. Alternatively, in some embodiments, the Surgical Computer 150 is connected directly to the centralized storage via a Network 175 as shown in FIG. 5C.

Figure 5C:
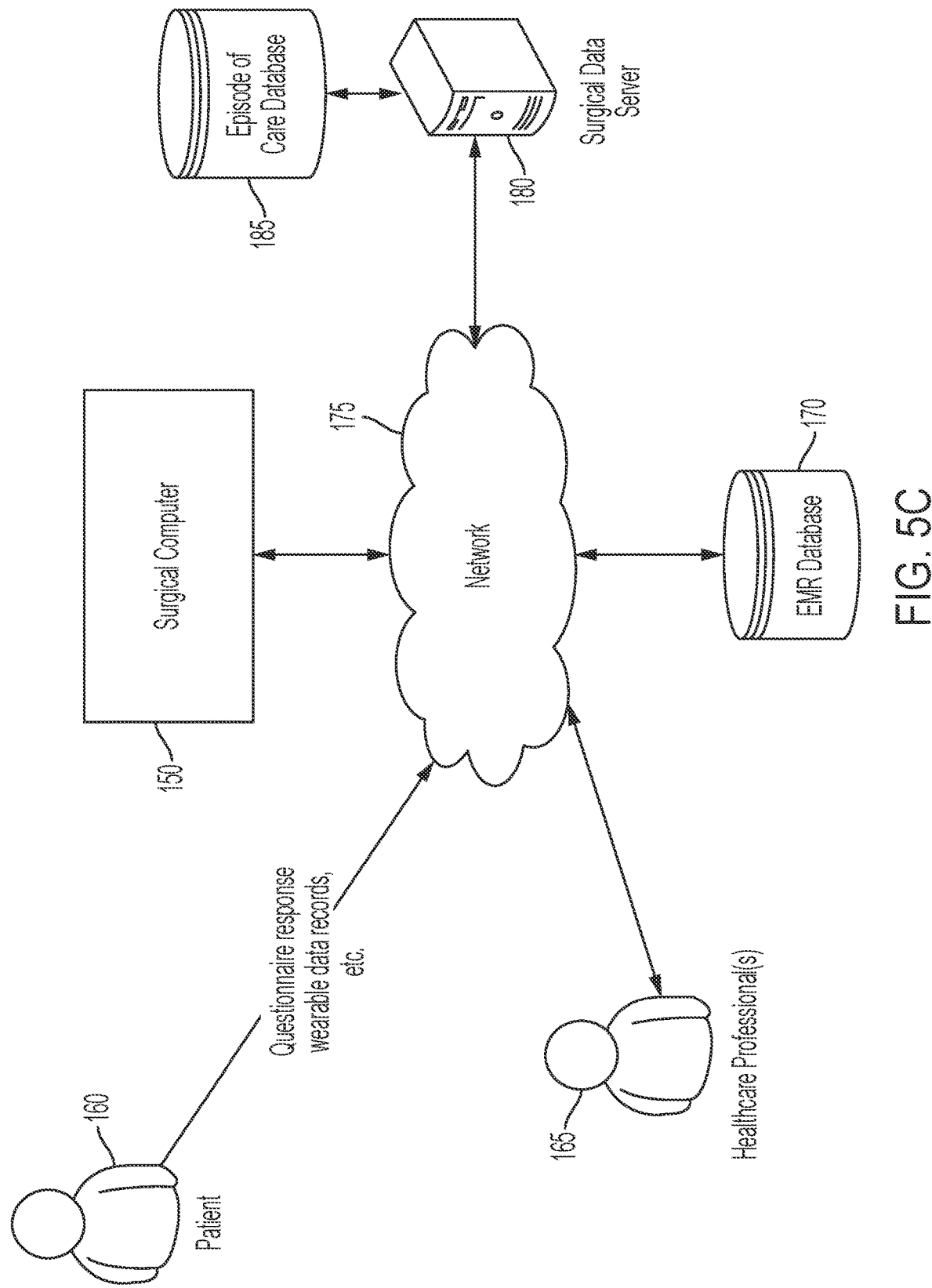
FIG. 5C depicts an illustrative implementation in which a surgical computer is connected to a surgical data server via a network in accordance with an embodiment.

FIG. 5C illustrates a "cloud-based" implementation in which the Surgical Computer 150 is connected to a Surgical Data Server 180 via a Network 175. This Network 175 may be, for example, a private intranet or the Internet. In addition to the data from the Surgical Computer 150, other sources can transfer relevant data to the Surgical Data Server 180. The example of FIG. 5C shows 3 additional data sources: the Patient 160, Healthcare Professional(s) 165, and an EMR Database 170. Thus, the Patient 160 can send pre-operative and post-operative data to the Surgical Data Server 180, for example, using a mobile app. The Healthcare Professional(s) 165 includes the surgeon and his or her staff as well as any other professionals working with Patient 160 (e.g., a personal physician, a rehabilitation specialist, etc.). It should also be noted that the EMR Database 170 may be used for both pre-operative and post-operative data. For example, assuming that the Patient 160 has given adequate permissions, the Surgical Data Server 180 may collect the EMR of the Patient pre-surgery. Then, the Surgical Data Server 180 may continue to monitor the EMR for any updates post-surgery.

At the Surgical Data Server 180, an Episode of Care Database 185 is used to store the various data collected over a patient's episode of care. The Episode of Care Database 185 may be implemented using any technique known in the art. For example, in some embodiments, a SQL-based database may be used where all of the various data items are structured in a manner that allows them to be readily incorporated in two SQL's collection of rows and columns. However, in other embodiments a No-SQL database may be employed to allow for unstructured data, while providing the ability to rapidly process and respond to queries. As is understood in the art, the term "No-SQL" is used to define a class of data stores that are non-relational in their design. Various types of No-SQL databases may generally be grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein and, in some embodiments, the different types of databases may support the Episode of Care Database 185.

Data can be transferred between the various data sources and the Surgical Data Server 180 using any data format and transfer technique known in the art. It should be noted that the architecture shown in FIG. 5C allows transmission from the data source to the Surgical Data Server 180, as well as retrieval of data from the Surgical Data Server 180 by the data sources. For example, as explained in detail below, in some embodiments, the Surgical Computer 150 may use data from past surgeries, machine learning models, etc. to help guide the surgical procedure.

In some embodiments, the Surgical Computer 150 or the Surgical Data Server 180 may execute a de-identification process to ensure that data stored in the Episode of Care Database 185 meets Health Insurance Portability and Accountability Act (HIPAA) standards or other requirements mandated by law. HIPAA provides a list of certain identifiers that must be removed from data during de-identification. The aforementioned de-identification process can scan for these identifiers in data that is transferred to the Episode of Care Database 185 for storage. For example, in one embodiment, the Surgical Computer 150 executes the de-identification process just prior to initiating transfer of a particular data item or set of data items to the Surgical Data Server 180. In some embodiments, a unique identifier is assigned to data from a particular episode of care to allow for re-identification of the data if necessary.

Although FIGS. 5A-5C discuss data collection in the context of a single episode of care, it should be understood that the general concept can be extended to data collection from multiple episodes of care. For example, surgical data may be collected over an entire episode of care each time a surgery is performed with the CASS 100 and stored at the Surgical Computer 150 or at the Surgical Data Server 180. As explained in further detail below, a robust database of episode of care data allows the generation of optimized values, measurements, distances, or other parameters and other recommendations related to the surgical procedure. In some embodiments, the various datasets are indexed in the database or other storage medium in a manner that allows for rapid retrieval of relevant information during the surgical procedure. For example, in one embodiment, a patient-centric set of indices may be used so that data pertaining to a particular patient or a set of patients similar to a particular patient can be readily extracted. This concept can be similarly applied to surgeons, implant characteristics, CASS component versions, etc.

Further details of the management of episode of care data is described in U.S. Patent Application No. 62/783,858 filed Dec. 21, 2018 and entitled "Methods and Systems for Providing an Episode of Care," the entirety of which is incorporated herein by reference.

Open versus Closed Digital Ecosystems

In some embodiments, the CASS 100 is designed to operate as a self-contained or "closed" digital ecosystem. Each component of the CASS 100 is specifically designed to be used in the closed ecosystem, and data is generally not accessible to devices outside of the digital ecosystem. For example, in some embodiments, each component includes software or firmware that implements proprietary protocols for activities such as communication, storage, security, etc. The concept of a closed digital ecosystem may be desirable for a company that wants to control all components of the CASS 100 to ensure that certain compatibility, security, and reliability standards are met. For example, the CASS 100 can be designed such that a new component cannot be used with the CASS unless it is certified by the company.

In other embodiments, the CASS 100 is designed to operate as an "open" digital ecosystem. In these embodiments, components may be produced by a variety of different companies according to standards for activities, such as communication, storage, and security. Thus, by using these standards, any company can freely build an independent, compliant component of the CASS platform. Data may be transferred between components using publicly available application programming interfaces (APIs) and open, shareable data formats.

To illustrate one type of recommendation that may be performed with the CASS 100, a technique for optimizing surgical parameters is disclosed below. The term "optimization" in this context means selection of parameters that are optimal based on certain specified criteria. In an extreme case, optimization can refer to selecting optimal parameter(s) based on data from the entire episode of care, including any pre-operative data, the state of CASS data at a given point in time, and post-operative goals. Moreover, optimization may be performed using historical data, such as data generated during past surgeries involving, for example, the same surgeon, past patients with physical characteristics similar to the current patient, or the like.

The optimized parameters may depend on the portion of the patient's anatomy to be operated on. For example, for knee surgeries, the surgical parameters may include positioning information for the femoral and tibial component including, without limitation, rotational alignment (e.g., varus/valgus rotation, external rotation, flexion rotation for the femoral component, posterior slope of the tibial component), resection depths (e.g., varus knee, valgus knee), and implant type, size and position. The positioning information may further include surgical parameters for the combined implant, such as overall limb alignment, combined tibiofemoral hyperextension, and combined tibiofemoral resection. Additional examples of parameters that could be optimized for a given TKA femoral implant by the CASS 100 include the following:

| Parameter | Reference | Exemplary Recommendation (s) |
|---|---|---|
| Size | Posterior | The largest sized implant that does not overhang medial/lateral bone edges or overhang the anterior femur. A size that does not result in overstuffing |

-continued

| Parameter | Reference | Exemplary Recommendation (s) |
|---|---|---|
| | | the patella femoral joint |
| Implant Position - Medial Lateral | Medial/lateral cortical bone edges | Center the implant evenly between the medial/lateral cortical bone edges |
| Resection Depth - Varus Knee | Distal and posterior lateral | 6 mm of bone |
| Resection Depth - Valgus Knee | Distal and posterior medial | 7 mm of bone |
| Rotation - Varus/Valgus | Mechanical Axis | 1° varus |
| Rotation - External | Transepicondylar Axis | 1° external from the transepicondylar axis |
| Rotation - Flexion | Mechanical Axis | 3° flexed |

Additional examples of parameters that could be optimized for a given TKA tibial implant by the CASS 100 include the following:

| Parameter | Reference | Exemplary Recommendation (s) |
|---|---|---|
| Size | Posterior | The largest sized implant that does not overhang the medial, lateral, anterior, and posterior tibial edges |
| Implant Position | Medial/lateral and anterior/posterior cortical bone edges | Center the implant evenly between the medial/lateral and anterior/posterior cortical bone edges |
| Resection Depth - Varus Knee | Lateral/Medial | 4 mm of bone |
| Resection Depth - Valgus Knee | Lateral/Medial | 5 mm of bone |
| Rotation -Varus/Valgus | Mechanical Axis | 1° valgus |
| Rotation - External | Tibial Anterior Posterior Axis | 1° external from the tibial anterior paxis |
| Posterior Slope | Mechanical Axis | 3° posterior slope |

For hip surgeries, the surgical parameters may comprise femoral neck resection location and angle, cup inclination angle, cup anteversion angle, cup depth, femoral stem design, femoral stem size, fit of the femoral stem within the canal, femoral offset, leg length, and femoral version of the implant.

Shoulder parameters may include, without limitation, humeral resection depth/angle, humeral stem version, humeral offset, glenoid version and inclination, as well as reverse shoulder parameters such as humeral resection depth/angle, humeral stem version, Glenoid tilt/version, glenosphere orientation, glenosphere offset and offset direction.

Various conventional techniques exist for optimizing surgical parameters. However, these techniques are typically computationally intensive and, thus, parameters often need to be determined pre-operatively. As a result, the surgeon is limited in his or her ability to make modifications to optimized parameters based on issues that may arise during surgery. Moreover, conventional optimization techniques typically operate in a "black box" manner with little or no explanation regarding recommended parameter values. Thus, if the surgeon decides to deviate from a recommended parameter value, the surgeon typically does so without a full understanding of the effect of that deviation on the rest of the surgical workflow, or the impact of the deviation on the patient's post-surgery quality of life.

Operative Patient Care System

Figure 6:
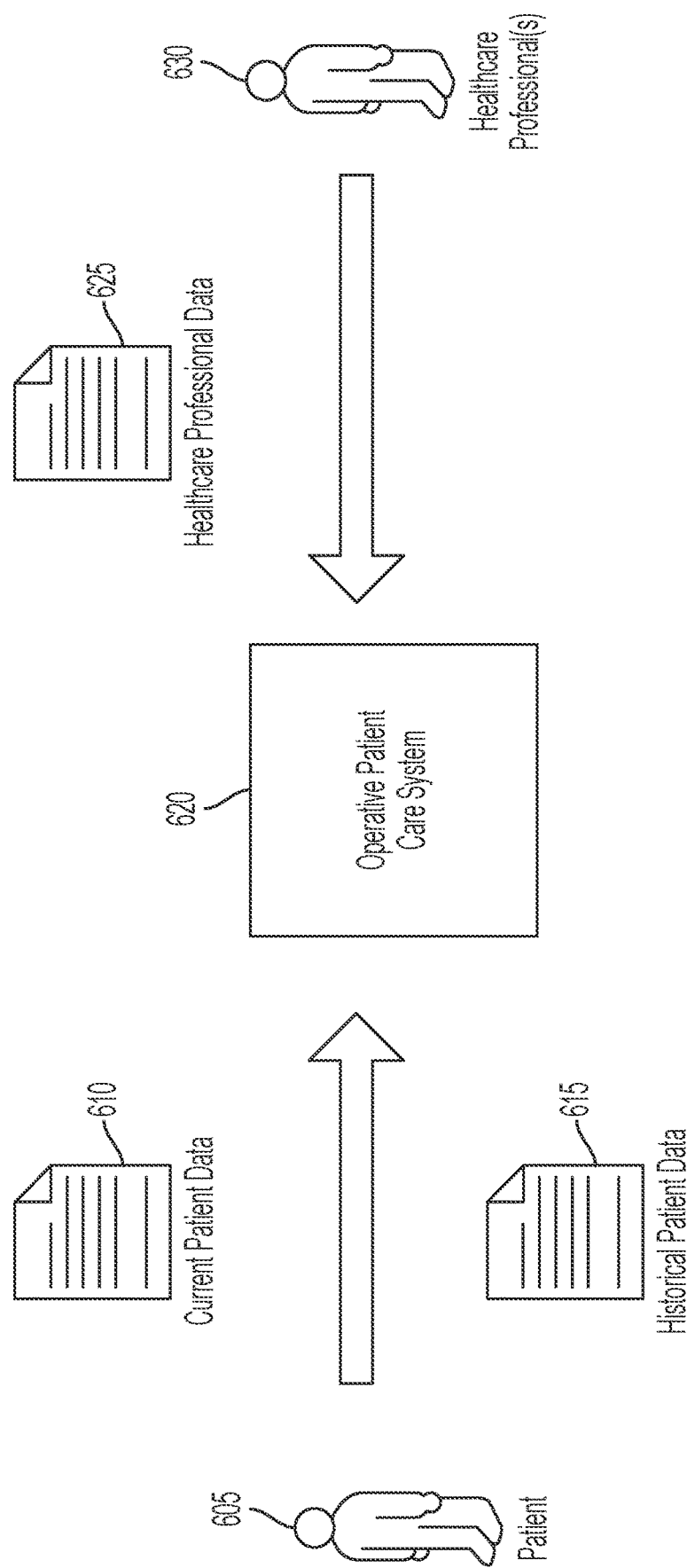
FIG. 6 depicts an operative patient care system and illustrative data sources in accordance with an embodiment.

The general concepts of optimization may be extended to the entire episode of care using an Operative Patient Care System 620 that uses the surgical data, and other data from the Patient 605 and Healthcare Professionals 630 to optimize outcomes and patient satisfaction as depicted in FIG. 6.

Conventionally, pre-operative diagnosis, pre-operative surgical planning, intra-operative execution of a prescribed plan, and post-operative management of total joint arthroplasty are based on individual experience, published literature, and training knowledge bases of surgeons (ultimately, tribal knowledge of individual surgeons and their 'network' of peers and journal publications) and their native ability to make accurate intra-operative tactile discernment of "balance" and accurate manual execution of planar resections using guides and visual cues. This existing knowledge base and execution is limited with respect to the outcomes optimization offered to patients needing care. For example, limits exist with respect to accurately diagnosing a patient to the proper, least-invasive prescribed care; aligning dynamic patient, healthcare economic, and surgeon preferences with patient-desired outcomes; executing a surgical plan resulting in proper bone alignment and balance, etc.; and receiving data from disconnected sources having different biases that are difficult to reconcile into a holistic patient framework. Accordingly, a data-driven tool that more accurately models anatomical response and guides the surgical plan can improve the existing approach.

The Operative Patient Care System 620 is designed to utilize patient specific data, surgeon data, healthcare facility data, and historical outcome data to develop an algorithm that suggests or recommends an optimal overall treatment plan for the patient's entire episode of care (preoperative, operative, and postoperative) based on a desired clinical outcome. For example, in one embodiment, the Operative Patient Care System 620 tracks adherence to the suggested or recommended plan, and adapts the plan based on patient/care provider performance Once the surgical treatment plan is complete, collected data is logged by the Operative Patient Care System 620 in a historical database. This database is accessible for future patients and the development of future treatment plans. In addition to utilizing statistical and mathematical models, simulation tools (e.g., LIFEMOD®) can be used to simulate outcomes, alignment, kinematics, etc. based on a preliminary or proposed surgical plan, and reconfigure the preliminary or proposed plan to achieve desired or optimal results according to a patient's profile or a surgeon's preferences. The Operative Patient Care System 620 ensures that each patient is receiving personalized surgical and rehabilitative care, thereby improving the chance of successful clinical outcomes and lessening the economic burden on the facility associated with near-term revision.

In some embodiments, the Operative Patient Care System 620 employs a data collecting and management method to provide a detailed surgical case plan with distinct steps that are monitored and/or executed using a CASS 100. The performance of the user(s) is calculated at the completion of each step and can be used to suggest changes to the subsequent steps of the case plan. Case plan generation relies on a series of input data that is stored on a local or cloud-storage database. Input data can be related to both the current patient undergoing treatment and historical data from patients who have received similar treatment(s).

A Patient 605 provides inputs such as Current Patient Data 610 and Historical Patient Data 615 to the Operative Patient Care System 620. Various methods generally known in the art may be used to gather such inputs from the Patient 605. For example, in some embodiments, the Patient 605 fills out a paper or digital survey that is parsed by the Operative Patient Care System 620 to extract patient data. In other embodiments, the Operative Patient Care System 620 may extract patient data from existing information sources, such as electronic medical records (EMRs), health history files, and payer/provider historical files. In still other embodiments, the Operative Patient Care System 620 may provide an application program interface (API) that allows the external data source to push data to the Operative Patient Care System. For example, the Patient 605 may have a mobile phone, wearable device, or other mobile device that collects data (e.g., heart rate, pain or discomfort levels, exercise or activity levels, or patient-submitted responses to the patient's adherence with any number of pre-operative plan criteria or conditions) and provides that data to the Operative Patient Care System 620. Similarly, the Patient 605 may have a digital application on his or her mobile or wearable device that enables data to be collected and transmitted to the Operative Patient Care System 620.

Current Patient Data 610 can include, but is not limited to, activity level, preexisting conditions, comorbidities, prehab performance, health and fitness level, pre-operative expectation level (relating to hospital, surgery, and recovery), a Metropolitan Statistical Area (MSA) driven score, genetic background, prior injuries (sports, trauma, etc.), previous joint arthroplasty, previous trauma procedures, previous sports medicine procedures, treatment of the contralateral joint or limb, gait or biomechanical information (back and ankle issues), levels of pain or discomfort, care infrastructure information (payer coverage type, home health care infrastructure level, etc.), and an indication of the expected ideal outcome of the procedure.

Historical Patient Data 615 can include, but is not limited to, activity level, preexisting conditions, comorbidities, prehab performance, health and fitness level, pre-operative expectation level (relating to hospital, surgery, and recovery), a MSA driven score, genetic background, prior injuries (sports, trauma, etc.), previous joint arthroplasty, previous trauma procedures, previous sports medicine procedures, treatment of the contralateral joint or limb, gait or biomechanical information (back and ankle issues), levels of pain or discomfort, care infrastructure information (payer coverage type, home health care infrastructure level, etc.), expected ideal outcome of the procedure, actual outcome of the procedure (patient reported outcomes [PROs], survivorship of implants, pain levels, activity levels, etc.), sizes of implants used, position/orientation/alignment of implants used, soft-tissue balance achieved, etc.

Healthcare Professional(s) 630 conducting the procedure or treatment may provide various types of data 625 to the Operative Patient Care System 620. This Healthcare Professional Data 625 may include, for example, a description of a known or preferred surgical technique (e.g., Cruciate Retaining (CR) vs Posterior Stabilized (PS), up- vs downsizing, tourniquet vs tourniquet-less, femoral stem style, preferred approach for THA, etc.), the level of training of the Healthcare Professional(s) 630 (e.g., years in practice, fellowship trained, where they trained, whose techniques they emulate), previous success level including historical data (outcomes, patient satisfaction), and the expected ideal outcome with respect to range of motion, days of recovery, and survivorship of the device. The Healthcare Professional Data 625 can be captured, for example, with paper or digital surveys provided to the Healthcare Professional 630, via inputs to a mobile application by the Healthcare Professional, or by extracting relevant data from EMRs. In addition, the CASS 100 may provide data such as profile data (e.g., a Patient Specific Knee Instrument Profile) or historical logs describing use of the CASS during surgery.

Information pertaining to the facility where the procedure or treatment will be conducted may be included in the input data. This data can include, without limitation, the following: Ambulatory Surgery Center (ASC) vs hospital, facility trauma level, Comprehensive Care for Joint Replacement Program (CJR) or bundle candidacy, a MSA driven score, community vs metro, academic vs non-academic, postoperative network access (Skilled Nursing Facility [SNF] only, Home Health, etc.), availability of medical professionals, implant availability, and availability of surgical equipment.

These facility inputs can be captured by, for example and without limitation, Surveys (Paper/Digital), Surgery Scheduling Tools (e.g., apps, Websites, Electronic Medical Records [EMRs], etc.), Databases of Hospital Information (on the Internet), etc. Input data relating to the associated healthcare economy including, but not limited to, the socio-economic profile of the patient, the expected level of reimbursement the patient will receive, and if the treatment is patient specific may also be captured.

These healthcare economic inputs can be captured by, for example and without limitation, Surveys (Paper/Digital), Direct Payer Information, Databases of Socioeconomic status (on the Internet with zip code), etc. Finally, data derived from simulation of the procedure is captured. Simulation inputs include implant size, position, and orientation. Simulation can be conducted with custom or commercially available anatomical modeling software programs (e.g., LIFE-MOD®, AnyBody, or OpenSIM). It is noted that the data inputs described above may not be available for every patient, and the treatment plan will be generated using the data that is available.

Prior to surgery, the Patient Data 610, 615 and Healthcare Professional Data 625 may be captured and stored in a cloud-based or online database (e.g., the Surgical Data Server 180 shown in FIG. 5C). Information relevant to the procedure is supplied to a computing system via wireless data transfer or manually with the use of portable media storage. The computing system is configured to generate a case plan for use with a CASS 100. Case plan generation will be described hereinafter. It is noted that the system has access to historical data from previous patients undergoing treatment, including implant size, placement, and orientation as generated by a computer-assisted, patient-specific knee instrument (PSKI) selection system, or automatically by the CASS 100 itself. To achieve this, case log data is uploaded to the historical database by a surgical sales rep or case engineer using an online portal. In some embodiments, data transfer to the online database is wireless and automated.

Historical data sets from the online database are used as inputs to a machine learning model such as, for example, a recurrent neural network (RNN) or other form of artificial neural network. As is generally understood in the art, an artificial neural network functions similar to a biologic neural network and is comprised of a series of nodes and connections. The machine learning model is trained to predict one or more values based on the input data. For the sections that follow, it is assumed that the machine learning model is trained to generate predictor equations. These predictor equations may be optimized to determine the optimal size, position, and orientation of the implants to achieve the best outcome or satisfaction level.

Once the procedure is complete, all patient data and available outcome data, including the implant size, position and orientation determined by the CASS 100, are collected and stored in the historical database. Any subsequent calculation of the target equation via the RNN will include the data from the previous patient in this manner, allowing for continuous improvement of the system.

In addition to, or as an alternative to determining implant positioning, in some embodiments, the predictor equation and associated optimization can be used to generate the resection planes for use with a PSKI system. When used with a PSKI system, the predictor equation computation and optimization are completed prior to surgery. Patient anatomy is estimated using medical image data (x-ray, CT, MRI). Global optimization of the predictor equation can provide an ideal size and position of the implant components. Boolean intersection of the implant components and patient anatomy is defined as the resection volume. PSKI can be produced to remove the optimized resection envelope. In this embodiment, the surgeon cannot alter the surgical plan intraoperatively.

The surgeon may choose to alter the surgical case plan at any time prior to or during the procedure. If the surgeon elects to deviate from the surgical case plan, the altered size, position, and/or orientation of the component(s) is locked, and the global optimization is refreshed based on the new size, position, and/or orientation of the component(s) (using the techniques previously described) to find the new ideal position of the other component(s) and the corresponding resections needed to be performed to achieve the newly optimized size, position and/or orientation of the component(s). For example, if the surgeon determines that the size, position and/or orientation of the femoral implant in a TKA needs to be updated or modified intraoperatively, the femoral implant position is locked relative to the anatomy, and the new optimal position of the tibia will be calculated (via global optimization) considering the surgeon's changes to the femoral implant size, position and/or orientation. Furthermore, if the surgical system used to implement the case plan is robotically assisted (e.g., as with NAVIO® or the MAKO Rio), bone removal and bone morphology during the surgery can be monitored in real time. If the resections made during the procedure deviate from the surgical plan, the subsequent placement of additional components may be optimized by the processor taking into account the actual resections that have already been made.

Figure 7A:
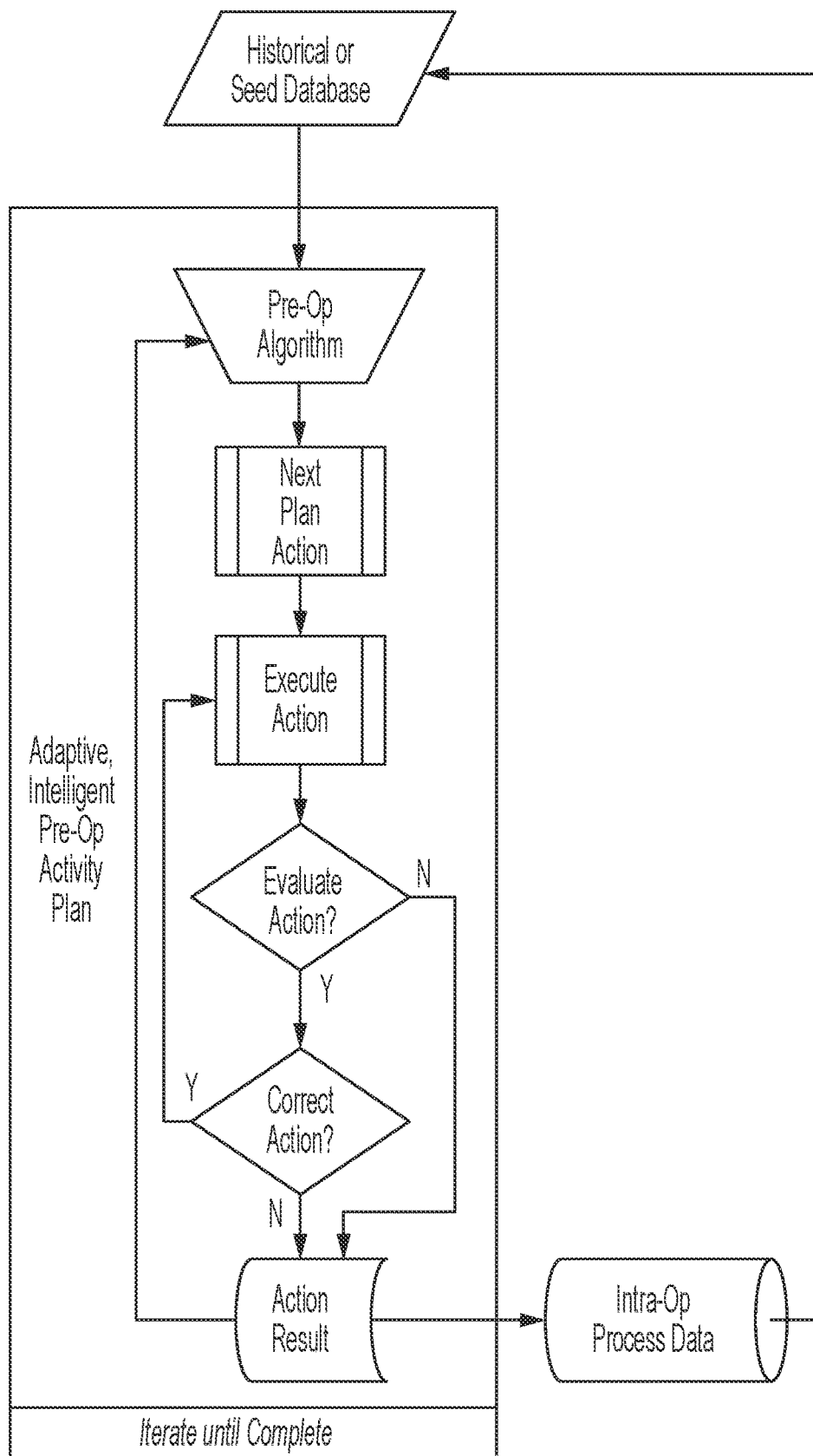
FIG. 7A depicts an illustrative flow diagram for determining a pre-operative surgical plan in accordance with an embodiment.
Figure 7B:
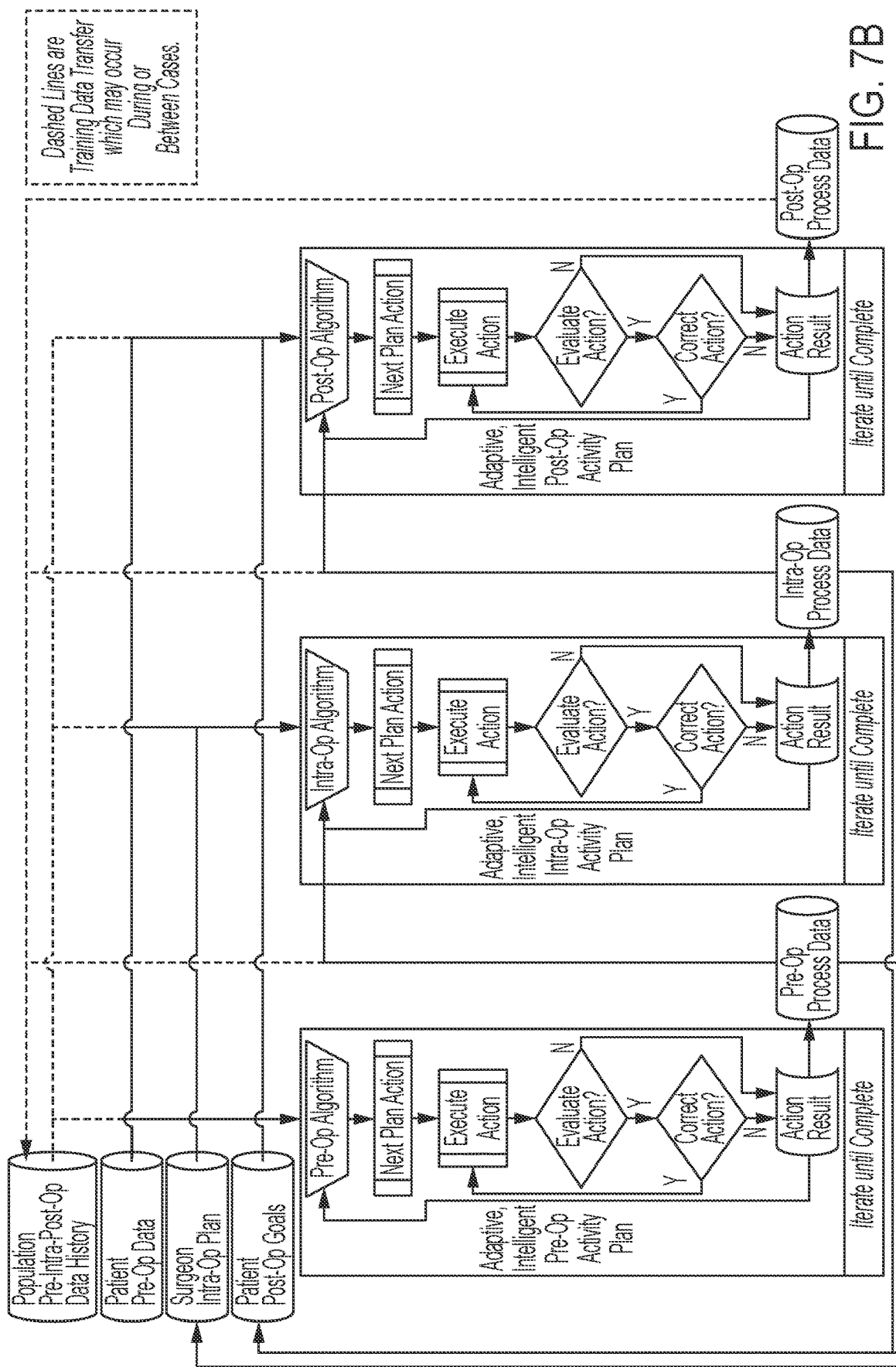
FIG. 7B depicts an illustrative flow diagram for determining an episode of care including pre-operative, intraoperative, and post-operative actions in accordance with an embodiment.

FIG. 7A illustrates how the Operative Patient Care System 620 may be adapted for performing case plan matching services. In this example, data is captured relating to the current patient 610 and is compared to all or portions of a historical database of patient data and associated outcomes 615. For example, the surgeon may elect to compare the plan for the current patient against a subset of the historical database. Data in the historical database can be filtered to include, for example, only data sets with favorable outcomes, data sets corresponding to historical surgeries of patients with profiles that are the same or similar to the current patient profile, data sets corresponding to a particular surgeon, data sets corresponding to a particular element of the surgical plan (e.g., only surgeries where a particular ligament is retained), or any other criteria selected by the surgeon or medical professional. If, for example, the current patient data matches or is correlated with that of a previous patient who experienced a good outcome, the case plan from the previous patient can be accessed and adapted or adopted for use with the current patient. The predictor equation may be used in conjunction with an intra-operative algorithm that identifies or determines the actions associated with the case plan. Based on the relevant and/or preselected information from the historical database, the intra-operative algorithm determines a series of recommended actions for the surgeon to perform. Each execution of the algorithm produces the next action in the case plan. If the surgeon performs the action, the results are evaluated. The results of the surgeon's performing the action are used to refine and update inputs to the intra-operative algorithm for generating the next step in the case plan. Once the case plan has been fully executed all data associated with the case plan, including any deviations performed from the recommended actions by the surgeon, are stored in the database of historical data. In some embodiments, the system utilizes preoperative, intraoperative, or postoperative modules in a piecewise fashion, as opposed to the entire continuum of care. In other words, caregivers can prescribe any permutation or combination of treatment modules including the use of a single module. These concepts are illustrated in FIG. 7B and can be applied to any type of surgery utilizing the CASS 100.

Surgery Process Display

As noted above with respect to FIGS. 1 and 5A-5C, the various components of the CASS 100 generate detailed data records during surgery. The CASS 100 can track and record various actions and activities of the surgeon during each step of the surgery and compare actual activity to the pre-operative or intraoperative surgical plan. In some embodiments, a software tool may be employed to process this data into a format where the surgery can be effectively "played-back." For example, in one embodiment, one or more GUIs may be used that depict all of the information presented on the Display 125 during surgery. This can be supplemented with graphs and images that depict the data collected by different tools. For example, a GUI that provides a visual depiction of the knee during tissue resection may provide the measured torque and displacement of the resection equipment adjacent to the visual depiction to better provide an understanding of any deviations that occurred from the planned resection area. The ability to review a playback of the surgical plan or toggle between different phases of the actual surgery vs. the surgical plan could provide benefits to the surgeon and/or surgical staff, allowing such persons to identify any deficiencies or challenging phases of a surgery so that they can be modified in future surgeries. Similarly, in academic settings, the aforementioned GUIs can be used as a teaching tool for training future surgeons and/or surgical staff. Additionally, because the data set effectively records many elements of the surgeon's activity, it may also be used for other reasons (e.g., legal or compliance reasons) as evidence of correct or incorrect performance of a particular surgical procedure.

Over time, as more and more surgical data is collected, a rich library of data may be acquired that describes surgical procedures performed for various types of anatomy (knee, shoulder, hip, etc.) by different surgeons for different patients. Moreover, information such as implant type and dimension, patient demographics, etc. can further be used to enhance the overall dataset. Once the dataset has been established, it may be used to train a machine learning model (e.g., RNN) to make predictions of how surgery will proceed based on the current state of the CASS 100.

Training of the machine learning model can be performed as follows. The overall state of the CASS 100 can be sampled over a plurality of time periods for the duration of the surgery. The machine learning model can then be trained to translate a current state at a first time period to a future state at a different time period. By analyzing the entire state of the CASS 100 rather than the individual data items, any causal effects of interactions between different components of the CASS 100 can be captured. In some embodiments, a plurality of machine learning models may be used rather than a single model. In some embodiments, the machine learning model may be trained not only with the state of the CASS 100, but also with patient data (e.g., captured from an EMR) and an identification of members of the surgical staff. This allows the model to make predictions with even greater specificity. Moreover, it allows surgeons to selectively make predictions based only on their own surgical experiences if desired.

Figure 7C:
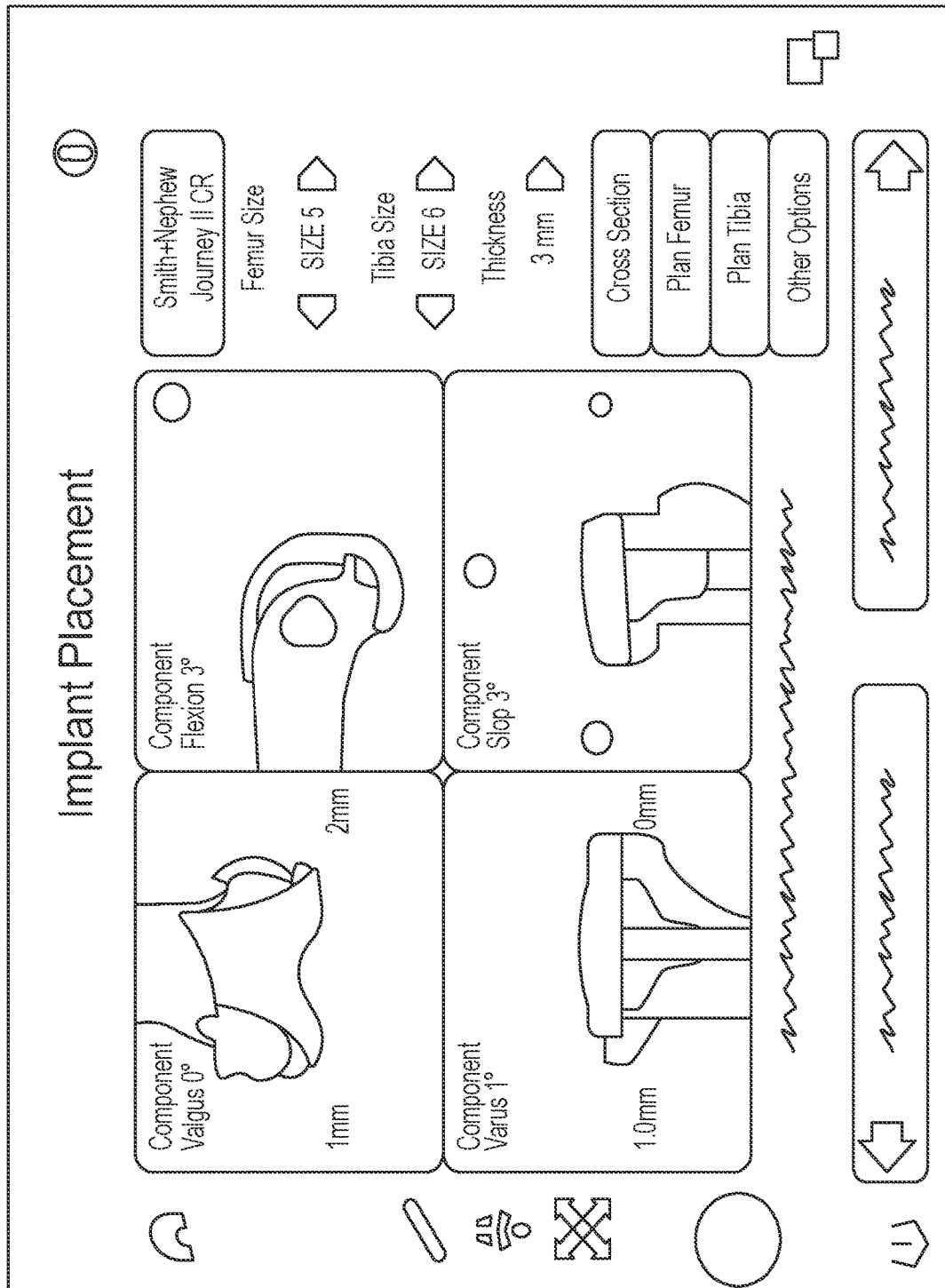
FIG. 7C depicts illustrative graphical user interfaces including images depicting an implant placement in accordance with an embodiment.
Figure 7C:
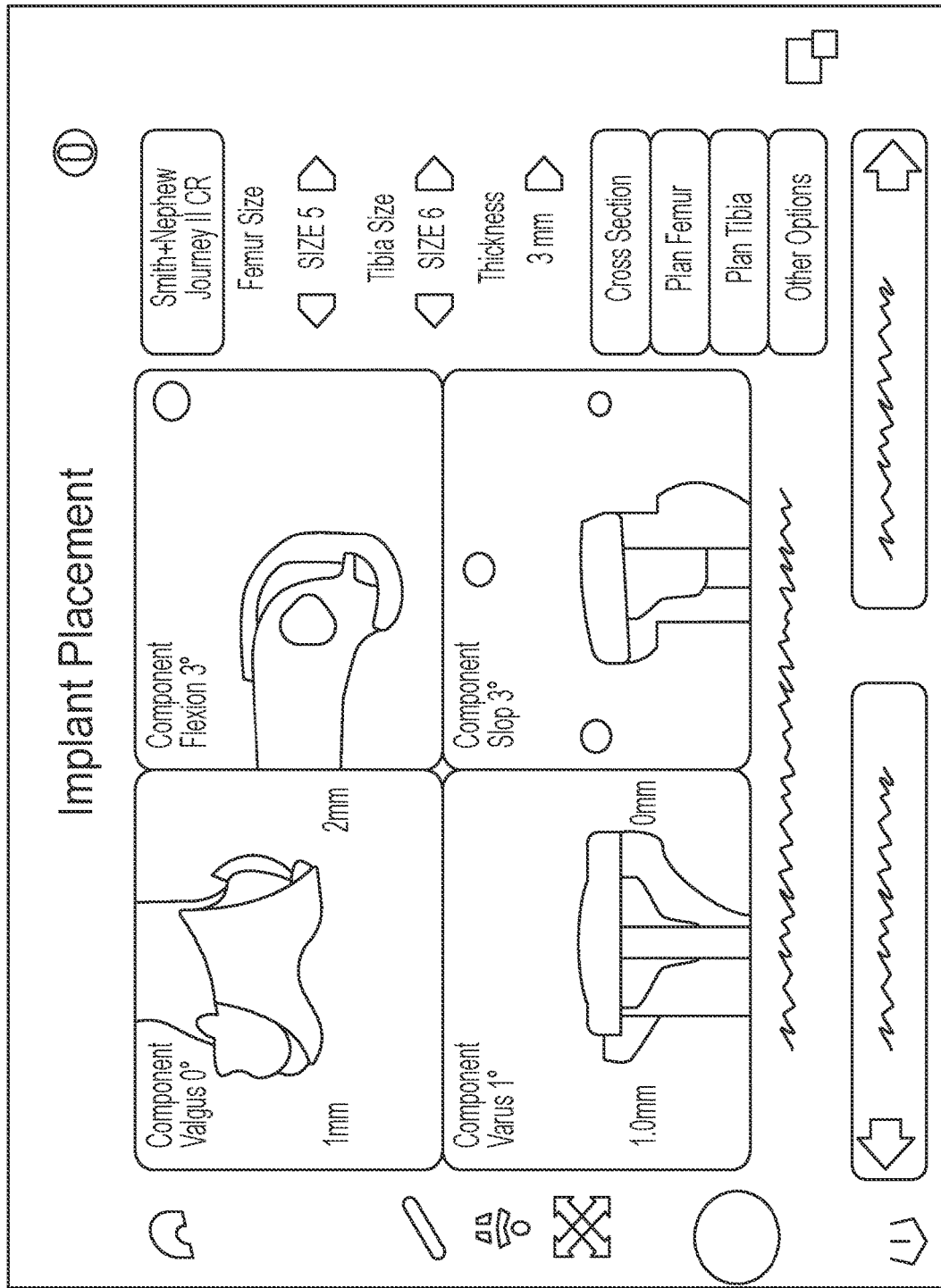
Figure 7C:
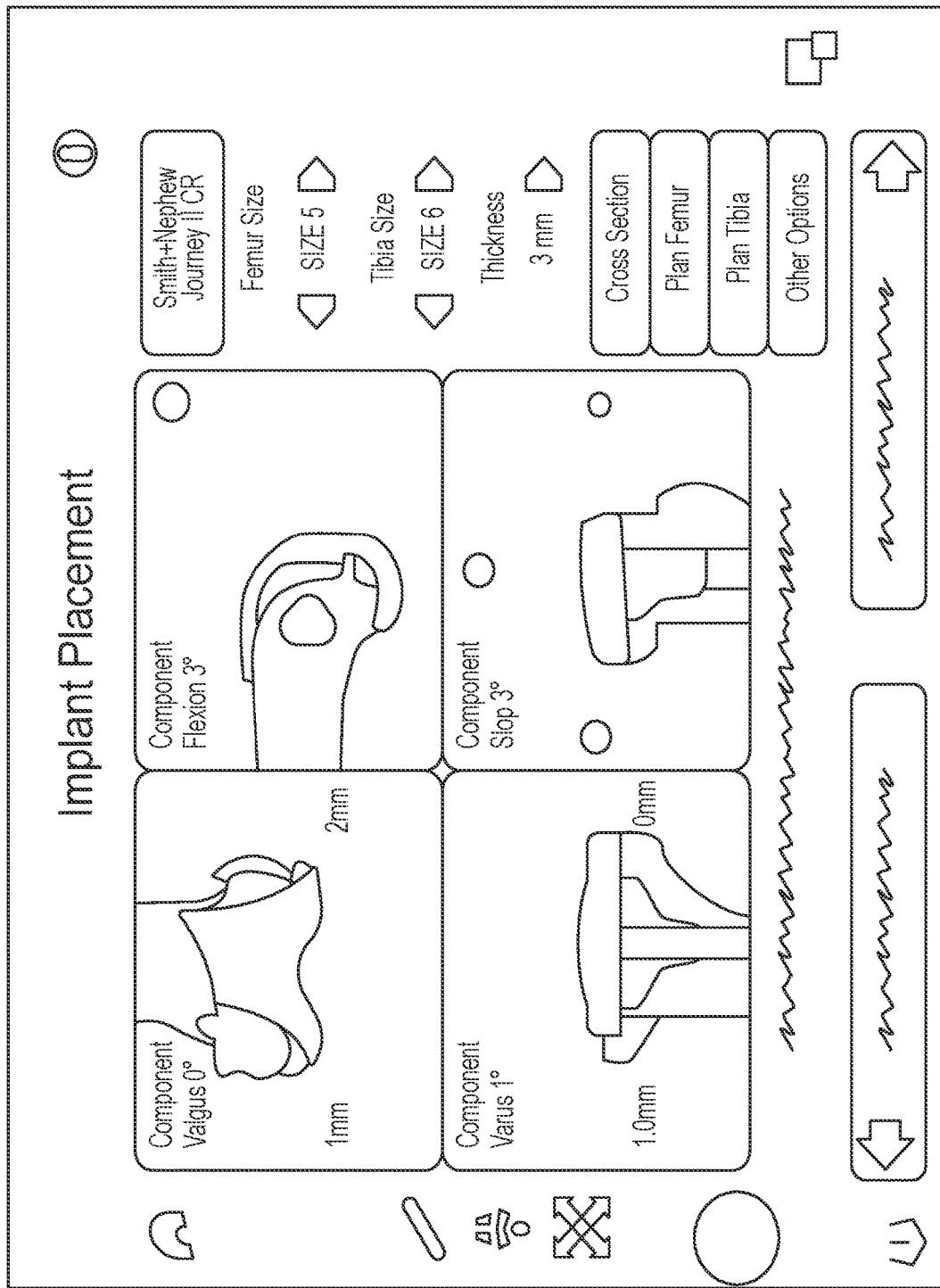

In some embodiments, predictions or recommendations made by the aforementioned machine learning models can be directly integrated into the surgical workflow. For example, in some embodiments, the Surgical Computer 150 may execute the machine learning model in the background making predictions or recommendations for upcoming actions or surgical conditions. A plurality of states can thus be predicted or recommended for each period. For example, the Surgical Computer 150 may predict or recommend the state for the next 5 minutes in 30 second increments. Using this information, the surgeon can utilize a "process display" view of the surgery that allows visualization of the future state. For example, FIG. 7C depicts a series of images that may be displayed to the surgeon depicting the implant placement interface. The surgeon can cycle through these images, for example, by entering a particular time into the display 125 of the CASS 100 or instructing the system to advance or rewind the display in a specific time increment using a tactile, oral, or other instruction. In one embodiment, the process display can be presented in the upper portion of the surgeon's field of view in the AR HMD. In some embodiments, the process display can be updated in real-time. For example, as the surgeon moves resection tools around the planned resection area, the process display can be updated so that the surgeon can see how his or her actions are affecting the other factors of the surgery.

In some embodiments, rather than simply using the current state of the CASS 100 as an input to the machine learning model, the inputs to the model may include a planned future state. For example, the surgeon may indicate that he or she is planning to make a particular bone resection of the knee joint. This indication may be entered manually into the Surgical Computer 150 or the surgeon may verbally provide the indication. The Surgical Computer 150 can then produce a film strip showing the predicted effect of the cut on the surgery. Such a film strip can depict over specific time increments how the surgery will be affected, including, for example, changes in the patient's anatomy, changes to implant position and orientation, and changes regarding surgical intervention and instrumentation, if the contemplated course of action were to be performed. A surgeon or medical professional can invoke or request this type of film strip at any point in the surgery to preview how a contemplated course of action would affect the surgical plan if the contemplated action were to be carried out.

It should be further noted that, with a sufficiently trained machine learning model and robotic CASS, various elements of the surgery can be automated such that the surgeon only needs to be minimally involved, for example, by only providing approval for various steps of the surgery. For example, robotic control using arms or other means can be gradually integrated into the surgical workflow over time with the surgeon slowly becoming less and less involved with manual interaction versus robot operation. The machine learning model in this case can learn what robotic commands are required to achieve certain states of the CASS-implemented plan. Eventually, the machine learning model may be used to produce a film strip or similar view or display that predicts and can preview the entire surgery from an initial state. For example, an initial state may be defined that includes the patient information, the surgical plan, implant characteristics, and surgeon preferences. Based on this information, the surgeon could preview an entire surgery to confirm that the CASS-recommended plan meets the surgeon's expectations and/or requirements. Moreover, because the output of the machine learning model is the state of the CASS 100 itself, commands can be derived to control the components of the CASS to achieve each predicted state. In the extreme case, the entire surgery could thus be automated based on just the initial state information.

Using the Point Probe to Acquire High-Resolution of Key Areas during Hip Surgeries Use of the point probe is described in U.S. patent application Ser. No. 14/955,742 entitled "Systems and Methods for Planning and Performing Image Free Implant Revision Surgery," the entirety of which is incorporated herein by reference. Briefly, an optically tracked point probe may be used to map the actual surface of the target bone that needs a new implant. Mapping is performed after removal of the defective or worn-out implant, as well as after removal of any diseased or otherwise unwanted bone. A plurality of points is collected on the bone surfaces by brushing or scraping the entirety of the remaining bone with the tip of the point probe. This is referred to as tracing or "painting" the bone. The collected points are used to create a three-dimensional model or surface map of the bone surfaces in the computerized planning system. The created 3D model of the remaining bone is then used as the basis for planning the procedure and necessary implant sizes. An alternative technique that uses X-rays to determine a 3D model is described in U.S. patent application Ser. No. 16/387,151, filed Apr. 17, 2019 and entitled "Three-Dimensional Selective Bone Matching" and U.S. patent application Ser. No. 16/789,930, filed Feb. 13, 2020 and entitled "Three-Dimensional Selective Bone Matching," the entirety of each of which is incorporated herein by reference.

For hip applications, the point probe painting can be used to acquire high resolution data in key areas such as the acetabular rim and acetabular fossa. This can allow a surgeon to obtain a detailed view before beginning to ream. For example, in one embodiment, the point probe may be used to identify the floor (fossa) of the acetabulum. As is well understood in the art, in hip surgeries, it is important to ensure that the floor of the acetabulum is not compromised during reaming so as to avoid destruction of the medial wall. If the medial wall were inadvertently destroyed, the surgery would require the additional step of bone grafting. With this in mind, the information from the point probe can be used to provide operating guidelines to the acetabular reamer during surgical procedures. For example, the acetabular reamer may be configured to provide haptic feedback to the surgeon when he or she reaches the floor or otherwise deviates from the surgical plan. Alternatively, the CASS 100 may automatically stop the reamer when the floor is reached or when the reamer is within a threshold distance.

As an additional safeguard, the thickness of the area between the acetabulum and the medial wall could be estimated. For example, once the acetabular rim and acetabular fossa has been painted and registered to the pre-operative 3D model, the thickness can readily be estimated by comparing the location of the surface of the acetabulum to the location of the medial wall. Using this knowledge, the CASS 100 may provide alerts or other responses in the event that any surgical activity is predicted to protrude through the acetabular wall while reaming The point probe may also be used to collect high resolution data of common reference points used in orienting the 3D model to the patient. For example, for pelvic plane landmarks like the ASIS and the pubic symphysis, the surgeon may use the point probe to paint the bone to represent a true pelvic plane. Given a more complete view of these landmarks, the registration software has more information to orient the 3D model.

The point probe may also be used to collect high-resolution data describing the proximal femoral reference point that could be used to increase the accuracy of implant placement. For example, the relationship between the tip of the Greater Trochanter (GT) and the center of the femoral head is commonly used as reference point to align the femoral component during hip arthroplasty. The alignment is highly dependent on proper location of the GT; thus, in some embodiments, the point probe is used to paint the GT to provide a high-resolution view of the area. Similarly, in some embodiments, it may be useful to have a high-resolution view of the Lesser Trochanter (LT). For example, during hip arthroplasty, the Dorr Classification helps to select a stem that will maximize the ability of achieving a press-fit during surgery to prevent micromotion of femoral components post-surgery and ensure optimal bony ingrowth. As is generated understood in the art, the Dorr Classification measures the ratio between the canal width at the LT and the canal width 10 cm below the LT. The accuracy of the classification is highly dependent on the correct location of the relevant anatomy. Thus, it may be advantageous to paint the LT to provide a high-resolution view of the area.

In some embodiments, the point probe is used to paint the femoral neck to provide high-resolution data that allows the surgeon to better understand where to make the neck cut. The navigation system can then guide the surgeon as they perform the neck cut. For example, as understood in the art, the femoral neck angle is measured by placing one line down the center of the femoral shaft and a second line down the center of the femoral neck. Thus, a high-resolution view of the femoral neck (and possibly the femoral shaft as well) would provide a more accurate calculation of the femoral neck angle.

High-resolution femoral head neck data also could be used for a navigated resurfacing procedure where the software/hardware aids the surgeon in preparing the proximal femur and placing the femoral component. As is generally understood in the art, during hip resurfacing, the femoral head and neck are not removed; rather, the head is trimmed and capped with a smooth metal covering. In this case, it would be advantageous for the surgeon to paint the femoral head and cap so that an accurate assessment of their respective geometries can be understood and used to guide trimming and placement of the femoral component.

Registration of Pre-operative Data to Patient Anatomy using the Point Probe

As noted above, in some embodiments, a 3D model is developed during the pre-operative stage based on 2D or 3D images of the anatomical area of interest. In such embodiments, registration between the 3D model and the surgical site is performed prior to the surgical procedure. The registered 3D model may be used to track and measure the patient's anatomy and surgical tools intraoperatively.

During the surgical procedure, landmarks are acquired to facilitate registration of this pre-operative 3D model to the patient's anatomy. For knee procedures, these points could comprise the femoral head center, distal femoral axis point, medial and lateral epicondyles, medial and lateral malleolus, proximal tibial mechanical axis point, and tibial A/P direction. For hip procedures these points could comprise the anterior superior iliac spine (ASIS), the pubic symphysis, points along the acetabular rim and within the hemisphere, the greater trochanter (GT), and the lesser trochanter (LT).

In a revision surgery, the surgeon may paint certain areas that contain anatomical defects to allow for better visualization and navigation of implant insertion. These defects can be identified based on analysis of the pre-operative images. For example, in one embodiment, each pre-operative image is compared to a library of images showing "healthy" anatomy (i.e., without defects). Any significant deviations between the patient's images and the healthy images can be flagged as a potential defect. Then, during surgery, the surgeon can be warned of the possible defect via a visual alert on the display 125 of the CASS 100. The surgeon can then paint the area to provide further detail regarding the potential defect to the Surgical Computer 150.

In some embodiments, the surgeon may use a non-contact method for registration of bony anatomy intra-incision. For example, in one embodiment, laser scanning is employed for registration. A laser stripe is projected over the anatomical area of interest and the height variations of the area are detected as changes in the line. Other non-contact optical methods, such as white light interferometry or ultrasound, may alternatively be used for surface height measurement or to register the anatomy. For example, ultrasound technology may be beneficial where there is soft tissue between the registration point and the bone being registered (e.g., ASIS, pubic symphysis in hip surgeries), thereby providing for a more accurate definition of anatomic planes.

As discussed herein, an embodiment may allow for the creation of one or more 3D models from 2D image data. 2D image data can be acquired with less cost than volumetric image data such as MRI or CT images. It should be understood, that although the term "3D image data" is primarily used herein, that the models may include one or more of CAD, IGES, STL, VRML, DXF, OBJ, or similar file/application types. In some embodiments, as discussed herein, it may be possible, during the subdivision of an anatomical model, to create an extremely large library of bone shapes (i.e., more than are generally available with a database of standard non-permutable bone shapes standard statistical shape model (SSM) technique). Accordingly, as discussed herein, some embodiments may utilize a semi-automated system. In some embodiments, the semi-automated system may receive additional input from a user (e.g., a medical imaging expert who provides quality control), thereby leveraging the medical expertise of the user to simplify the computational requirements of the system. In some embodiments, the semi-automated system may not receive any additional input from a user.

Figure 8:
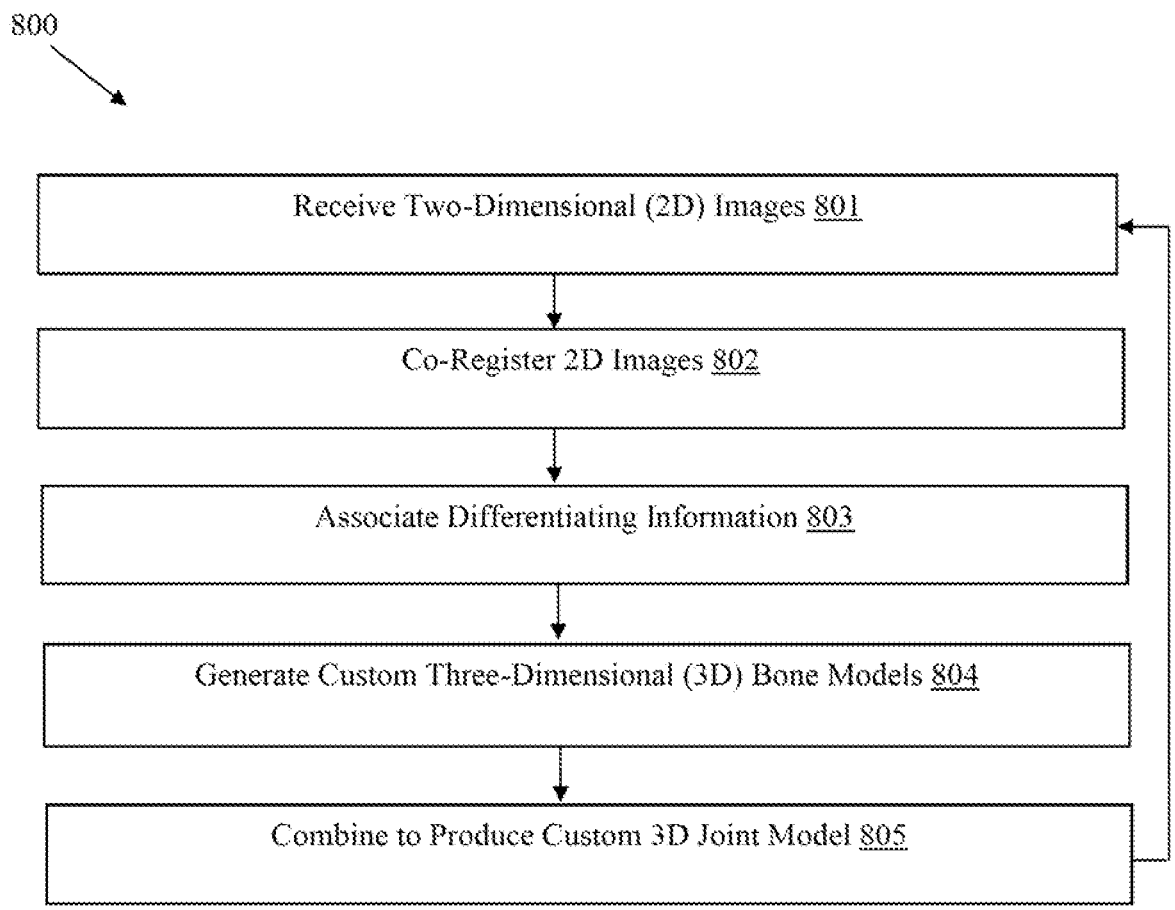
FIG. 8 depicts an illustrative method of producing a custom three-dimensional model of a joint in accordance with an embodiment.

Referring now to FIG. 8, an example embodiment 800 is shown related to the creation of a 3D model of at least a portion of a patient's anatomy from 2D image data. Thus, in some embodiments, a system may receive 801 a plurality of 2D images (e.g., projection radiography, plain film X-ray, cone-beam X-ray, fluoroscopy, tomography, echocardiography, ultrasound, or any known or future 2D image format) that capture at least a portion of a patient's bony anatomy (e.g., one or more bones, or bone segments, forming a joint or region of interest). In some embodiments, the user (e.g., a surgeon or medical professional) may utilize a graphical user interface (GUI) to upload one or more 2D images from either a local or a remote storage device. The GUI may be implemented on a variety of platforms (including but not limited to a computer, a tablet, a smartphone or other mobile device) and may be displayed on a variety of means (including but not limited to a display, a headset, a medical image viewer, and a picture archival and communication system (PACS). In further embodiments, the 2D images may be downloaded directly, or autonomously, by the system from a secondary device, including, but not limited to, a computer, a mobile device, a tablet, a server, a remote database, and the like. In some instances, one or more 2D images may be transmitted by a remote device and received and stored by the system for future use. In other instances, the system may access the remote device and request the 2D images. Further, in addition to the 2D images, differentiating data associated therewith may be received as well. For example, the system may additionally acquire data including one or more properties related to the bones of the 2D image, such as dimensions, measurements, calculated properties, deformities, features, or other differentiating information as described herein. Data relating to properties of the bones may be received with the 2D images, through manual input from a user, from a database, or by other methods known to one having ordinary skill in the art.

Once received 801, the plurality of 2D images may be co-registered 502 to create a modified and/or composite 2D image (e.g., FIGS. 10A-10C discussed below). In some embodiments, the co-registration process 802 may include aligning two or more 2D images to recreate one or more anatomical features of interest. As discussed herein, specifically with reference to FIGS. 10A-10C, a portion of the field of view for each of the received 2D images 801 may overlap with a portion of the field(s) of view of adjacent (i.e., associated) 2D images. Thus, in some embodiments, these overlapping areas may be analyzed (e.g., autonomously or via human review) to enable common features to be aligned with one another and thus the plurality of 2D images may be "stitched" together to form a composite 2D image. In the embodiment depicted in FIGS. 10A-10C, multiple images are stitched together to form a composite, full-length, leg x-ray image. In some examples, the stitching may be assisted by radio-opaque tattoos or electronic measurement devices that communicate position/orientation at the time of acquiring the X-Ray images or other 2D images.

In a further embodiment, the system may associate differentiating information 803 acquired by the system with the images, including one or more properties related to the bones of the 2D image, such as dimensions, measurements, calculated properties, deformities, features, or other differentiating information as described herein. Data relating to properties of the bones may be received with the 2D images, through manual input from a user, from a database, or by other methods known to one having ordinary skill in the art.

The system can landmark the composite image (or at least one of the individual 2D images) and associate the landmarks and any further known differentiating information with the image(s). Landmarking may be performed by identifying one or more key points with respect to the patient anatomy (e.g., bone, joint, ligament, etc.) in order to further characterize the area of interest. The landmarks may be associated with the composite image and/or individual 2D images to serve as differentiating data in the process as further described herein. It should be noted that landmarking is optional and may not be performed in some examples. In these examples, an impression of the bone's silhouette on a 2D projection (e.g., X-rays), translucent bones superimposed on the X-ray, or as simulated X-ray can be used as a registration landmark In some embodiments, the key points may be related to one or more anatomical features and/or associated with a known portion, anatomical feature, or landmark. For example, in some embodiments, the one or more key points may refer to portions of the bony anatomy, locations of ligament attachment, and/or size and direction extremes (e.g., points of the Adaptive Guide VISIONAIRE system, bony landmarks, anatomic landmarks, geometric inflection points, etc.). In a further embodiment, the key points are related to features and/or associated with a portion of an anatomical feature or landmark. In additional embodiments, the key points may be associated with a subdivided segment. In additional embodiments, the key points may be obtained by intersecting projected rays of 2D image landmarks in 3D space relative to a 3D candidate bone model. In still additional embodiments, the 2D or 3D solid is divided into discrete segments such that particular segments or areas which represent the bone may be individually manipulated, as described herein.

In additional embodiments, the one or more key points may be associated with one or more certain anatomical features, such as, for example, a knee or hip center, one or more posterior points on a patient's condyles (e.g., lateral and medial), an anterior notch point, epicondyles (e.g., lateral and medial), points along the femoral AP axis, mid planes, or intersection points, or the like. In further embodiments, a key point may identify an expected resection location or an expected position for one or more surgical tools (e.g., a cut guide, trial implant, etc.) with respect to one or more anatomical features or landmarks. In some embodiments, the key point(s) may be located on an anatomical feature or landmark. In other embodiments, one or more of the key point(s) may be located at a pre-determined offset position from the one or more features or landmarks. Accordingly, in some embodiments, key points may be associated with a feature, a landmark, or a known location (e.g., at a known vector relative to an identifiable anatomical location). Thus, it should be understood that in some embodiments, each key point, or set of key points chosen for identification may vary based on the patient anatomy (e.g., the particular joint) or the type of procedure to be performed.

Once co-registration 802 is complete, landmarking 803 may be performed. As discussed further herein, in some embodiments, landmarking 803 may be performed manually (e.g., via the GUI). In other embodiments, a computing device may identify (i.e., auto-landmark) the one or more key points (e.g., based on machine learning, artificial intelligence, artificial neural networks, or the like). In some embodiments, manual adjustments may be made to the key points. In some embodiments, the set of key points that are chosen for identification may be consistently and accurately identifiable across a plurality of procedures on a plurality of patients. In some embodiments, due to the consistency and accuracy in the landmarking 803, the system may calculate one or more properties of the bones of the patient. In other embodiments, various dimensions and/or deformities of the bones may be identified and/or calculated. For example, with respect to the knee joint, a system may calculate a varus, valgus, and/or bow angle deformity of the femur, tibia, and/or entire leg. As described, it is further contemplated that while one or more properties are calculated, the step of landmarking 803 may further encompass associating in the same manner any further differentiating data acquired by the system with the 2D image, including one or more properties related to the bones of the 2D image. For example, data relating to properties of the bones may be received with the 2D images, through manual input from a user, from a database, or by other methods known to one having ordinary skill in the art.

While identification of key points and calculation of properties of the bones as described herein may be beneficial, this step may be omitted in some embodiments. Due to the visual assistance provided by a user for alignment, the identification of key points is not required for generation of the 3D bone models. Still, key points and calculation of various properties may assist the system in more accurately estimating features of the bones, and thus more accurately and efficiently providing comparable representative bones as further described below. In step 804, the system generates a custom 3D bone model for each of the bones associated with the joint of the patient bony anatomy.

Figure 9:
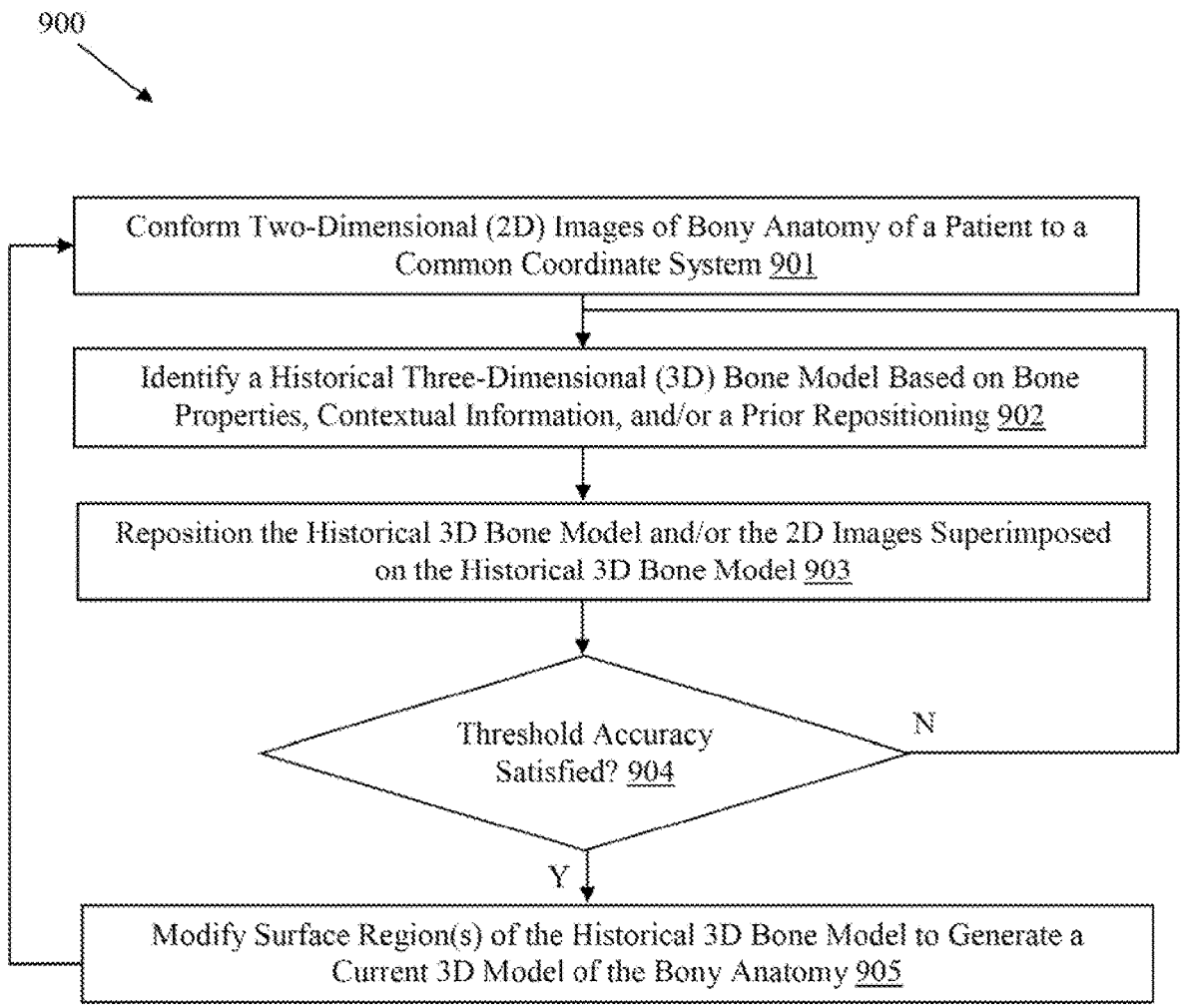
FIG. 9 depicts an illustrative method of generating a custom three-dimensional bone model in accordance with an embodiment.

Referring to FIG. 9, an illustrative method 900 for generating a custom 3D bone model in step 804 of FIG. 8 for a bone of the joint of the patient is shown. In some embodiments, a system performing the method 900 may conform the candidate bone to a common, or known, coordinate system 901 using the 2D images obtained and co-registered as described in more detail above. Also as explained above, the 2D images can be different views of the bony anatomy of the patient bone and can include radiographs generated via X-ray or ultrasound, although other types of 2D images can also be used in other examples.

In a further embodiment, a 3D model of a candidate bone (e.g., from a library of historical 3D models of candidate bones) substantially matching the patient bone may be identified 902 and presented (e.g., on a display device) from one or more views, optionally with one or more of the 2D images of the patient bony anatomy superimposed on the 3D model. The 3D model can be identified based on bone properties of the bony anatomy, contextual information including demographic information associated with the patient, and/or a repositioning of the 3D model or one or more of the 2D images in a prior iteration of the method 900. Optionally, the bone properties can be automatically extracted from the 2D images using computer automation (e.g., image processing or analysis techniques or the application of artificial intelligence (AI) models), although the bone properties can be input or extracted manually or obtained in other ways. The bone properties can relate to contours, surface regions, features and associated locations, deformities, or any other characteristic of the patient bony anatomy.

In some examples, the system can output an interactive display that facilitates selection of output filters that facilitate identification of the 3D model from the library. In these examples, each of the filters is associated with one of the bone properties or a portion of the contextual information. Additionally, in a second and subsequent iteration of the method 900, the 3D model can be identified 902 based on a repositioning of the 3D model or one or more of the 2D images in order to improve an alignment of the 3D model or 2D images. In these examples, the 3D model can be identified based on a comparison of portions of a silhouette of the bony anatomy in the 2D images with the a 2D representation of the first historical 3D model, which also can be a silhouette, following the repositioning. The comparison advantageously and efficiently resolves one or more ambiguous bone film projections. The system can analyze the silhouette or other contour or outline of the bony anatomy and information regarding the repositioning to select a subsequent 3D model that more closely matches the bony anatomy.

Accordingly, in some embodiments, the template 3D bone model associated with the candidate bone may be an idealized bone or preferred bone utilized by default for an initial comparison. In other embodiments, the template 3D bone model may be an initial representative bone selected from a library of representative bones, as discussed herein. In some instances, the representative bone is selected to closely match the candidate bone, based on any and/or all known data (e.g., key points, landmarks, axes, anatomy size, orientation, angle, and/or the like based on the 2D images, demographic data collected from the patient, historical medical images, and/or the like).

The identified 3D bone model corresponding to the candidate bone may then be repositioned 903, for example, by rescaling, translating vertically or horizontally, or reorienting the 2D images of the bone of the patient to improve the alignment with the 3D model. Alternatively, the 3D bone model may be repositioned, scaled, and/or re-oriented with respect to the 2D images to accomplish the same result. The comparison that facilitates the improved alignment can be based on the 2D images collectively or as open shell surfaces. The open shell surfaces can include a wireframe, a simulated back-projected representation (e.g., to resemble a CT image), interpreted pixel greyscale values or outlines, or one or more derived landmarks, axes, lines, or contours, for example, although other types of surfaces can also be used. Additionally, the bony surfaces can be represented by visible portions of the bony anatomy of the patient or a shape of the bony anatomy of the patient without soft tissue represented in the 2D images, and other types of representations can also be used in other examples.

In step 904, the system determines whether the 3D model satisfies a threshold accuracy with respect to the 2D images and the quality of the representation of the bony anatomy reflected in the 3D model. The determination can be based on a manual input or an automated analysis of the silhouette of the bone in the 2D images or any other automated comparison and established or defined thresholds. If the threshold accuracy is not satisfied, then the No branch is taken back to step 902 and steps 902-904 are repeated in a subsequent iteration. In the subsequent iterations, the system uses the information regarding the repositioning to improve the selection of the candidate bone for which the associated 3D model is identified and presented.

Figure 16:
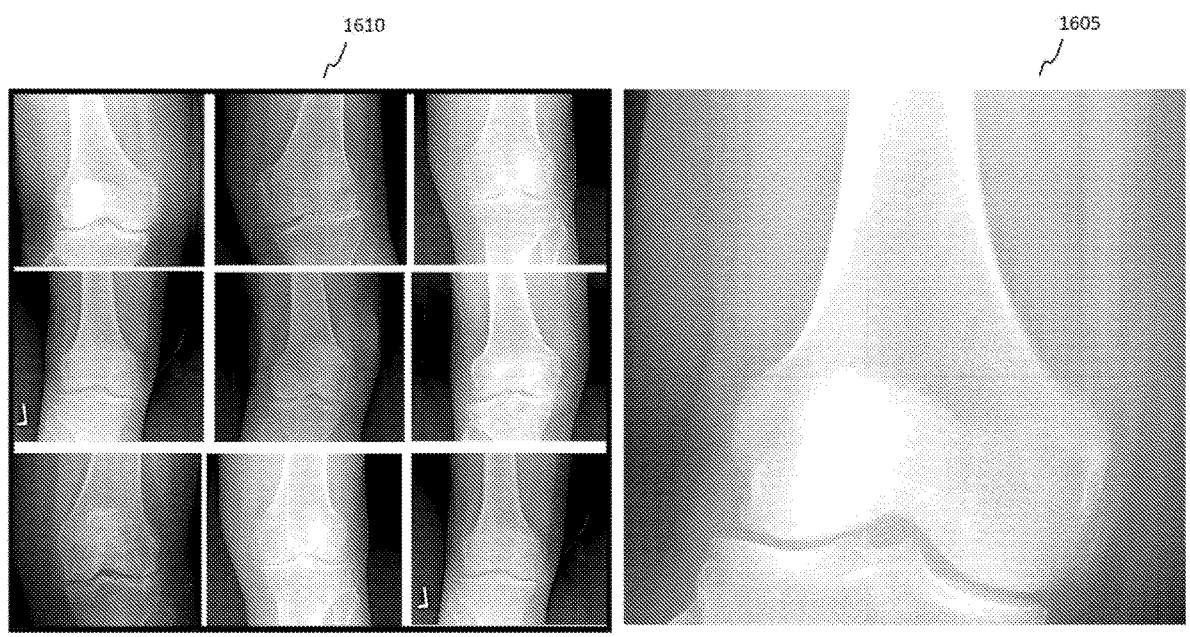
FIG. 16 depicts a process of selecting a representative bone from a set of identified potential representative bones in accordance with an embodiment.

Based on the repositioning 903 as described herein, the system is able to identify the location of the various identified key points 1011 with respect to known key points of the template 3D bone model. As shown in FIG. 16, the system can present a set of potential representative bones (i.e. one or more representative bones 1610) meeting a threshold of similarity from which the user and/or AI system may select a representative bone. In some embodiments, this may occur because the user and/or AI system determines that the potential representative bones do not match the 2D image to an acceptable degree. The set of potential representative bones may be related to the initial set of representative bones in the same manner described herein (i.e. neighboring bones in the library) and may be arranged or presented in the same manner described herein (i.e. by ranking magnitude of similarity). In some embodiments, the user and/or AI system may choose to revert to the previous set of potential representative bones. This process may continue iteratively until acceptable results are identified.

Accordingly, the repositioning may lead to updated results (i.e. a new set of identified potential representative bones) based on the alignment information and any of the various factors discussed herein. The user and/or AI system may review the new set of identified potential representative bones (e.g., as shown in FIG. 16) and select a new representative or candidate bone. Further, the user and/or AI system may choose to return to the repositioning step 903. Alternatively, the user and/or AI system, upon review, may choose to continue with the initial representative bone. In other embodiments, the AI system may prompt the user to perform any of the described actions. However, if the threshold accuracy is satisfied in step 904, then the Yes branch is taken to step 905.

The 3D bone model may then be modified 905 by altering one or more contours or surface or contact region(s) to more closely match the bony anatomy of the patient. Upon completing the surface region modification, the resulting 3D model substantially corresponds to the bony anatomy. Accordingly, this technology advantageously generates a 3D model from 2D images in a more effective and efficient manner. The generated 3D model can be used to facilitate digital templating to size implants or establish clinical landmarks for surgical planning or post-operative evaluation, for example. In other examples, the generated 3D model can be used to generate or modify a surgical plan, or define a surgical volume, for a robotic surgery associated with the bony anatomy of the patient. In yet other examples, the generated 3D model can be used to generate a patient-specific cut or pin guide, grasp wrench-space contacts, or visual references for the cut or pin guide, and the 3D bone model can also be used in other ways in other examples.

In some embodiments, the system may repeat each step of process 900 for each bone associated with a joint of the patient. For example, in the non-limiting example of a knee joint, the process 900 could be separately performed for both the femur and the tibia. Additionally or alternatively, in the case of a hip joint, the process 900 could be separately performed for both the femur and the acetabulum. For other joints, each bone of interest could be modeled through the process 900 in a separate step. It is also contemplated that more than one bone could be modeled simultaneously in a single process. It is contemplated that for each candidate bone, a different set of key points may be utilized in calculating properties as well as referencing and comparing to the historical bone data. In a further embodiment, the process may be accelerated for additional bones. During the process 900 for a first bone, once a representative 3D bone model is selected from the library, one or more 3D bone models of the corresponding additional bones of the joint from the same historical record (i.e., the same historical patient) may also be presented such that step 902 may be skipped or simplified for subsequent bones. Adjustments to scale and orientation and modifications to contours or surface regions may still be performed on an individual basis for each 3D bone model.

Referring back to FIG. 8, the process 800 may be completed by producing a custom three-dimensional model of the joint 805. After generating each of the custom 3D bone models according to the method 900, they may be combined 805 to produce the custom three-dimensional model of the joint. As the various axes of each joint have been defined and adjusted throughout this process, the alignment of each 3D bone model may be known such that they may be automatically oriented with respect to one another. In some examples, a plurality of historical 3D bone models corresponding to a plurality of candidate bones associated with different patients can be identified for the joint of the patient.

The three-dimensional model of the joint may be subsequently packaged by the system and transmitted to a variety of locations and systems. As non-limiting examples, the three-dimensional model of the joint may be transmitted to a patient record database, a clinical study database, a surgical planning system, an implant planning or manufacturing system, a guide planning or manufacturing system, a tool planning or manufacturing system, and/or a training system. Further, the library of historical bone image data may include additional information with respect to the historical bones from which the representative bones are derived and/or the historical patients associated therewith. In some embodiments, the representative bones may be associated with notes or indications by a surgeon. The notes or indications may include disease diagnosis, such as assessments of soft-tissue surrounding the historical bones and/or osteophytes which indicate a cause of disease (e.g. indicating that a bone deformity was caused by trauma or osteoarthritis). The notes or indications may additionally or alternatively include treatment plan information related to the historical bones. For example, a surgeon may indicate a degree of deformity and wherein the deformity was not comprehensively treated (e.g. an extreme deformity may not be treated because the soft tissues may not sufficiently adapt to such treatment), the notes may indicate the extent of treatment as well. As a further example, the notes or indications may describe the choice of femoral head implant size utilized to maximize the range of motion. As an additional example, the notes or indications may include planned bone corrections using 2D or 3D digital templating software. In a further embodiment, the representative bones may be associated with implant information. The implant information may be descriptive of the specific implant (e.g. size) or descriptive of patient or bone preparation (e.g. location of cut planes, reamed surfaces, pins, or plates). The implant information may also indicate usage of additional tools, guides, or components in the surgery or the surgical history of the patient. For example, the implant information may indicate which augments, wedges, stems, trauma plates, screws, etc. were utilized for the historical patient. Any of the additional information described herein may be predictive of an implant, an additional component, or a course of action best suited for the current patient. In another embodiment, the representative bones may be associated with surgical plans or surgical outcome data, implant design data, and the like. It should be noted that the embodiments of additional information described herein are intended to be non-limiting examples. This additional information may be relayed to external locations and systems along with the three-dimensional model of the joint. Due to the similarity of the patient's joint to the representative bones, the additional information may not only be informative and assist future decisions by medical professionals, but it may even further assist in planning related to a surgical procedure. In some cases, the additional information may entirely alleviate one or more steps of a planning or manufacturing process.

It is contemplated that some steps of the processes 800 and 900 described herein may be disregarded without halting or interrupting the process. For example, the co-registration step 802 may be pre-performed or disregarded altogether, e.g. the process could continue utilizing a single short-film 2D x-ray image 1005 in place of the composite 2D image 1010. As a further example, the landmarking step 803 may be disregarded without halting the progress. It should be noted, however, that inclusion of the landmarking step 803 provides further information to the system (i.e. the key points 1011) for use in identifying potential representative bones. As a further example, the modifying step 905 may be performed separately at a later time, or disregarded altogether. In some embodiments, the 3D bone model may be sufficiently representative of the candidate bone without further modifications. In other embodiments, the resulting 3D model of the joint may be completed without performing the step 905. The 3D model may be packaged and transferred to another system, where such modifications could occur.

It is further contemplated that any of the steps in the processes 800 and 900 described herein may be performed by a computing device. Through machine learning, the computing device may be able to perform several steps without intervention from a user. For example, the computing device may be able to co-register the plurality of 2D images by automatically recognizing common features and aligning the 2D images accordingly. In some embodiments, the computing device may automatically identify key points (i.e., auto-landmarking). For example, a computing device utilizing machine learning may be able to more consistently and accurately identify the key points. Even further, the computing device may be able to identify a greater number of key points than may be feasibly identified manually (e.g., due to time constraints, lack of consistency, lack of accuracy, etc.). This additional landmarking may lead to more accurate generation of 3D bone models. In further embodiments, the system may automatically align candidate bones and orient the views of representative bones. Automation of all of the steps described herein is contemplated. Additionally, in embodiments incorporating one or more automated steps, the user may also have the option to make adjustments to the steps completed by the system. A user may wish to modify the position of automatically identified key points, adjust the alignment of the plurality of 2D images, or the like.

The process as described herein is not intended to be limited in terms of the particular embodiments described, which are intended as illustrations of various features. Many modifications and variations to the process can be made without departing from its spirit and scope, as will be apparent to those skilled in the art. For example, while various steps of the processes described herein may comprise re-positioning, scaling, orienting, rotating, or otherwise modifying a 2D image to better match an additional visual representation (e.g., an additional 2D image, a 3D model, a template, etc.), it is contemplated that the additional visual representation may instead be modified in a corresponding manner to better match the 2D image. Further, while various steps of the processes described herein may comprise comparing, landmarking, aligning, orienting, adjusting, or otherwise modifying a composite 2D image, it is contemplated that the modifications may be made with respect to one or more individual 2D images or a 2D image which comprises a portion of the composite 2D image.

Figure 10A:
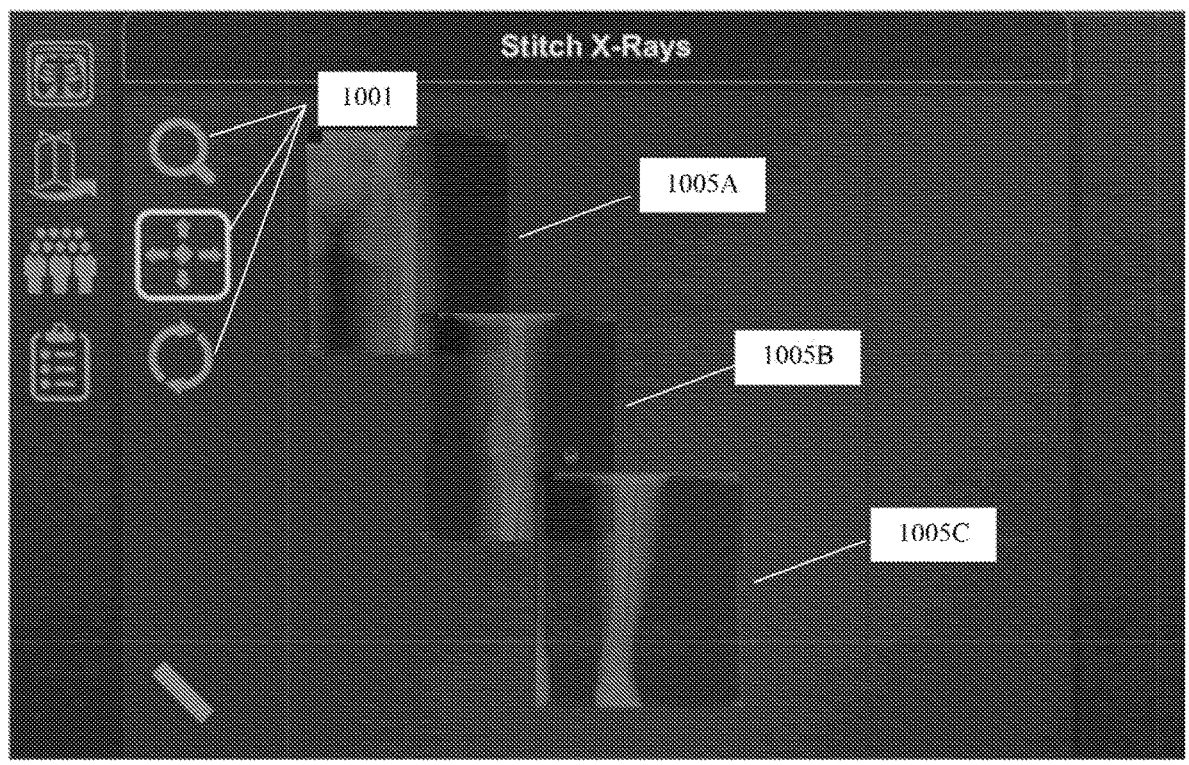
FIGS. 10A-10C depict a process of co-registering a plurality of 2D images in accordance with an embodiment.

Referring now to FIG. 10A, an illustrative example of a plurality of received 2D images are shown (i.e., 1005A, 1005B, and 1005C) as radiograph "x-ray" images. However, as discussed, various forms of 2D images are contemplated. In further embodiments, the 2D images may comprise fluoroscopy images, projectional radiographs, 2D computed tomography images, 2D echocardiography images, ultrasound images, and the like. Each of the plurality of 2D images may provide one or more sectional fields of view of a region of the patient's body, such that, in sum, the plurality of 2D images capture the entirety of the bones forming the anatomy of interest (e.g., the joint).

By way of non-limiting example, when a knee joint is the anatomy of interest, the plurality of 2D images may include a first image capturing an upper portion of a patient's femur 1005A, a second image capturing a lower portion of the femur and an upper portion of the tibia 1005B, and a third image capturing a lower portion of the tibia 1005C. Further, while a single view may be sufficient, additional views of the plurality of bones may be provided. In some embodiments, for example, images of a femur and/or a tibia may be provided from an anterior-posterior (AP) view and/or a medial-lateral (ML) view. Thus, embodiments may have a corresponding 2D image from a second view for each of the 2D images shown. In other embodiments, only some of the 2D images from a first view may have a corresponding 2D image from a second view.

Figure 10B:
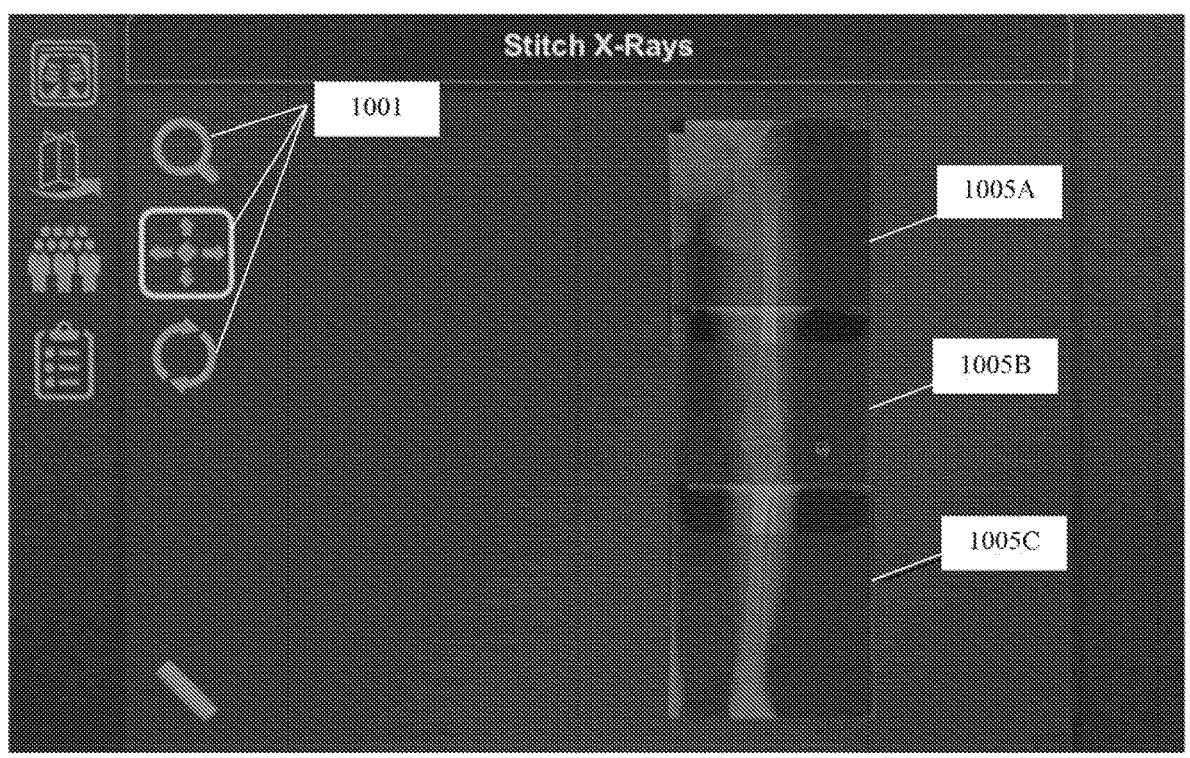
Figure 10C:
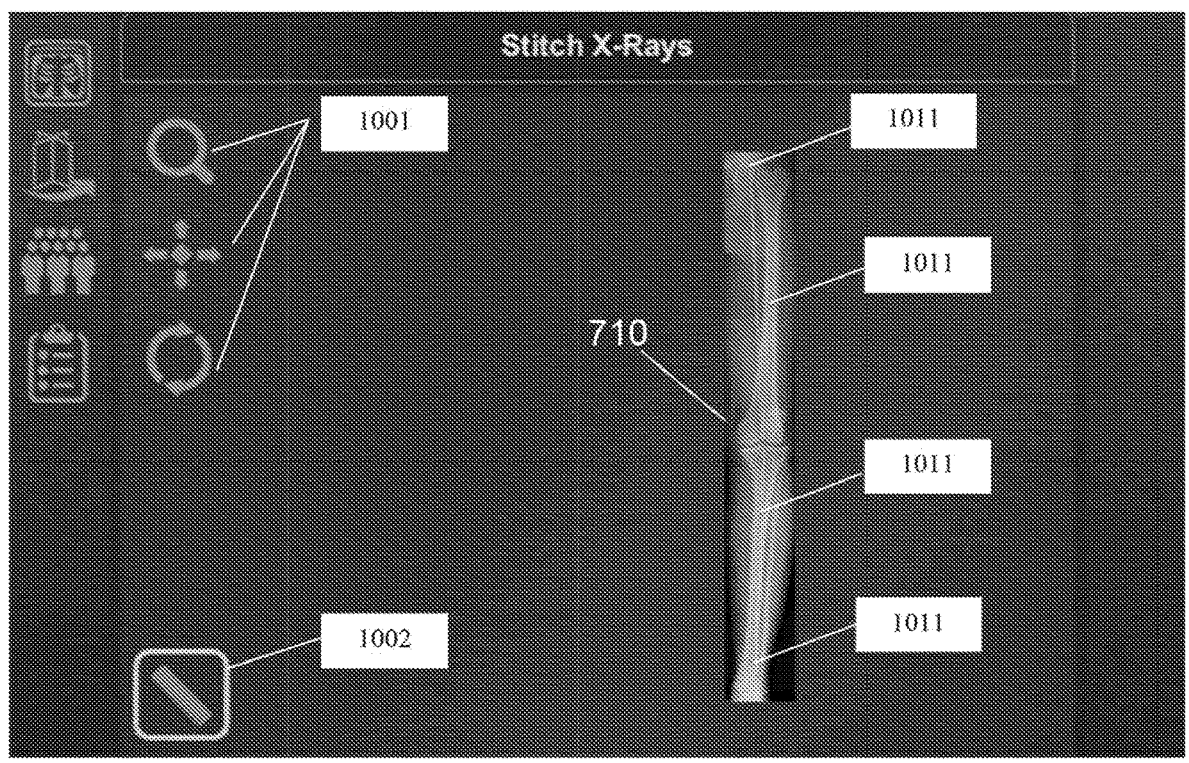

In some embodiments, as shown in FIGS. 10A-C, alignment of the 2D images may require repositioning, rotating, and/or scaling each 2D image to align with other images. As depicted, the composite image 1010 may also be cropped to isolate the bones of the joint. In some embodiments, the co-registration may be performed manually through the user interface via alignment tools 1001 (e.g., move, rotate, scale, etc.). In a further embodiment, the co-registration may be performed by a computing device which recognizes one or more anatomical features. In some embodiments, a user may make manual adjustments to the computer-generated co-registration.

In some embodiments, and as shown in FIG. 10C, the composite image 1010 may be used to determine bone size, bone alignment, bone deformities, mechanical axis, joint line, etc. In some embodiments, and as shown, one or more key points 1011 may be identified (e.g., manually or autonomously). By way of non-limiting example, in an embodiment where the key points are selected manually, a user may select a measurement tool/guide 1002 to enable the points to be selected, as well as the ability to associate one or more points with one or more other points (e.g., to create an axis line (e.g. a mechanical axis or anatomical axis), best fit curve line, etc.). In other embodiments, a computing device may identify (i.e., auto-segment and/or auto-landmark) the one or more key points 1011 (e.g., based on machine learning, artificial intelligence, artificial neural networks, or the like). The user may make manual adjustments to the automatically identified key points. In some embodiments, the set of key points are a pre-determined set which are desired for calculating a pre-determined set of properties of the bones. For example, the system and/or the user may identify the center of the femoral head, one or more articular surfaces, one or more condyles, the intercondylar notch, the center of the shaft, one or more additional points along an axis of the shaft, and the like. The system may calculate one or more properties of the bones of the patient, such as bone size, bone length, anatomical axis, mechanical axis, etc. The system may also identify a deformity of the bone and/or calculate a degree of deformity. For example, a varus, valgus, and/or bow angle deformity of the femur, tibia, and/or entire leg may be calculated. Additionally, measurements of the surrounding soft tissue could be collected to correlate with patient gender or distinguish deformity due to obesity versus other types of degenerate osteoarthritis. In some examples, such measurements could be based on a comparison of X-ray grayscale values to the graysc ale values of the surrounding air.

Figure 11A:
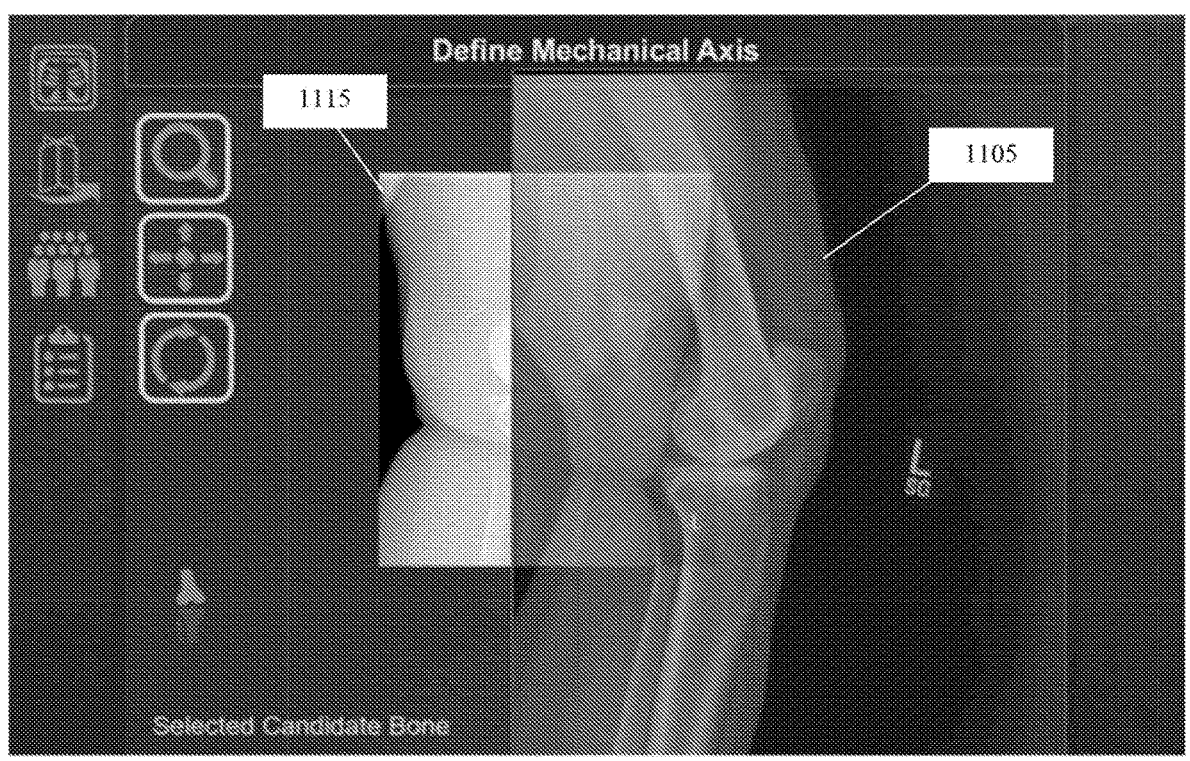
FIGS. 11A-11B depict a process of aligning a bone relative to a common coordinate system in accordance with an embodiment.
Figure 11B:
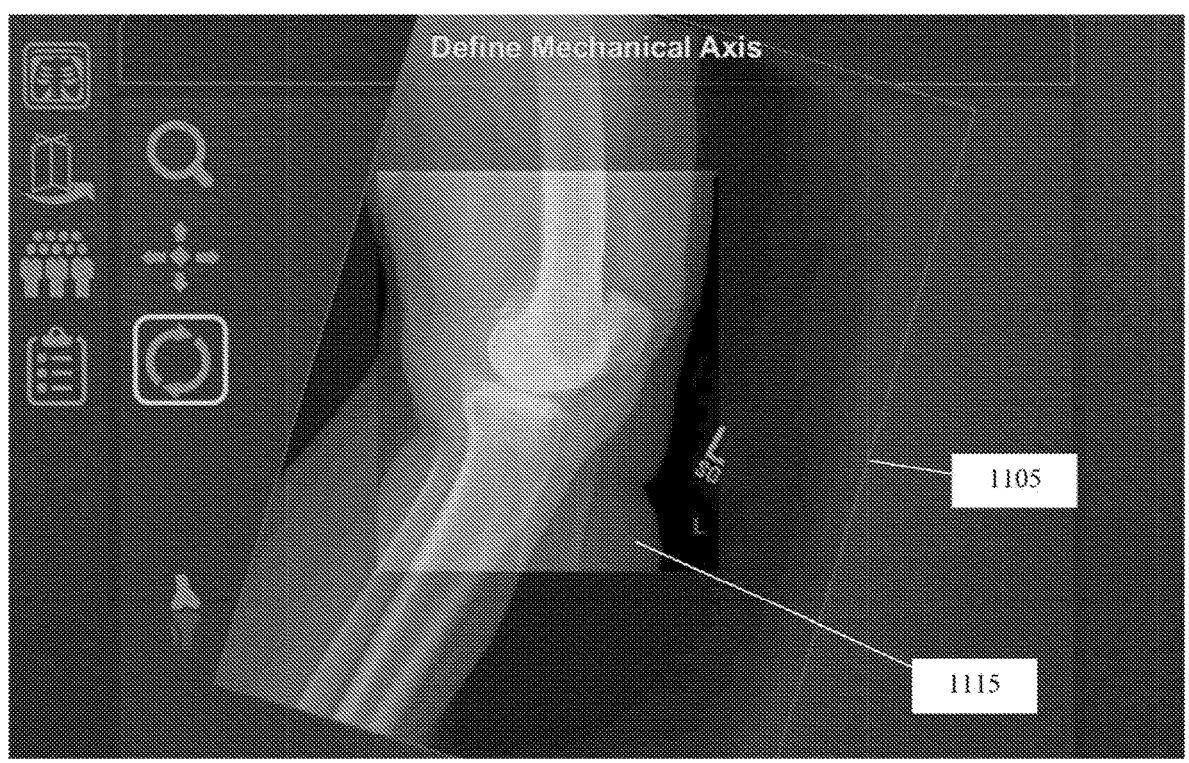

Referring now to FIGS. 11A and 11B, the patient's bone may be conformed to a common, or known, coordinate system (i.e., FIG. 9 at 901). For example, as seen in FIG. 11A, a 2D image 1105 (i.e., the composite image 1010, a portion thereof, or one of the plurality of 2D images 1005A-1005C) of the candidate bone may be compared (e.g., overlaid) and aligned with a template bone 1115 so as to place the candidate bone in a pre-determined orientation. The template bone 1115, which has a known position, orientation, and scale with respect to the common coordinate system (e.g., a coordinate system based on the key points), provides a representation to which the candidate bone may be aligned. In some embodiments, the template bone 1115 may be an idealized bone or preferred bone utilized by default for an initial comparison. In other embodiments, the template bone 1115 may be an initial representative bone selected from a library of representative bones, as discussed further herein. In some instances, the representative bone is selected to closely match the candidate bone, based on any and/or all known data (key points, landmarks, axes, anatomy size, orientation, angle, and/or the like based on the 2D images, demographic data collected from the patient, historical medical images, and/or the like). Alignment of the 2D image 1105 may include repositioning, rotating, and/or scaling of the 2D image 1105 to substantially match and align with the template bone 1115, as shown in FIG. 11B, such that the candidate bone of the 2D image 1105 is placed in the pre-determined orientation. Alternatively, the template bone 1115 may be repositioned, rotated, and/or scaled to match and align with the 2D image 1105, thus achieving the same result. As discussed herein, alignment of the 2D image may be performed by a user and/or software (e.g., based on image analysis, artificial intelligence systems, or other neural network based systems).

Based on the repositioning, rotating, and/or scaling of the 2D image 1105 with respect to the template 1115 (i.e. FIG. 9 at 901), the system may identify the location of the various identified key points 1011 with respect to known key points of the template 1115. Accordingly, in some embodiments, the system may identify one or more potential representative bones for comparison with the patient bone utilizing any and/or all available patient data (as briefly described with respect to template bone 1115). The potential representative bones may be identified from a library of representative bones (e.g. a library of historical bone image data). By way of non-limiting example, the system may utilize one or more key points (and their locations relative to one another and/or corresponding key points of the template 1115) and/or any calculated properties of the patient bone, including, but not limited to, bone dimensions, bone deformities, bone thickness, mechanical axis, and anatomical axis to identify substantial matches among the historical bone image data. In some embodiments, the system may also collect a variety of biometric and demographic data, such as age, height, weight, ethnicity, activity level, previous injuries and medical data, and the like, which may be cross-referenced with the historical bone image data. It should be understood that the representative bones may only be roughly equivalent to the patient's anatomy.

In some embodiments, as the user and/or AI system aligns the 2D image, it may be determined that the template 1115 and the 2D image 1105 differ enough in shape, size, position, rotation, etc. such that further alignment is required. For example, as a user aligns the 2D image 1105 with the template 1115, further incongruities may become evident, prompting the user to further position, rotate, and/or scale the 2D image to more suitably match the template 1115. In some embodiments, the process described with respect to FIGS. 11A-11B may be performed iteratively.

Using the iteratively updated alignment process, discussed herein, may result in one or more updated results/options (i.e. a new set of identified potential representative bones and/or a modified or updated template) based on any changes to the bone dimensions, calculated properties, position of the key points 1011 relative to one another, the key points of the template 1115, and any of the various factors discussed herein. In some embodiments, the user and/or AI system may choose to revert to the previous set of potential representative bones. This process may continue iteratively until acceptable results are identified.

In some embodiments, the new set of potential representative bones may, in whole or in part, include potential representative bones of the initial set. Further, in some embodiments, the new set of potential representative bones may be, in whole or in part, "neighbors" of the initial set of potential representative bones (based on the common coordinate system), i.e. bones identified in the library as showing substantial similarity to the initial set of potential representative bones based on the key points and all other available data as described herein. In some embodiments, the similarity of bones in the library may be quantified by a magnitude of similarity, such that the potential representative bones may be arranged and/or presented in a ranking order of similarity to one another.

The library may include historical bone image data from a plurality of patients. For example, the library may comprise bone image data received from a plurality of physicians across a plurality of hospitals and locations. The historical bone image data may be processed in various manners to allow for more accurate comparison with a 2D image of a candidate bone. For example, in some embodiments, the historical bone image data may include 2D images, which may be directly presented (e.g., 1210A, 1220A, 1230A, and 1240A) for comparison with the 2D image 1105 of the patient bone. In alternative embodiments, the library may include at least one 3D image, 3D image data, 3D solid, or other 3D data representing a bone without having corresponding 2D image data. For example, in some cases, a historical 3D representation (e.g., MRI or CT) of the anatomy of a patient may be included in the library without a corresponding 2D image (e.g., when patients only undergo 3D medical imaging). In such cases, an embodiment may utilize a conversion module that can transform the 3D image data into a representation of a 2D image or a recreation of a 2D image that is visually similar to a standard, or existing, 2D image style (e.g., an x-ray).

In a further embodiment, representative or candidate bone(s) in the library may be conformed or aligned to the common coordinate system (i.e., have a pre-determined orientation, angle, and/or view) such that the representative bones have a known initial orientation, angle, and/or view. In some embodiments, the initial orientation/angle of the representative bone conforms to a pre-determined view. The pre-determined view may be a standard imaging view, such as a view commonly utilized in clinical scenarios or according to textbook directions. By orienting the view with respect to the anatomy and/or the clinical environment (e.g. an x-ray table or x-ray cassette) in the same manner that a clinician may commonly orient patients, the user may be initially presented with a view which is similar to clinical scenarios and thus familiar to an individual having experience with medical imaging. As a result, the user may be able to better evaluate the potential representative bones, for example by identifying features or landmarks of the bone from the same viewpoint as they commonly appear in the clinical setting. In some embodiments, the pre-determined view may correspond to a specific pose of the patient which is common in clinical settings, e.g. supine position, standing position, or seated position. In further embodiments, the pre-determined view may be a view which distinctly displays one or more anatomical features or landmarks to allow for clear visualization and comparison.

Figure 12A:
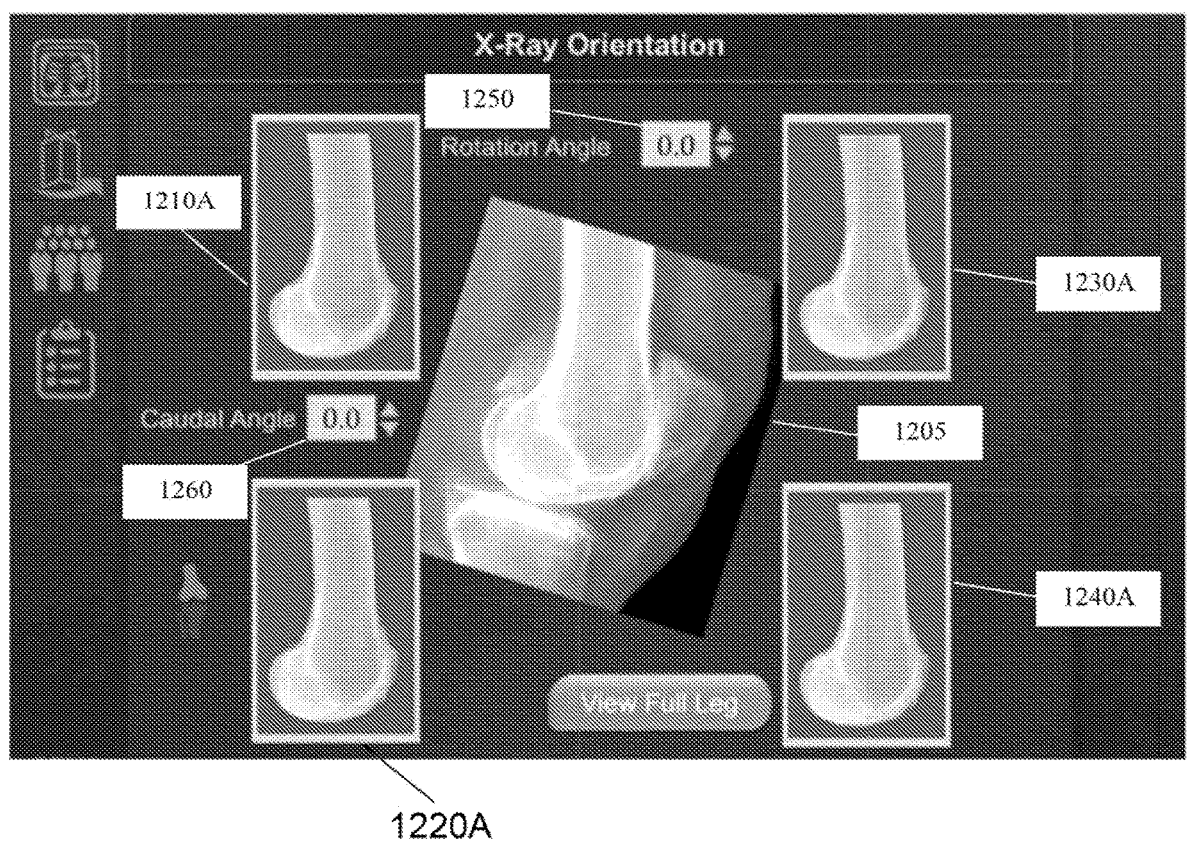
FIGS. 12A-12C depict a process of orienting views of a representative bone from a library relative to a 2D image in accordance with an embodiment.
Figure 12B:
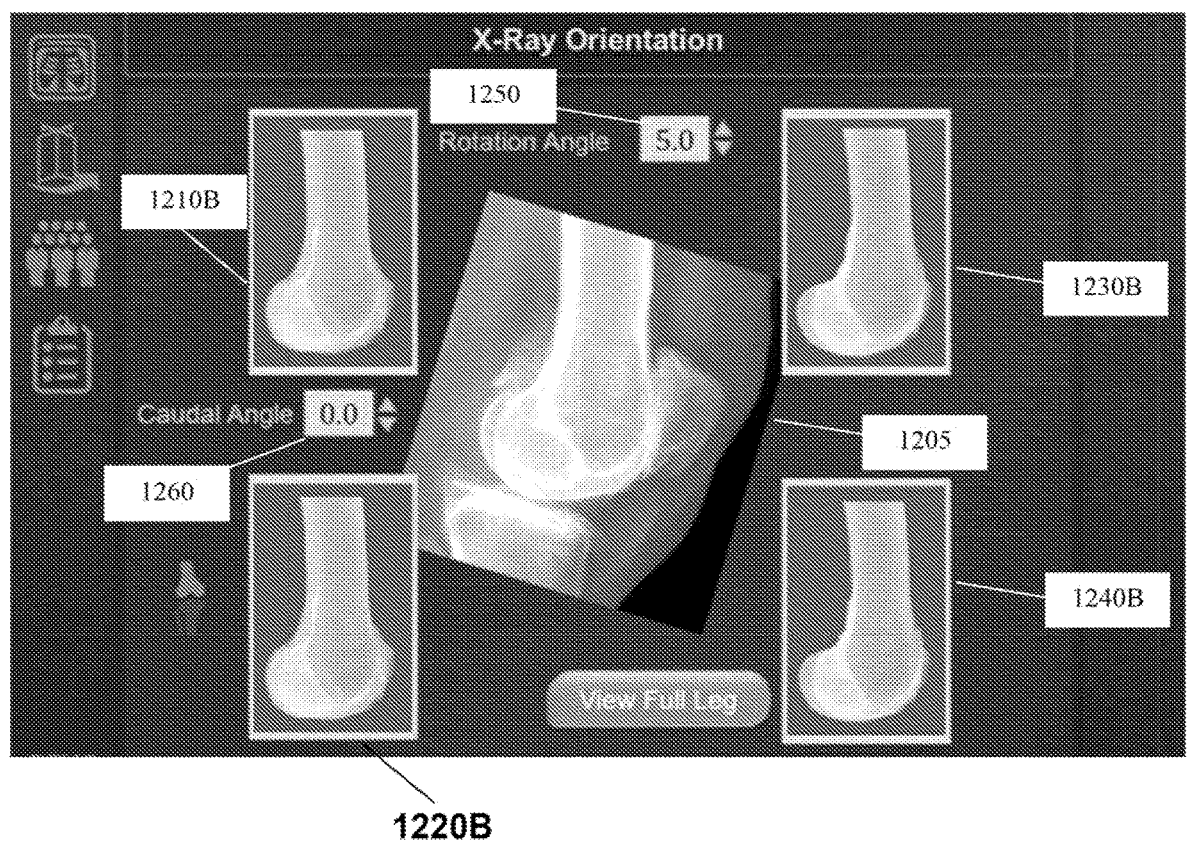
Figure 12C:
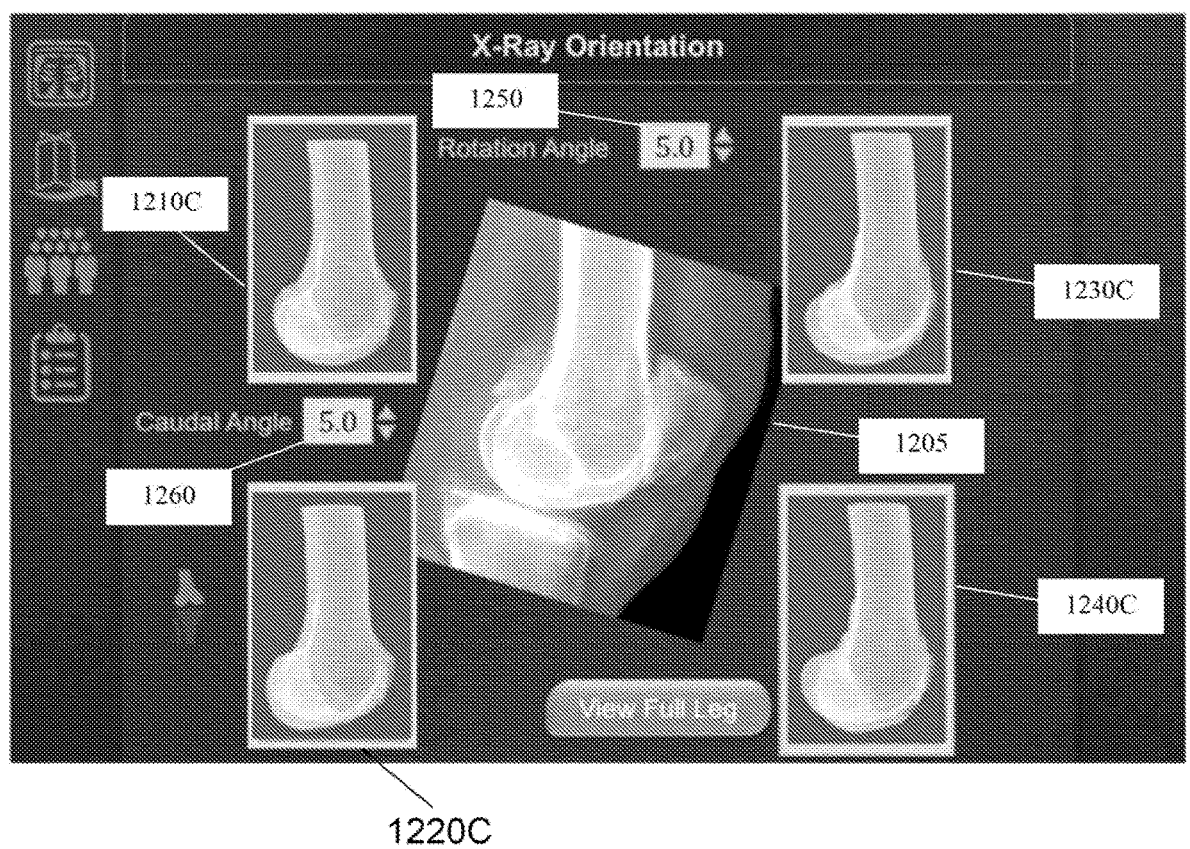

Referring now to FIGS. 12A-12C, an embodiment is shown illustrating step 902 of FIG. 9, wherein a plurality of views of a representative bone are reviewed to select a best match to the patient bone of the 2D image 1105. In some embodiments, a representative bone may be chosen by the user and/or AI system based on the review of the set of potential representative bones. For example, as shown in FIG. 16, the system presents a set of potential representative bones (i.e. one or more representative bones 1610) meeting a threshold of similarity from which the user and/or AI system may select a representative bone. In some embodiments, the system presents a 2D image 1605 of the candidate bone of the patient (e.g. 2D image 1105) in addition to the one or more representative bones 1610 for ease of comparison such that the user may select a representative bone therefrom by comparison. In other embodiments, the representative bone may be chosen by the system from the set of potential representative bones based on a quantified magnitude of similarity to the 2D image 1105 (e.g. a representative bone exhibiting the greatest magnitude of similarity). As seen in FIG. 12A, the representative bone may be presented from a plurality of views (e.g., 1210A, 1220A, 1230A, and 1240A) in order to minimize or eliminate ambiguities which may presented when observing the representative bone from a single 2D view. With respects specifically to use of AI, an AI system in some examples is used to predict the amount a view deviates from an idealized anterior-posterior or medial-lateral view, or another standard view. By using a correctly oriented bone, it will be relatively efficient to scale and position the bone.

As demonstrated in FIGS. 12A-12C, a 2D image (i.e., of the patient bone) 1105 may be analyzed with respect to one or more presented views of the representative bone (e.g., 1210A-C, 1220A-C, 1230A-C, and 1240A-C) to identify a suitably matching view. In doing so, a user and/or automation software may directly compare corresponding anatomical features, key points, or landmarks of the bones. For example, a condyle may be compared across the representative bones and the 2D image of the patient with respect to its size, shape, and position. While the views 1210A-C, 1220A-C, 1230A-C, and 1240A-C are aligned with the candidate bone of the 2D image 1105 to the common coordinate system, the images may need further orienting, or refinement, in terms of their rotation angle 1250 and/or caudal angle 1260. For example, it may be useful to compare the anatomical feature, key point, or landmark as it appears from different viewpoints in order to eliminate ambiguities in the 2D views. Thus, in some embodiments, a user and/or automation software may be able to adjust the rotation angle 1250 and/or caudal angle 1260 of the views (e.g., 1210A-C, 1220A-C, 1230A-C, and 1240A-C, individually or in unison) in order to identify and determine a better potential match between a view and the candidate bone of the 2D image.

Figure 12D:
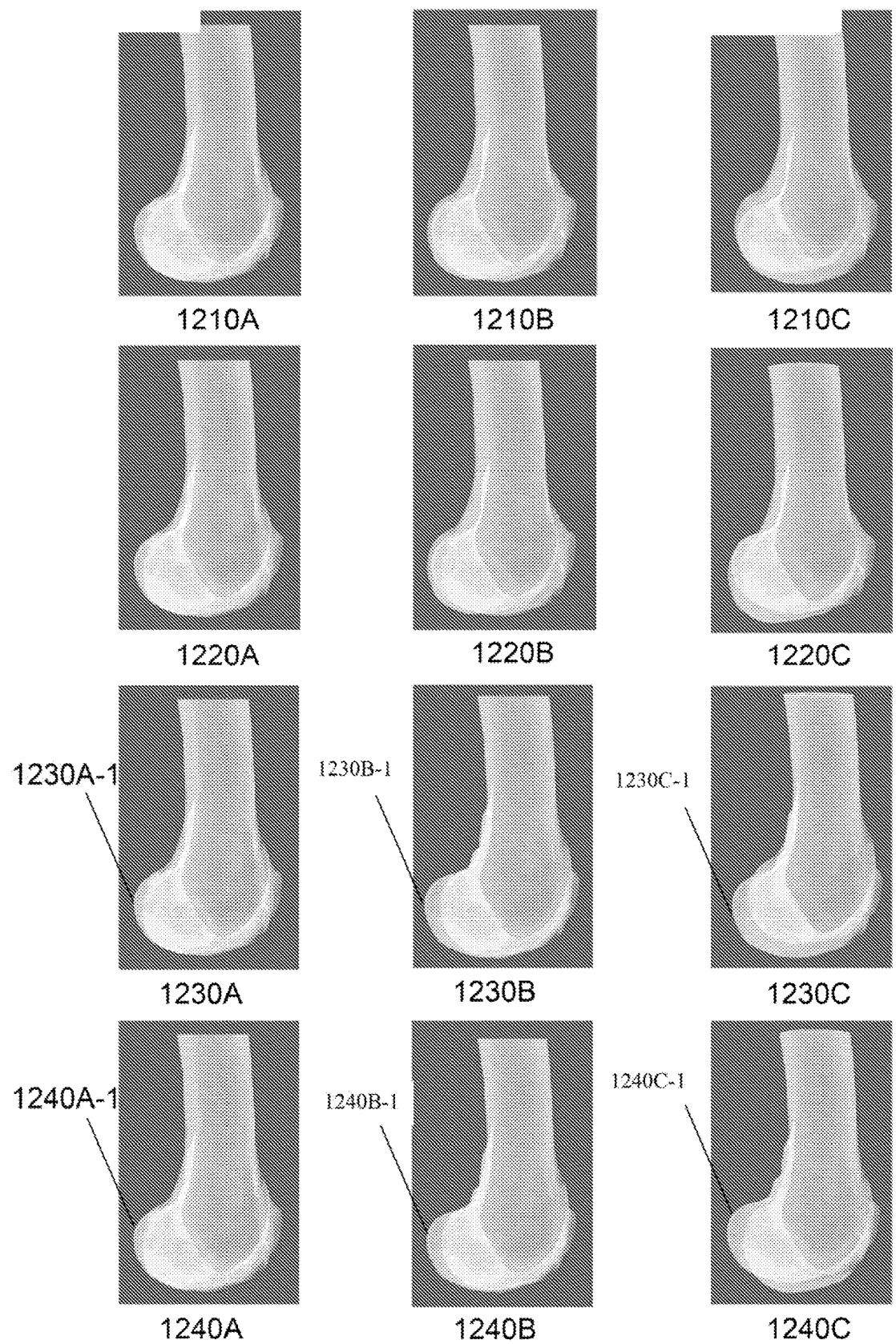

A non-limiting illustration of the 2D views is shown in FIG. 12D. Thus, as shown, the first column (i.e., 1210A, 1220A, 1230A, and 1240A) represents each of the four views with no adjustment (i.e., as shown in FIG. 12A). The second column (i.e., 1210B, 1220B, 1230B, and 1240B) represents each of the four views with a five degree (5°) adjustment to the rotation angle. As shown in FIG. 12B, views 1210 and 1220 have been adjusted 5° rotationally in a first direction from their original orientation (1210A and 1220A as seen in FIG. 12A) while views 1230 and 1240 have been adjusted 5° rotationally in the opposing direction from their original orientation. Finally, the third column (i.e., 1210C, 1220C, 1230C, and 1240C) represents each of the four potential views with a five degree (5°) adjustment to the rotation angle and a five degree (5°) adjustment to the caudal angle. As shown in FIG. 12C, views 1210 and 1230 have been adjusted 5° caudally in a first direction from their original orientation (1210A and 1230A as seen in FIG. 12A) while views 1220 and 1240 have been adjusted 5° caudally in the opposing direction from their original orientation. As a result, four unique views of the representative bone are presented (as shown in FIG. 12C).

Accordingly, as shown in FIG. 12D, closer matching of at least one of the 2D views to the 2D image 1105 may be achieved by adjusting the views. While presentation of similarly sized and shaped bones may provide adequate comparison for selecting a suitably matching representative bone and/or view, ambiguities may still exist in the 2D comparison. For example, as shown in 1230A, a small shadowed area 1230A-1 is depicted. In some embodiments, the shadowed area may be too small to discern whether it represents soft tissue or the edge of a condyle. Thus, in some embodiments, the views may be rotated to better determine the depicted anatomy. As discussed herein, the determination that the orientation/angle should be altered may be made by a user and/or software (e.g., based on image analysis, artificial intelligence systems, or other neural network based systems). Thus, as shown, 1230B is a 2D representation, in which the view shown in 1230A has been rotated five degrees (5°). As shown in 1230B, the shadowed area 1230B-1 is much larger than shadowed area 1230A-1. This is because, in this particular example, the two condyles (i.e., medial condyle and lateral condyle) overlap one another in a 2D image. Thus, as the bone is rotated, the alignment of the condyles is shifted to permit a better view.

In a further embodiment, as discussed with reference to FIG. 12C, the 2D views may be further modified (e.g., the caudal angle may be adjusted) to further increase or enhance the 2D view of the anatomy. Thus, as shown, the original view 1230A may be modified by adding a five degree rotation and adjusting the caudal angle by five degrees 1230C. Accordingly, based on this modification, it can clearly be seen that the small, difficult to discern, shadow 1230A-1 may be enhanced, or better viewed, 1230C-1 by minor adjustments to the potential representative bones. As further shown, additional examples of these visual enhancements may exist (e.g., 1240A-1, 1240B-1, and 1240C-1).

It should be noted that the illustrations of FIGS. 12A-12D are intended to be non-limiting examples. Thus, while FIGS. 12A-12D depict the rotation and caudal angle being adjusted by 5°, the rotation angle and/or the caudal angle may be adjusted by up to 10°, up to 15°, or greater than 15°. Further, all possible increments are contemplated herein. The rotation angle and/or the caudal angle may be adjusted in smaller increments (e.g. a single degree or fraction of a degree) or larger increments (e.g. 10° or more). In some embodiments, increments may be chosen that enact a demonstrable and clinically relevant change in the angles, while still providing the level of granularity required to precisely match the view to the 2D image of the patient bone. Additionally, while the adjustment of rotation angle and caudal angle is discussed herein in terms of degrees, the angles may be adjusted in other incremental units. One or more non-limiting examples may include, adjusting by a percentage of the angle, an arc length, an arbitrary, or best fit, unit, and the like.

As discussed herein, 1230A is a potential representative bone in an original orientation. It should be understood that although the initial views are depicted as being the same, the initial views of the potential representative bones may vary. In some embodiments, any original orientation/angle, as long as such are known or defined by the system, may be accommodated. Multiple distinct initial views may allow quicker and more clear comparison to the 2D image 1105.

In some embodiments, as the user and/or AI system orients the views to the 2D image 1105, it may be determined that the views and the 2D image 1105 differ enough in rotation and/or caudal angle such that further alignment is required. For example, as a user orients the views 1210/1220/1230/1240 to match the 2D image 1105, further incongruities may become evident, prompting the user to further orient the views. In some embodiments, the user and/or AI system may elect to return to the set of potential representative bones (e.g., as shown in FIG. 16), and select a new representative bone.

The process described with respect to FIGS. 12A-12D may be performed iteratively. In a further embodiment, as a user orients the views 1210/1220/1230/1240 to match the 2D image 1105, the system may utilize the orientation of the views as indicative of the orientation (i.e. rotation angle and caudal angle) present in the 2D image 1105. The orientation information may result in updated results (i.e. a new set of identified potential representative bones) based on the orientation information and any of the various factors discussed herein. The user and/or AI system may review the new set of identified potential representative bones (e.g., as shown in FIG. 16) and select a new representative bone. Accordingly, the user and/or AI system may return to the orientation step with the new representative bone. Further, the user and/or AI system may choose to return to the alignment step 901. Alternatively, the user and/or AI system, upon review, may choose to continue with the initial representative bone. In other embodiments, the AI system may prompt the user to perform any of the described actions. The process may continue iteratively until a 2D view of a representative bone can be identified that meets or exceeds a similarity threshold (i.e. an ideal view). In some embodiments, if no representative bone and/or corresponding view can be found that meets the threshold, a user or AI system may reduce or modify various factors associated with the threshold until a suitable view of a representative bone is found.

Figure 13A:
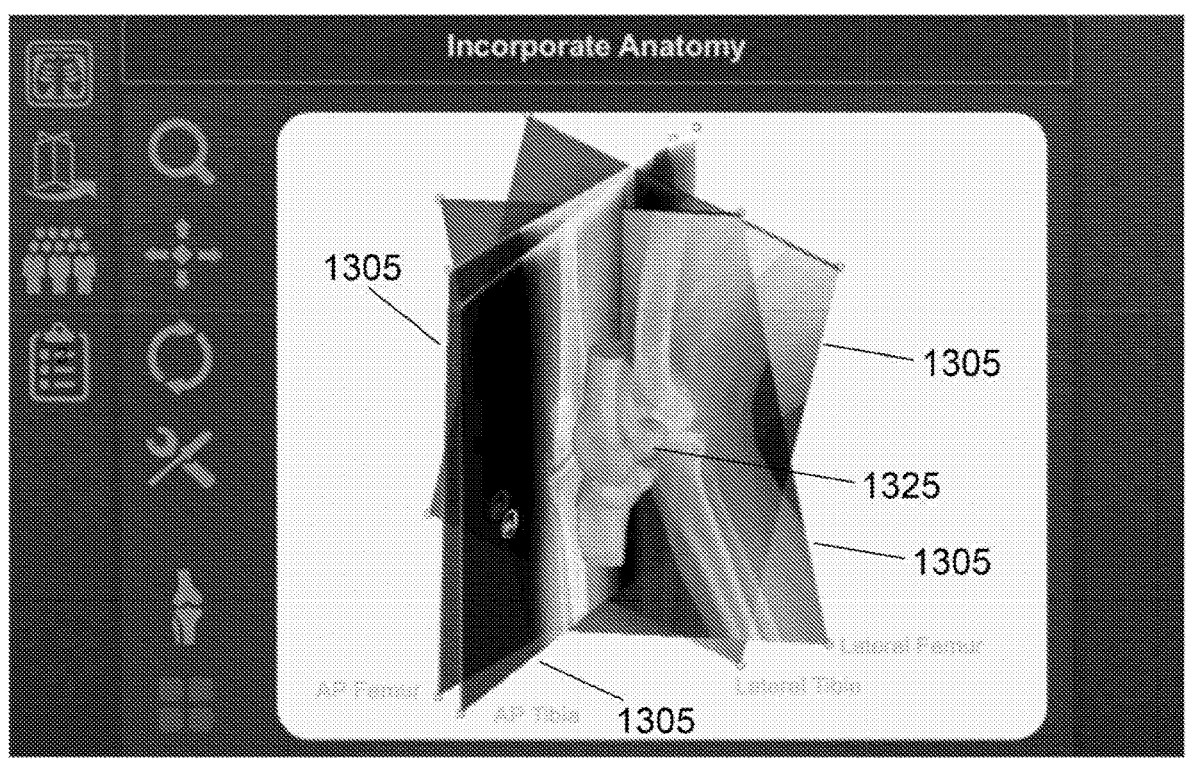
FIGS. 13A-13B depict a process of scaling and re-orienting a 3D bone model with respect to at least one 2D image in accordance with an embodiment.
Figure 13B:
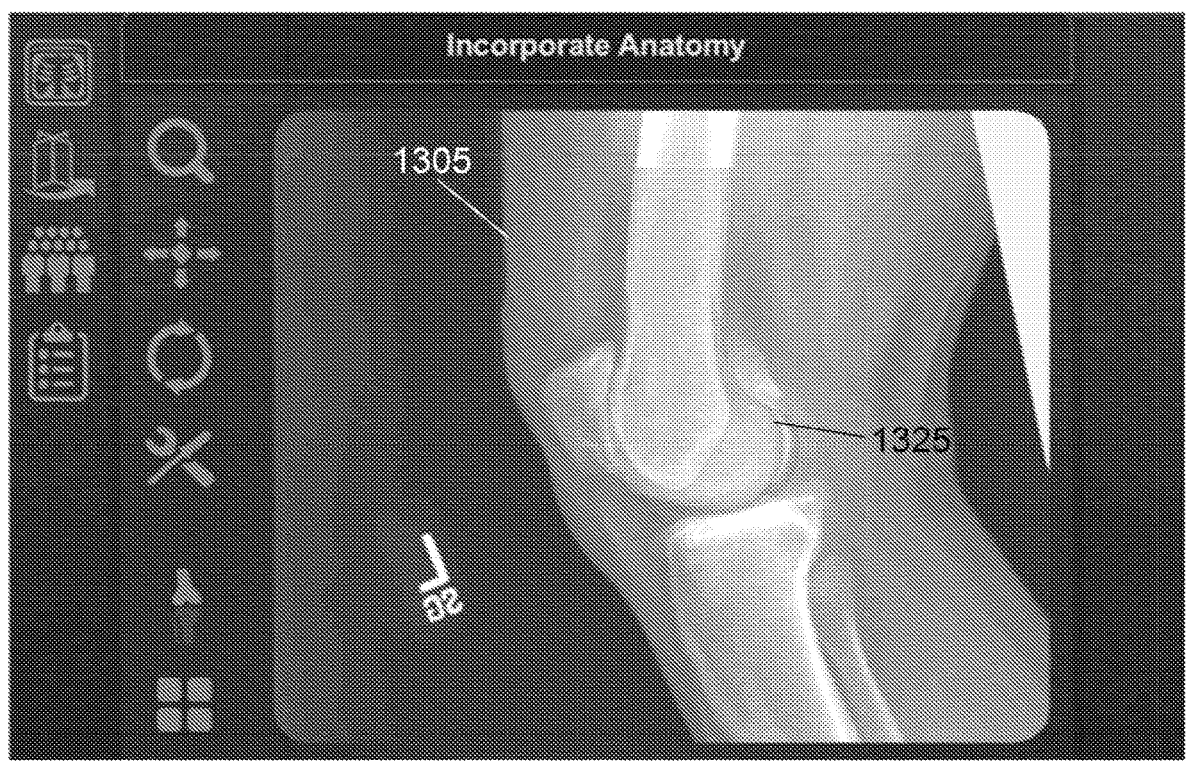

FIGS. 13A and 13B provide a non-limiting example of step 903, regarding adjusting the 3D bone model (i.e., the 3D bone model corresponding to the selected representative bone). As shown in FIG. 13A, the 3D bone model 1325 is overlaid on one or more of 2D images 1305 (e.g., 2D images 1005A-1005C) based on the selected ideal view. In some embodiments, one of the 2D images (e.g., AP Femur, AP Tibia, Lateral Tibia, Lateral Femur, etc.) may be selected individually for a direct comparison, as shown in FIG. 13B, wherein the 2D image may be further re-positioned, re-scaled and/or re-oriented to match the 3D bone model to a greater degree. Alternatively, the 3D bone model may be further re-positioned, re-scaled, and/or re-oriented to match the 2D image to a greater degree, thus achieving the same relative position, orientation, and scale. This process may be repeated with one or more additional 2D images, such that the 3D model is further adjusted to a best fit. In a further embodiment, the selected 2D image 1305 may move along a single axis along a locked plane (e.g., in the A to P, P to A, L to M, or M to L) in order to confirm and/or evaluate the 3D bone at various points.

Figure 14:
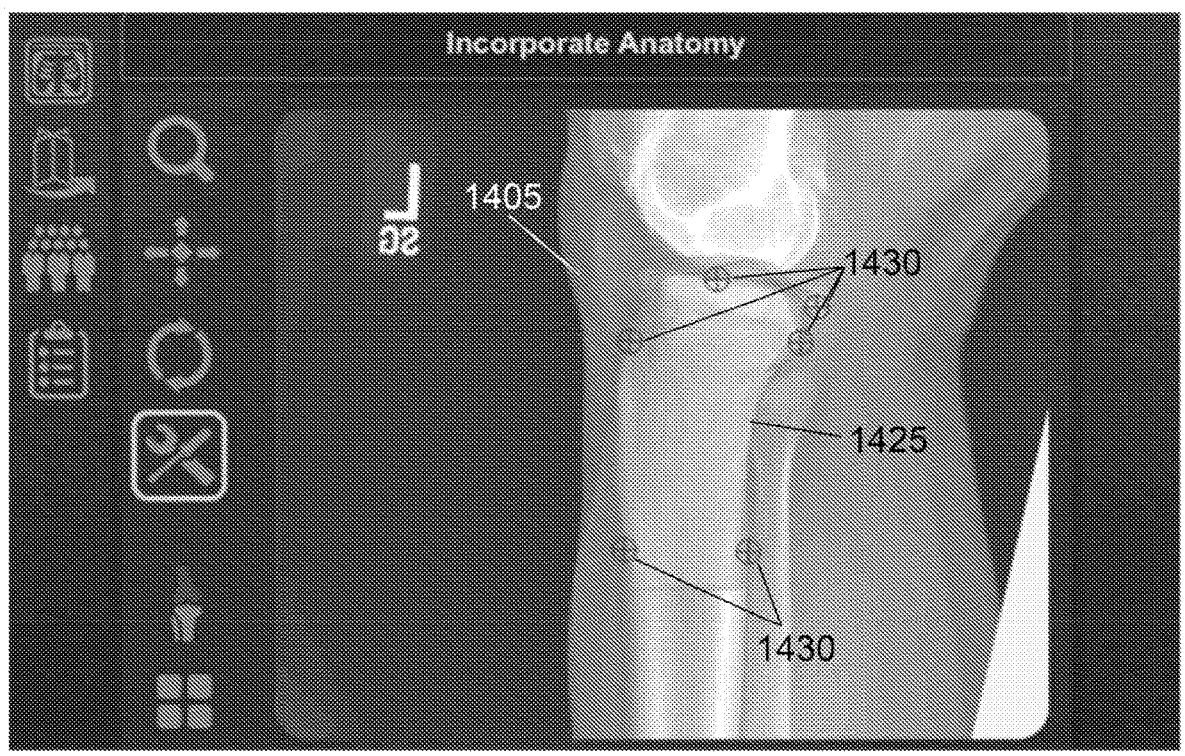
FIG. 14 depicts a process of modifying the contours of the 3D bone model in accordance with an embodiment.

Referring now to FIG. 14, an illustrated embodiment is shown that is associated with the step of modifying the 3D bone model 905. As shown in FIG. 14, some incongruity may persist between the representative 3D bone model 1425 and the 2D images 1405 (e.g., 2D images 1005A-1005C). Thus, in some embodiments, one or more contours of a 3D bone model may be altered by adjusting one or more points 1430 on the 3D bone model. These alterations may be reliant upon a library of bone image data (not shown). Thus, in some embodiments, a contour of the 3D bone model may only be adjustable to a particular point in space if that point corresponds to a contour of a known 3D bone model (e.g., from the library).

For example, when a point 1430 on the 3D bone model is selected for adjustment, the system may access and/or create a proximity based point cloud that determines any and all potential positions for the corresponding points across a plurality of 3D bone models in the library. When the selected point 1430 is adjusted in a given direction (e.g., up, down, left, right, etc.), it may "snap" to an adjacent position within the point cloud. Thus, because the new position for the selected point 1430 corresponds to an existing point on at least one 3D image stored in the library, the data therefrom is utilized to adjust the contour of the 3D bone model to account for the new position of the selected point 1430. In an embodiment where a user manually modifies one or more contours of the 3D bone model, visual assistance may be provided by the system. For example, as the selected point 1430 is adjusted, the new contour resulting from the instant position of the selected point 1430 may be displayed to the user in real time. The new contour may be illustrated by superimposing the resulting cutout or additional bone mass upon the 3D bone model (e.g. displayed as an opaque or semi-transparent feature mimicking the appearance of the bone, the 3D model, or a simulated x-ray). While a discrete set of points 1430 is demonstrated in FIG. 14, this is only illustrative. It is contemplated that any point along the periphery of the 3D bone model may be selected and repositioned according to the corresponding point cloud. Once all contour modifications are complete, the result is a custom 3D model representing the candidate bone of the patient.

The manner of representing the 3D bone model described herein is intended to be exemplary and non-limiting. The 3D bone model could be alternatively represented in any of a variety of manners for the purpose of modifying a contour or region. For example, the 3D bone model could be represented as joined chips or segments of corresponding x-ray data from the library, such that the various chips or segments may be repositioned to match a 2D image 1405.

In a further embodiment, the 3D bone model may be based on statistical shapes (i.e. a statistical shape model). In addition to scaling or otherwise adjusting the 3D bone model as a whole, individual statistical shapes may be scaled or adjusted in order to modify a discrete portion or region of the 3D bone model to better match the 2D image 1405. For example, in some embodiments, the size of a specific condyle of the 2D image may not match that of the 3D bone model, while other features of the bone are matched to a high degree of accuracy. In this case, one or more individual statistical shapes of the 3D bone model corresponding to the condyle may be scaled as a whole to better match the condyle of the 2D image. In another embodiment, a deformity may be misrepresented or not represented at all by the selected 3D bone model (e.g., the library may contain little data representing a rare deformity). In such a case, one or more individual statistical shape of the 3D bone model corresponding to a region including the deformity may be scaled and/or adjusted to better represent the deformity and better match the 2D image.

It should be noted that the resulting custom 3D model of the candidate bone may be accurate to a greater degree with respect to some features of the candidate bone than others. In some embodiments, where the custom 3D model is produced with a known purpose, particular features or regions of the bone may be of greater significance to the utility of the custom 3D model, whereas other features or regions are less significant or entirely irrelevant. For example, where a custom 3D model is being produced for further use in designing and manufacturing a custom cut guide, the particular surfaces and regions of the bone where the cut guide will seat against and contact the bone are of great importance to assure proper fit and orientation with the bone. However, other regions may not contact the cut guide in use and may not be of relevance for designing the cut guide beyond ensuring that these regions do not interfere with the fit and seating of the cut guide. In other words, while an MRI 3D bone represents all surfaces, only a portion of a bone may be used for particular applications. For example, acute-care and revision applications may not have access to the joint-space, but the surrounding bone can be used to predict the joint space or other aspects of the bone shape to be corrected.

As such, in some embodiments, the user and/or AI system may focus on achieving a high degree of similarity between the 2D images and the custom 3D model with respect to the features, surfaces, and regions of interest. Further features, surfaces, and regions may have a lower threshold of similarity, which may be implemented in the custom 3D model in various manners (e.g. gaps or tears in the surfaces of the custom 3D model, generic or approximated surface shapes with an indicated margin of error) such that a system utilizing the custom 3D model could account for these uncertainties. For example, a cut guide may be produced which limits contact to any uncertain surfaces or regions so as to prevent improper or ambiguous seating of the cut guide against the bone.

Figure 15A:
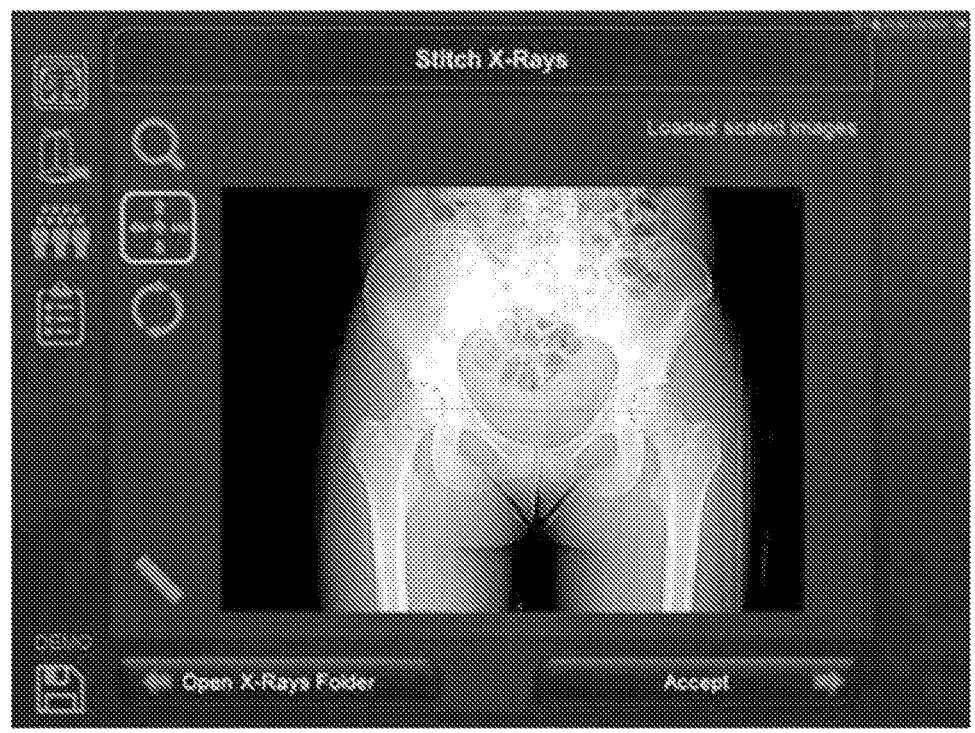
FIGS. 15A-15D depict various stages of a process of producing a custom three-dimensional model of a joint with respect to an acetabulofemoral joint in accordance with an embodiment
Figure 15B:
Figure 15C:
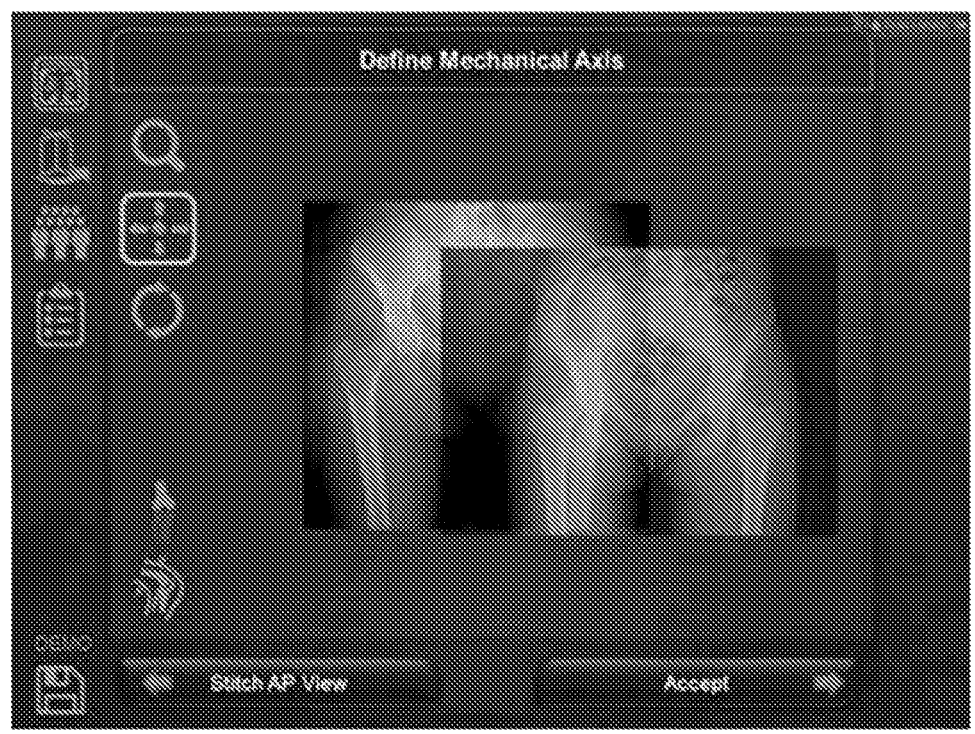
Figure 15D:
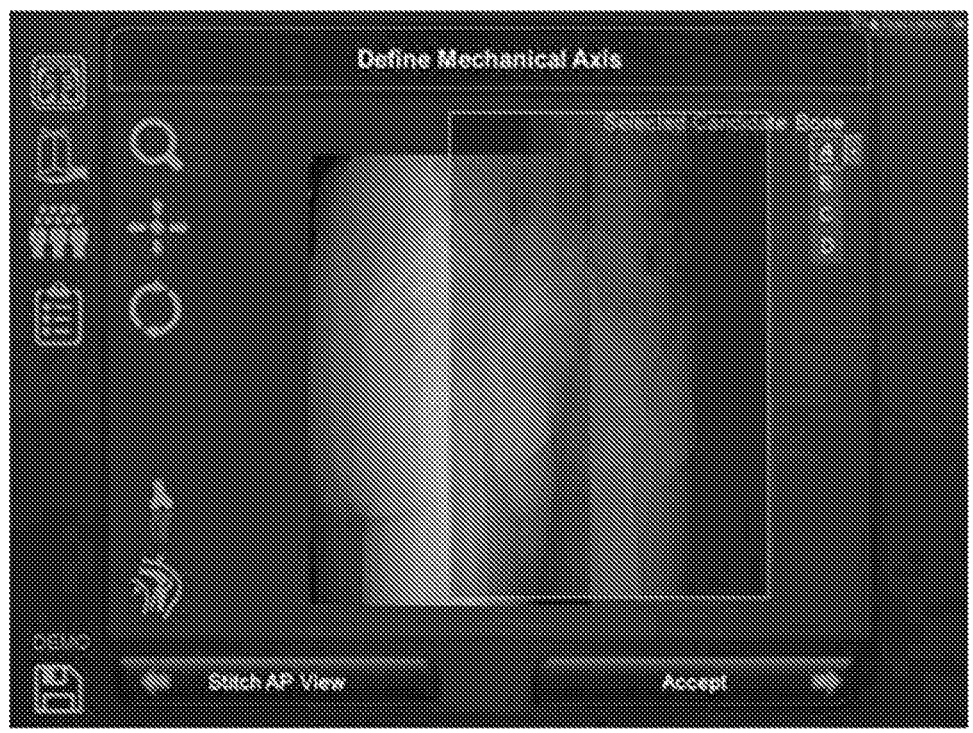

Further, while the process outlined herein has been illustrated with respect to a knee joint, it is contemplated that the procedure can be performed to produce a custom three-dimensional model of various other types of joints, including but not limited to the hip, the shoulder, the spine, and extremities such as the wrist and the ankle. For example, FIGS. 15A-15D demonstrate various steps of the processes 800 and 900 being performed upon an acetabulofemoral joint (i.e., hip). A custom three-dimensional model of a hip joint may be desired for planning a total hip arthroplasty or a revision total hip arthroplasty. FIGS. 15A and 15B demonstrate the co-registration 802 and landmarking 803 steps upon 2D images of a hip joint. FIGS. 15C and 15D demonstrate the step 901 of conforming the candidate bone to a common coordinate system.

Further, as discussed herein, while a single view may be sufficient, additional 2D images providing additional views of the plurality of bones can be provided. FIGS. 15A and 15C demonstrate the use of an AP view of the hip, while FIGS. 15B and 15D depict the use of an ML view of the hip. The images of each view may be co-registered, landmarked, and utilized in the production of custom 3D bone models. As will be apparent to one having ordinary skill in the art, the views provided may vary based on a variety of factors, including but not limited to the type of joint, the expected type of procedure, availability, and radiation exposure. For example, in the case of a hip joint, multiple views of each bone may be utilized. In some embodiments, an AP view of the pelvis and a lateral view of the pelvis may be utilized. In some embodiments, the AP view may be a low pelvic view. Further, an oblique view may also be substituted for one of the views. Additionally, an AP view and a Lauenstein (i.e., frog leg) view of the femur may be utilized. Further, multiple images from the same view (e.g., an AP view from one side of the joint and an AP view from the opposite side of the joint) may be utilized together. In some cases, views may be limited to one acetabulofemoral joint, as opposed to both acetabulofemoral joints of the pelvis. In some cases, one or more bones at a particular view (e.g., an AP view of the pelvis and an AP view of the femur) may be captured in a single 2D image. The embodiments described are intended to be non-limiting examples, and it is contemplated that the system may be utilized with any 2D views or combinations of 2D views. Due to the variance in patient imaging, various types of images and various views may be provided, and thus the system is designed to utilize any such 2D images.

While the processes herein are described and illustrated as utilizing a plurality of 2D images, in some embodiments only a single 2D image of a single view of a patient may be provided. For example, the system may identify key points and features of the 2D image, which are cross-referenced through the library of historical bone image data to identify substantially similar historical bone image data. In some embodiments, the library contains 3D models and/or additional 2D views corresponding to the identified historical bone image data, which may be utilized to synthesize alternate views of the single 2D image of the patient. The single 2D image may be utilized with the synthesized alternate views to produce a custom 3D model of the joint, as otherwise described herein.

As discussed herein, the set of key points chosen for identification will vary based on the type of joint. As shown in FIG. 15A, for example, the key points for a hip joint may include the centers of the femoral heads (e.g., approximated as spheres), the pelvic teardrops, the ischial points, and/or the trochanters. Further non-limiting examples of key points for a hip joint are the iliac spines, the anterior superior iliac spine (ASIS), iliac points, the lowest point of the ischiatic bone, the greater trochanter, the lesser trochanter, the acetabulum, the saddle points, the acetabular roof, the obturator foramen, the symphysis, the sacrum, the sacrococcygeal joint, and the femoral shaft. Further, in addition to key points, the system may further utilize lines between any two key points described herein. In some embodiments, lines between corresponding features on opposing sides of the pelvis may be utilized, such as a line between femoral heads, an inter-ischial line, an inter-trochanteric line, or a teardrop line. For further types of joints, different key points and lines may be of interest for landmarking, as would be known to one having ordinary skill in the art. Additionally, different calculations may be performed for different types of joints. For example, in the case of a hip joint as seen in FIG. 15B, calculations may include pelvic tilt, deformity, and femoral displacement, among other measurements.

Figure 17:
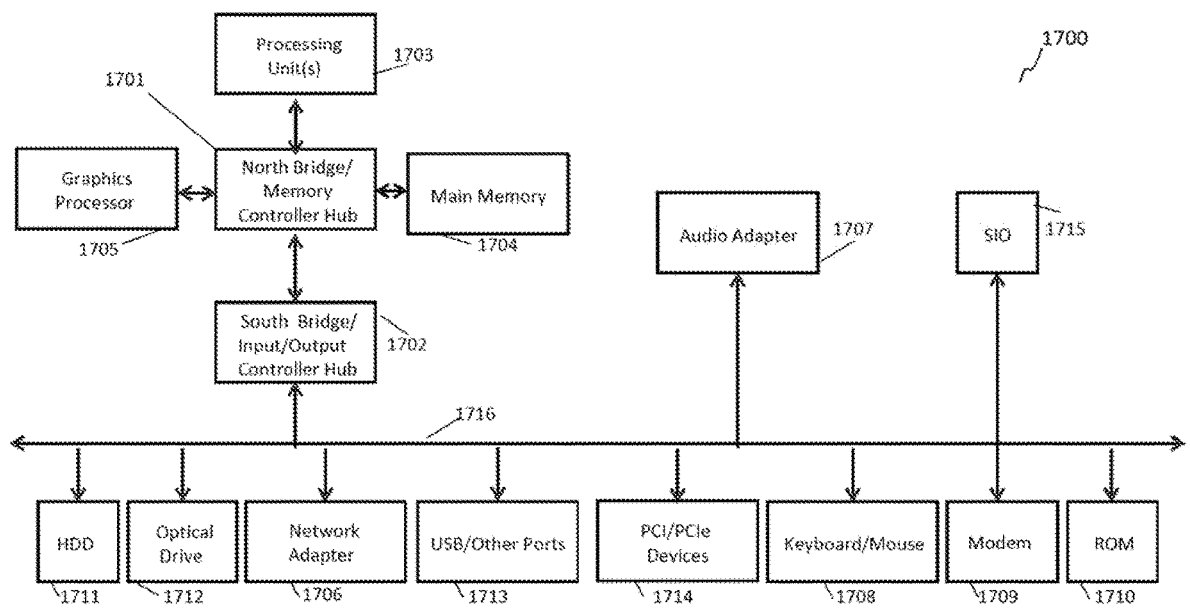
FIG. 17 illustrates a block diagram of an illustrative data processing system in which aspects of the illustrative embodiments are implemented

FIG. 17 illustrates a block diagram of an illustrative data processing system 1700 in which aspects of the illustrative embodiments are implemented. The data processing system 1700 is an example of a computer, such as a server or client, in which computer usable code or instructions implementing the process for illustrative embodiments of the present invention are located. In some embodiments, the data processing system 1700 may be a server computing device. For example, data processing system 1700 can be implemented in a server or another similar computing device operably connected to a surgical system 100 as described above. The data processing system 1700 can be configured to, for example, transmit and receive information related to a patient and/or a related surgical plan with the surgical system 100.

In the depicted example, data processing system 1700 can employ a hub architecture including a north bridge and memory controller hub (NB/MCH) 1701 and south bridge and input/output (I/O) controller hub (SB/ICH) 1702. Processing unit 1703, main memory 1704, and graphics processor 1705 can be connected to the NB/MCH 1701. Graphics processor 1705 can be connected to the NB/MCH 1701 through, for example, an accelerated graphics port (AGP).

In the depicted example, a network adapter 1706 connects to the SB/ICH 1702. An audio adapter 1707, keyboard and mouse adapter 1708, modem 1709, read only memory (ROM) 1710, hard disk drive (HDD) 1711, optical drive (e.g., CD or DVD) 1712, universal serial bus (USB) ports and other communication ports 1713, and PCI/PCIe devices 1714 may connect to the SB/ICH 1702 through bus system 1716. PCI/PCIe devices 1714 may include Ethernet adapters, add-in cards, and PC cards for notebook computers. ROM 1710 may be, for example, a flash basic input/output system (BIOS). The HDD 1711 and optical drive 1712 can use an integrated drive electronics (IDE) or serial advanced technology attachment (SATA) interface. A super I/O (SIO) device 1715 can be connected to the SB/ICH 1702.

An operating system can run on the processing unit 1703. The operating system can coordinate and provide control of various components within the data processing system 1700. As a client, the operating system can be a commercially available operating system. An object-oriented programming system, such as the JavaTM programming system, may run in conjunction with the operating system and provide calls to the operating system from the object-oriented programs or applications executing on the data processing system 1700. As a server, the data processing system 1700 can be an IBM® eServerTM System® running the Advanced Interactive Executive operating system or the Linux operating system. The data processing system 1700 can be a symmetric multiprocessor (SMP) system that can include a plurality of processors in the processing unit 1703. Alternatively, a single processor system may be employed.

Instructions for the operating system, the object-oriented programming system, and applications or programs are located on storage devices, such as the HDD 1711, and are loaded into the main memory 1704 for execution by the processing unit 1703. The processes for embodiments described herein can be performed by the processing unit 1703 using computer usable program code, which can be located in a memory such as, for example, main memory 1704, ROM 1710, or in one or more peripheral devices.

A bus system 1716 can be comprised of one or more busses. The bus system 1716 can be implemented using any type of communication fabric or architecture that can provide for a transfer of data between different components or devices attached to the fabric or architecture. A communication unit such as the modem 1709 or the network adapter 1706 can include one or more devices that can be used to transmit and receive data.

Those of ordinary skill in the art will appreciate that the hardware depicted in FIG. 17 may vary depending on the implementation. Other internal hardware or peripheral devices, such as flash memory, equivalent non-volatile memory, or optical disk drives may be used in addition to or in place of the hardware depicted. Moreover, the data processing system 1700 can take the form of any of a number of different data processing systems, including but not limited to, client computing devices, server computing devices, tablet computers, laptop computers, telephone or other communication devices, personal digital assistants, and the like. Essentially, data processing system 1700 can be any known or later developed data processing system without architectural limitation While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by 1/10 of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

We claim:

1. A method for three-dimensional (3D) anatomical modeling, the method comprising:
co-registering one or more obtained two-dimensional (2D) images based on a common coordinate system, wherein the 2D images are associated with bony anatomy of a patient;
identifying a first historical 3D bone model corresponding to a first candidate bone based on bone properties of the bony anatomy and contextual information including at least demographic information associated with the patient;
repositioning one or more of the 2D images superimposed on the first historical 3D bone model to substantially align the one or more of the 2D images with the first historical 3D bone model;
modifying one or more surface regions of a second historical 3D bone model that corresponds to a second candidate bone and is identified based on the repositioning;
comparing the first or second sets of candidate bones to the 2D images collectively or as open shell surfaces;
selecting one or more bony surfaces represented by visible portions of the bony anatomy of the patient or a shape of the bony anatomy of the patient; and
generating a 3D model from the modified second historical 3D bone model, wherein the generated 3D model corresponds to the bony anatomy.

2. The method of claim 1, facilitating digital templating based on the generated 3D model to size one or more implants or establish one or more clinical landmarks for surgical planning or post-operative evaluation.

3. The method of claim 1, wherein the open shell surfaces comprise a wireframe, a simulated back-projected representation, interpreted pixel greyscale values or outlines, or one or more derived landmarks, axes, lines, or contours.

4. The method of claim 1, wherein two or more of the obtained 2D images are from different views of the bony anatomy of the patient and comprise radiographs generated via plain film X-ray, cone-beam X-ray, or ultrasound.

5. The method of claim 1, further comprising generating or modifying a surgical plan, or defining a surgical volume, for a robotic surgery associated with the bony anatomy of the patient based on the generated 3D model.

6. The method of claim 1, further comprising generating a patient-specific cut or pin guide, grasp wrench-space contacts, or visual references for the cut or pin guide, based on the generated 3D model.

7. The method of claim 1, further comprising identifying a plurality of historical 3D bone models corresponding to a plurality of candidate bones based on the bone properties of the bony anatomy and the contextual information, wherein the bony anatomy comprises a joint comprising multiple bones and one or more of the candidate bones are associated with different patients.

8. The method of claim 1, further comprising extracting one or more of the bone properties from one or more of the 2D images using computer automation.

9. The method of claim 1, further comprising receiving a selection of one or more output filters to facilitate identification of the first historical 3D bone model, wherein each of the filters is associated with one of the bone properties or a portion of the contextual information.

10. The method of claim 1, further comprising:
repeating the repositioning for the second historical 3D bone model, without modifying the surface regions; and identifying a third historical 3D bone model based on the repositioning of the second historical 3D bone model, when the second historical 3D bone model fails to satisfy a threshold accuracy.

11. The method of claim 1, further comprising identifying the second historical 3D bone model based on a comparison of one or more portions of the bony anatomy, in one or more of the 2D images, with a 2D representation of the first historical 3D model following the repositioning, wherein the one or more portions are of a silhouette of the bony anatomy and the comparison resolves one or more ambiguous bone film projections.

12. The method of claim 1, wherein the repositioning comprises rescaling, translating vertically or horizontally, or reorienting the one or more of the 2D images or the first historical 3D bone model.

13. A non-transitory computer readable medium having stored thereon instructions for three-dimensional modeling of patient bony anatomy comprising executable code that, when executed by one or more processors, causes the processors to perform the method of claim 1.

14. A surgical computing device, comprising a non-transitory computer readable medium comprising programmed instructions stored thereon and one or more processors coupled to the computer-readable medium and configured to execute the stored programmed instructions to perform the method of claim 1.

15. A method for three-dimensional (3D) anatomical modeling, the method comprising:
co-registering one or more obtained two-dimensional (2D) images based on a common coordinate system, wherein the 2D images are associated with bony anatomy of a patient;
identifying a first historical 3D bone model corresponding to a first candidate bone based on bone properties of the bony anatomy and contextual information including at least demographic information associated with the patient;
repositioning one or more of the 2D images superimposed on the first historical 3D bone model to substantially align the one or more of the 2D images with the first historical 3D bone model;
modifying one or more surface regions of a second historical 3D bone model that corresponds to a second candidate bone and is identified based on the repositioning;
identifying a plurality of historical 3D bone models corresponding to a plurality of candidate bones based on the bone properties of the bony anatomy and the contextual information, wherein the bony anatomy comprises a joint comprising multiple bones and one or more of the candidate bones are associated with different patients; and
generating a 3D model from the modified second historical 3D bone model, wherein the generated 3D model corresponds to the bony anatomy.

16. The method of claim 15, facilitating digital templating based on the generated 3D model to size one or more implants or establish one or more clinical landmarks for surgical planning or post-operative evaluation.

17. The method of claim 15, further comprising:
comparing the first or second sets of candidate bones to the 2D images collectively or as open shell surfaces; and
selecting one or more bony surfaces represented by visible portions of the bony anatomy of the patient or a shape of the bony anatomy of the patient.

18. The method of claim 17, wherein the open shell surfaces comprise a wireframe, a simulated back-projected representation, interpreted pixel greyscale values or outlines, or one or more derived landmarks, axes, lines, or contours.

19. The method of claim 15, wherein two or more of the obtained 2D images are from different views of the bony anatomy of the patient and comprise radiographs generated via plain film X-ray, cone-beam X-ray, or ultrasound.

20. The method of claim 15, further comprising generating or modifying a surgical plan, or defining a surgical volume, for a robotic surgery associated with the bony anatomy of the patient based on the generated 3D model.

21. The method of claim 15, further comprising generating a patient-specific cut or pin guide, grasp wrench-space contacts, or visual references for the cut or pin guide, based on the generated 3D model.

22. The method of claim 15, further comprising extracting one or more of the bone properties from one or more of the 2D images using computer automation.

23. The method of claim 15, further comprising receiving a selection of one or more output filters to facilitate identification of the first historical 3D bone model, wherein each of the filters is associated with one of the bone properties or a portion of the contextual information.

24. The method of claim 15, further comprising:
repeating the repositioning for the second historical 3D bone model, without modifying the surface regions; and
identifying a third historical 3D bone model based on the repositioning of the second historical 3D bone model, when the second historical 3D bone model fails to satisfy a threshold accuracy.

25. The method of claim 15, further comprising identifying the second historical 3D bone model based on a comparison of one or more portions of the bony anatomy, in one or more of the 2D images, with a 2D representation of the first historical 3D model following the repositioning, wherein the one or more portions are of a silhouette of the bony anatomy and the comparison resolves one or more ambiguous bone film projections.

26. The method of claim 15, wherein the repositioning comprises rescaling, translating vertically or horizontally, or reorienting the one or more of the 2D images or the first historical 3D bone model.

27. A method for three-dimensional (3D) anatomical modeling, the method comprising:
co-registering one or more obtained two-dimensional (2D) images based on a common coordinate system, wherein the 2D images are associated with bony anatomy of a patient;
identifying a first historical 3D bone model corresponding to a first candidate bone based on bone properties of the bony anatomy and contextual information including at least demographic information associated with the patient;
repositioning one or more of the 2D images superimposed on the first historical 3D bone model to substantially align the one or more of the 2D images with the first historical 3D bone model;
modifying one or more surface regions of a second historical 3D bone model that corresponds to a second candidate bone and is identified based on the repositioning;
repeating the repositioning for the second historical 3D bone model, without modifying the surface regions;

identifying a third historical 3D bone model based on the repositioning of the second historical 3D bone model, when the second historical 3D bone model fails to satisfy a threshold accuracy; and generating a 3D model from the modified second historical 3D bone model, wherein the generated 3D model corresponds to the bony anatomy.

28. The method of claim 27, facilitating digital templating based on the generated 3D model to size one or more implants or establish one or more clinical landmarks for surgical planning or post-operative evaluation.

29. The method of claim 27, further comprising:

comparing the first or second sets of candidate bones to the 2D images collectively or as open shell surfaces; and selecting one or more bony surfaces represented by visible portions of the bony anatomy of the patient or a shape of the bony anatomy of the patient.

30. The method of claim 29, wherein the open shell surfaces comprise a wireframe, a simulated back-projected representation, interpreted pixel greyscale values or outlines, or one or more derived landmarks, axes, lines, or contours.

31. The method of claim 27, wherein two or more of the obtained 2D images are from different views of the bony anatomy of the patient and comprise radiographs generated via plain film X-ray, cone-beam X-ray, or ultrasound.

32. The method of claim 27, further comprising generating or modifying a surgical plan, or defining a surgical volume, for a robotic surgery associated with the bony anatomy of the patient based on the generated 3D model.

33. The method of claim 27, further comprising generating a patient-specific cut or pin guide, grasp wrench-space contacts, or visual references for the cut or pin guide, based on the generated 3D model.

34. The method of claim 27, further comprising identifying a plurality of historical 3D bone models corresponding to a plurality of candidate bones based on the bone properties of the bony anatomy and the contextual information, wherein the bony anatomy comprises a joint comprising multiple bones and one or more of the candidate bones are associated with different patients.

35. The method of claim 27, further comprising extracting one or more of the bone properties from one or more of the 2D images using computer automation.

36. The method of claim 27, further comprising receiving a selection of one or more output filters to facilitate identification of the first historical 3D bone model, wherein each of the filters is associated with one of the bone properties or a portion of the contextual information.

37. The method of claim 27, further comprising identifying the second historical 3D bone model based on a comparison of one or more portions of the bony anatomy, in one or more of the 2D images, with a 2D representation of the first historical 3D model following the repositioning, wherein the one or more portions are of a silhouette of the bony anatomy and the comparison resolves one or more ambiguous bone film projections.

38. The method of claim 27, wherein the repositioning comprises rescaling, translating vertically or horizontally, or reorienting the one or more of the 2D images or the first historical 3D bone model.

39. A method for three-dimensional (3D) anatomical modeling, the method comprising:

co-registering one or more obtained two-dimensional (2D) images based on a common coordinate system, wherein the 2D images are associated with bony anatomy of a patient;

identifying a first historical 3D bone model corresponding to a first candidate bone based on bone properties of the bony anatomy and contextual information including at least demographic information associated with the patient;

repositioning one or more of the 2D images superimposed on the first historical 3D bone model to substantially align the one or more of the 2D images with the first historical 3D bone model;

modifying one or more surface regions of a second historical 3D bone model that corresponds to a second candidate bone and is identified based on the repositioning;

identifying the second historical 3D bone model based on a comparison of one or more portions of the bony anatomy, in one or more of the 2D images, with a 2D representation of the first historical 3D model following the repositioning, wherein the one or more portions are of a silhouette of the bony anatomy and the comparison resolves one or more ambiguous bone film projections; and generating a 3D model from the modified second historical 3D bone model, wherein the generated 3D model corresponds to the bony anatomy.

40. The method of claim 39, facilitating digital templating based on the generated 3D model to size one or more implants or establish one or more clinical landmarks for surgical planning or post-operative evaluation.

41. The method of claim 39, further comprising:

comparing the first or second sets of candidate bones to the 2D images collectively or as open shell surfaces; and selecting one or more bony surfaces represented by visible portions of the bony anatomy of the patient or a shape of the bony anatomy of the patient.

42. The method of claim 41, wherein the open shell surfaces comprise a wireframe, a simulated back-projected representation, interpreted pixel greyscale values or outlines, or one or more derived landmarks, axes, lines, or contours.

43. The method of claim 39, wherein two or more of the obtained 2D images are from different views of the bony anatomy of the patient and comprise radiographs generated via plain film X-ray, cone-beam X-ray, or ultrasound.

44. The method of claim 39, further comprising generating or modifying a surgical plan, or defining a surgical volume, for a robotic surgery associated with the bony anatomy of the patient based on the generated 3D model.

45. The method of claim 39, further comprising generating a patient-specific cut or pin guide, grasp wrench-space contacts, or visual references for the cut or pin guide, based on the generated 3D model.

46. The method of claim 39, further comprising identifying a plurality of historical 3D bone models corresponding to a plurality of candidate bones based on the bone properties of the bony anatomy and the contextual information, wherein the bony anatomy comprises a joint comprising multiple bones and one or more of the candidate bones are associated with different patients.

47. The method of claim 39, further comprising extracting one or more of the bone properties from one or more of the 2D images using computer automation.

48. The method of claim 39, further comprising receiving a selection of one or more output filters to facilitate identification of the first historical 3D bone model, wherein each of the filters is associated with one of the bone properties or a portion of the contextual information.

49. The method of claim 39, further comprising:
repeating the repositioning for the second historical 3D bone model, without modifying the surface regions; and
identifying a third historical 3D bone model based on the repositioning of the second historical 3D bone model, when the second historical 3D bone model fails to satisfy a threshold accuracy.

50. The method of claim 39, wherein the repositioning comprises rescaling, translating vertically or horizontally, or reorienting the one or more of the 2D images or the first historical 3D bone model.

* * * * *